(12) United States Patent
Abe

(10) Patent No.: US 7,299,100 B2
(45) Date of Patent: Nov. 20, 2007

(54) DIGITAL SIGNAL PROCESSING APPARATUS AND DIGITAL SIGNAL PROCESSING METHOD

(75) Inventor: Ryoji Abe, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 896 days.

(21) Appl. No.: 10/448,067

(22) Filed: May 29, 2003

(65) Prior Publication Data
US 2003/0225468 A1     Dec. 4, 2003

(30) Foreign Application Priority Data
May 30, 2002  (JP)  ............................. 2002-157724

(51) Int. Cl.
H04R 29/00    (2006.01)
G06F 17/00    (2006.01)
(52) U.S. Cl. .............................. 700/94; 381/56; 712/28
(58) Field of Classification Search ................. 700/94; 709/251; 712/10, 11, 28, 13; 381/56
See application file for complete search history.

(56) References Cited
U.S. PATENT DOCUMENTS
6,104,721 A * 8/2000 Hsu ............................. 700/2
6,275,899 B1 * 8/2001 Savell et al. ................ 711/118
2002/0082716 A1 * 6/2002 Hashimoto et al. ............ 700/2

* cited by examiner

Primary Examiner—Sinh Tran
Assistant Examiner—Walter F Briney, III
(74) Attorney, Agent, or Firm—Pearne & Gordon LLP

(57) ABSTRACT

Herein disclosed is a digital signal processing apparatus comprising: input means for inputting a plurality of acoustic signals from an external outputting device; a plurality of digital signal processing units electrically connected with one another in series to form a closed loop, for receiving and processing said acoustic signals as shared data elements in a sequential order; and output means for outputting a plurality of acoustic data elements processed and generated by said digital signal processing units to an external inputting device, whereby each of said digital signal processing units comprises: receiving means for receiving said shared data elements from a preceding digital signal processing unit; copied data storing means for copying said shared data elements to a shared memory section; acoustic signal processing means for inputting said shared data elements stored in said shared memory section as an input signal, processing said shared data elements thus inputted, and writing an output signal into said shared memory section as shared data elements; transmitting data storing means for storing shared data elements stored in said shared memory section into a transmitting memory; and transmitting means for transmitting said shared data elements stored in said transmitting memory to a subsequent digital signal processing unit.

16 Claims, 26 Drawing Sheets

DIGITAL SIGNAL PROCESSING APPARATUS AND DIGITAL SIGNAL PROCESSING METHOD

BACKGROUND OF THE INVENTION

1. Field of the Invention

The present invention relates to a digital signal processing apparatus and a digital signal processing method, and more particularly to a digital signal processing apparatus comprising a plurality of digital signal processing units each having a storage means wherein the digital signal processing units share respective storage means as a shared memory, and the method of controlling the same.

2. Description of the Related Art

Up until now, there have been provided a wide variety of digital signal processing apparatuses, one of which comprises a shared memory and is adapted to process data stored in the shared memory. One of the conventional digital signal processing apparatuses of this type is shown in FIG. 26 as comprising a digital signal processing group 5, consisting of a plurality of digital signal processing units, for example, digital signal processing units 1, 2, 3, and 4, respectively bearing reference legends "DSP #1", "DSP #2", "DSP #3", and "DSP #4", a shared memory 6 for storing data to be processed by the digital signal processing units 1, 2, 3, and 4, an address bus 7 through which the digital signal processing units 1, 2, 3, and 4 are operative to specify addresses of data stored in the shared memory 6, a data bus 8 through which the digital signal processing units 1, 2, 3, and 4 are operative to read and write the data with the specified addresses in the shared memory 6, and a control bus 9 through which the digital signal processing units 1, 2, 3, and 4 are operative to receive control signals wherein the digital signal processing units 1, 2, 3, and 4 are operative to process the data stored in the shared memory 6 with reference to the control signals so as to prevent two or more digital signal processing units of the digital signal processing group 5 from requesting the data stored in the shared memory 6 at the same time.

One digital signal processing unit of the digital signal processing group 5, for example, a digital signal processing unit 1, is operated to receive a control signal from the control bus 9, and to judge whether or not the address bus 7 and the data bus 8 are occupied by the other digital signal processing unit 2, 3, or 4 with reference to the control signal thus received. The digital signal processing unit 1 can read and write the data stored in the shared memory 6 through the address bus 7 and the data bus 8 when it is judged that the address bus 7 and the data bus 8 are not occupied by the other digital signal processing unit 2, 3, or 4. The digital signal processing unit 1, on the other hand, can not read or write the data stored in the shared memory 6 through the address bus 7 and the data bus 8 when it is judged that the address bus 7 and the data bus 8 are occupied by the other digital signal processing unit 2, 3, or 4. The conventional digital signal processing apparatus thus constructed is operative to have only one digital signal processing unit of the digital signal processing group 5, i.e., the digital signal processing unit 1, 2, 3, or 4 read and write the data stored in the shared memory 6 through the address bus 7 and the data bus 8 at a time, thereby preventing a bus contention from arising when two or more digital signal processing units of the digital signal processing group 5 request the data stored in the shared memory 6 at the same time.

The conventional digital signal processing apparatus, in which any one digital signal processing unit of the digital signal processing group 5 can not read or write the data stored in the shared memory 6 through the address bus 7 and the data bus 8 when it is judged that the address bus 7 and the data bus 8 are occupied by the other digital signal processing unit 2, 3, or 4, however, encounters a drawback that two or more digital signal processing units of the digital signal processing group 5 can not read or write the data stored in the shared memory 6 through the address bus 7 and the data bus 8 when the two or more digital signal processing units of the digital signal processing group 5 request the data stored in the shared memory 6 at the same time. This makes it difficult for the conventional digital signal processing apparatus to carry out real-time signal processing.

Each digital signal processing unit of the digital signal processing group 5, i.e., the digital signal processing unit 1, 2, 3, or 4 is required to carry out a signal processing process on acoustic signal data for every one audio sample period defined on the basis of an audio sampling frequency. Some digital signal processing units, however, may fail to carry out signal processing processes in synchronous with the audio sample period while the address bus 7 and the data bus 8 are occupied by the other digital signal processing unit. Failure to carry out a signal processing process on acoustic signal data within one audio sample period may generate discontinuous acoustic signals, thereby resulting in acoustic noises. The conventional digital signal processing apparatus encounters another drawback that remaining digital signal processing units may not carry out a signal processing process on the acoustic signal data while one digital signal processing unit occupies the address bus 7 and the data bus 8. The present invention contemplates resolution of such problems.

SUMMARY OF THE INVENTION

It is therefore an object of the present invention to provide a digital signal processing apparatus, in which a plurality of digital signal processing units can simultaneously utilize data stored in a shared memory section regardless of bus controls.

It is another object of the present invention to provide a digital signal processing method, in which a plurality of digital signal processing units can simultaneously utilize data stored in a shared memory section regardless of bus controls.

In accordance with a first aspect of the present invention, there is provided a digital signal processing apparatus comprising: input means for inputting a plurality of acoustic signals from an external outputting device; a plurality of digital signal processing units electrically connected with one another in series to form a closed loop, the digital signal processing units receiving and processing data elements including the acoustic signals as shared data elements in a sequential order; and output means for outputting a plurality of acoustic data elements processed and generated by the digital signal processing units to an external inputting device, whereby each of the digital signal processing units comprises: receiving means for receiving the shared data elements from a preceding digital signal processing unit; received data storing means for storing the shared data elements received by the receiving means into a receiving memory; copied data storing means for copying the shared data elements stored in the receiving memory to a shared memory section; acoustic signal processing means including one or more acoustic signal processing sections each for inputting the shared data elements stored in the shared memory section as an input signal, processing the shared data elements thus inputted, and writing an output signal into the shared memory section as shared data elements; transmitting data storing means for storing shared data elements stored in the shared memory section into a transmitting memory; and transmitting means for transmitting the shared data elements stored in the transmitting memory to a subsequent digital signal processing unit.

In the aforesaid digital signal processing apparatus, the receiving means of the digital signal processing unit may receive the shared data elements from a preceding digital signal processing unit by means of Direct Memory Access, and the received data storing means may store the shared data elements received by the receiving means into the receiving memory concurrently while the acoustic signal processing means is inputting and processing the shared data elements stored in the shared memory section, and writing an output signal into the shared memory section, and concurrently while the transmitting data storing means is storing shared data elements stored in the shared memory section into a transmitting memory, and the transmitting means is transmitting the shared data elements stored in the transmitting memory to a subsequent digital signal processing unit.

The aforesaid digital signal processing apparatus may further comprise: an external storing means connected with one or more of the digital signal processing units. Furthermore, the aforesaid digital signal processing apparatus may further comprise: a bus, through which the digital signal processing units are connected with one another in series to form a closed loop; and a plurality of switching means for selectively connecting and disconnecting respective digital signal processing units with and from the bus. Furthermore, the aforesaid digital signal processing apparatus may further comprise: shared data editing means for editing the shared data elements stored in the shared memory section.

In the aforesaid digital signal processing apparatus, each of the digital signal processing units may comprise: signal input means for inputting a plurality of acoustic data elements from an external outputting device; and signal output means for outputting a plurality of acoustic data elements to an external inputting device. The digital signal processing apparatus may further comprise: selecting means for allowing one or more of the digital signal processing units to be electrically connected with one another in series to form a closed loop such that the one or more of the digital signal processing units are operative to receive data elements including the acoustic signals as shared data elements, and to process the data elements, and allowing another one or more of the digital signal processing units to be electrically connected with one another in series to form another closed loop such that the another one or more of the digital signal processing units are operative to receive data elements including the acoustic signals as shared data elements, and to process the data elements.

In the aforesaid digital signal processing apparatus, each of the digital signal processing units may comprise: signal input means for inputting a plurality of acoustic data elements from an external outputting device; signal output means for outputting a plurality of acoustic data elements to an external inputting device; first attaching and removing means provided between the digital signal processing unit and a neighboring digital signal processing unit for selectively attaching and removing the digital signal processing unit to and from the neighboring digital signal processing unit; and second attaching and removing means provided between the signal input and output means and external input and output terminals for selectively attaching and removing the digital signal processing unit to and from the external input and output terminals, whereby the first attaching and removing means and the second attaching and removing means allow the digital signal processing unit to be selectively attached to and removed from the digital signal processing apparatus. The aforesaid digital signal processing apparatus may further comprise first detecting means for detecting whether or not the digital signal processing unit is removed from neighboring digital signal processing unit; and second detecting means for detecting whether or not the digital signal processing unit is removed from the external input and output terminals; and transmitting and receiving section switching means for closing a circuit opened by the digital signal processing unit to form a closed loop when the first detecting means detects that the digital signal processing unit is removed from neighboring digital signal processing unit.

In the aforementioned digital signal processing apparatus, the shared memory section may include a plurality of processing unit data areas respectively dedicated to the digital signal processing units such that each of the digital signal processing units is operative to write the shared data elements stored in the processing unit data areas dedicated to the digital signal processing unit. One or more of the acoustic signal processing means of the digital signal processing units include respective filtering sections each for inputting a shared data element stored in the shared memory section as an input signal, filtering the shared data elements thus inputted, and writing a filtered data element into the shared memory section as shared data elements. The aforementioned digital signal processing apparatus may further comprises: data reading means for cyclically reading the shared data elements filtered by the filtering sections from the shared memory section; and level meter display means for displaying levels of the shared data elements read by the data reading means.

Alternatively, the aforementioned digital signal processing apparatus may further comprise data reading means for cyclically reading one or more shared data elements from the shared memory section; filtering means for filtering the shared data elements read by the data reading means; and level meter display means for displaying levels of the shared data elements filtered by the filtering means.

In accordance with a second aspect of the present invention, there is provided a digital signal processing method comprising the steps of: (a) inputting a plurality of acoustic signals from an external outputting device; (b) storing data elements including the acoustic signals inputted in the step (a) as shared data elements in a sequential order; and (c) connecting plurality of digital signal processing units with one another in series to form a closed loop, the digital signal processing units receiving and processing data elements including the acoustic signals as shared data elements in a sequential order; and (d) outputting a plurality of acoustic data elements processed and generated by the digital signal processing units to an external inputting device. The step (c) may further comprise the steps of: (c1) each of the digital signal processing units receiving the shared data elements from a preceding digital signal processing unit; (c2) each of the digital signal processing units storing the shared data elements received in the step (c1) into a receiving memory; (c3) each of the digital signal processing units copying the shared data elements stored in the receiving memory to a shared memory section; (c4) each of the digital signal processing units further carrying out one or more acoustic signal processing processes, the acoustic signal processing process having steps of (c41) inputting the shared data elements stored in the shared memory section as an input signal, (c42) processing the shared data elements thus inputted, and (c43) writing an output signal into the shared memory section as shared data elements; (c5) each of the digital signal processing units storing shared data elements stored in the shared memory section into a transmitting memory; and (c6) each of the digital signal processing units transmitting the shared data elements stored in the transmitting memory to a subsequent digital signal processing unit.

BRIEF DESCRIPTION OF THE DRAWINGS

The present invention and many of the advantages thereof will be better understood from the following detailed description when considered in connection with the accompanying drawings, wherein.

DESCRIPTION OF THE PREFERRED EMBODIMENTS

Figure 1:
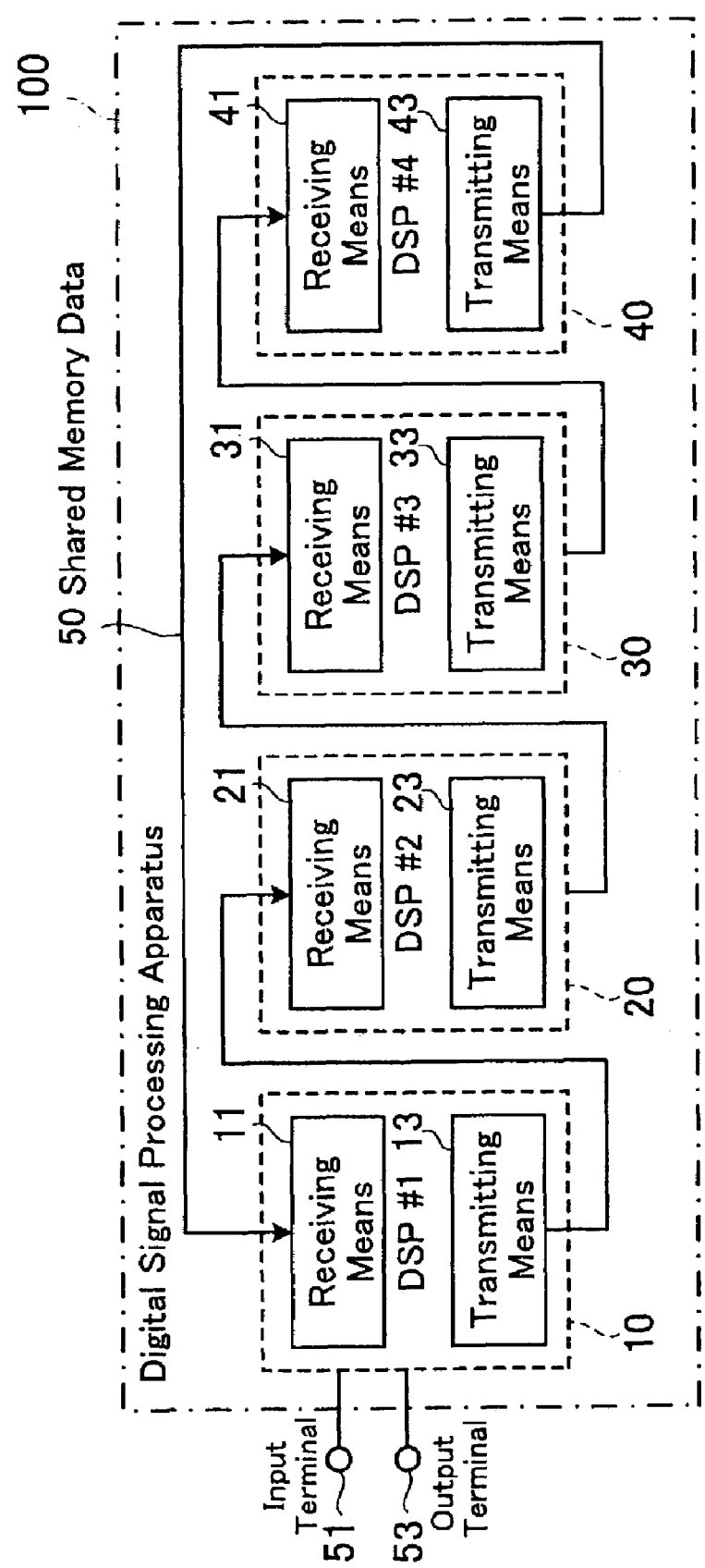
FIG. 1 is a schematic block diagram showing a first preferred embodiment of the digital signal processing apparatus according to the present invention.

The preferred embodiments of the digital signal processing apparatus according to the present invention will be described hereinafter with reference to the drawings shown in FIGS. 1 to 25. Throughout the following detailed description, similar reference characters refer to similar elements in all figures of the drawings.

Referring now to FIGS. 1 to 9 of the drawings, there is shown a first preferred embodiment of the digital signal processing apparatus 100 according to the present invention.

The first preferred embodiment of the digital signal processing apparatus 100 is shown in FIG. 1 as comprising an input terminal 51, a plurality of digital signal processing units, for example, first, second, third and fourth digital signal processing units 10, 20, 30, and 40, generally referred to simply as DSP#1, DSP#2, DSP#3, and DSP#4, and an output terminal 53. The input terminal 51 is adapted to input a plurality of acoustic signals from an external outputting device, not shown. The digital signal processing units 10, 20, 30, and 40 are electrically connected with one another in series to form a closed loop. The digital signal processing units 10, 20, 30, 40 are adapted to receive and process data elements including the acoustic signals as shared memory data elements 50, designated by "shared memory data" in a sequential order. The output terminal 53 is adapted to output a plurality of acoustic data elements processed and generated by the digital signal processing units 10, 20, 30, and 40 as shared memory data elements 50 to an external inputting device, not shown. The input terminal 51 and the output terminal 53 respectively constitute the input means and the output means according to the present invention. The shared memory data elements 50 constitute the shared data elements according to the present invention.

As shown in FIG. 1, the digital signal processing units 10, 20, 30, and 40 comprise receiving means 11, 21, 31, and 41 and transmitting means 13, 23, 33, and 43, respectively. Each of the receiving means 11, 21, 31, and 41 of respective digital signal processing units 10, 20, 30, and 40 is adapted to receive shared memory data elements 50 from a preceding digital signal processing unit 40, 10, 20, or 30 and each of the transmitting means 13, 23, 33, and 43 of respective digital signal processing units 10, 20, 30, and 40 is adapted to transmit shared memory data elements 50 to a subsequent digital signal processing unit 20, 30, 40, or 10.

This means that the receiving means 11 of the digital signal processing unit 10 is electrically connected with the transmitting means 43 of the digital signal processing unit 40, the receiving means 21 of the digital signal processing unit 20 is electrically connected with the transmitting means 13 of the digital signal processing unit 10, the receiving means 31 of the digital signal processing units 30 is electrically connected with the transmitting means 23 of the digital signal processing unit 20, and the receiving means 41 of the digital signal processing units 40 is electrically connected with the transmitting means 33 of the digital signal processing unit 30. The digital signal processing units 10, 20, 30, and 40 are thus electrically connected with one another in series to form a closed loop, enabling to circulate the shared memory data elements 50 from one digital signal processing unit to another in a sequential order, thereby making it possible for the digital signal processing units 10, 20, 30, and 40 to share the shared memory data elements 50 with one another.

The digital signal processing units 10, 20, 30, and 40 are similar in construction to one another. The digital signal processing unit 10 shown in FIG. 2 includes all the constructions and functions common to all the digital signal processing units 10, 20, 30, and 40. The description of the other digital signal processing units 20, 30, and 40 will be thus omitted from the following description.

Figure 2:
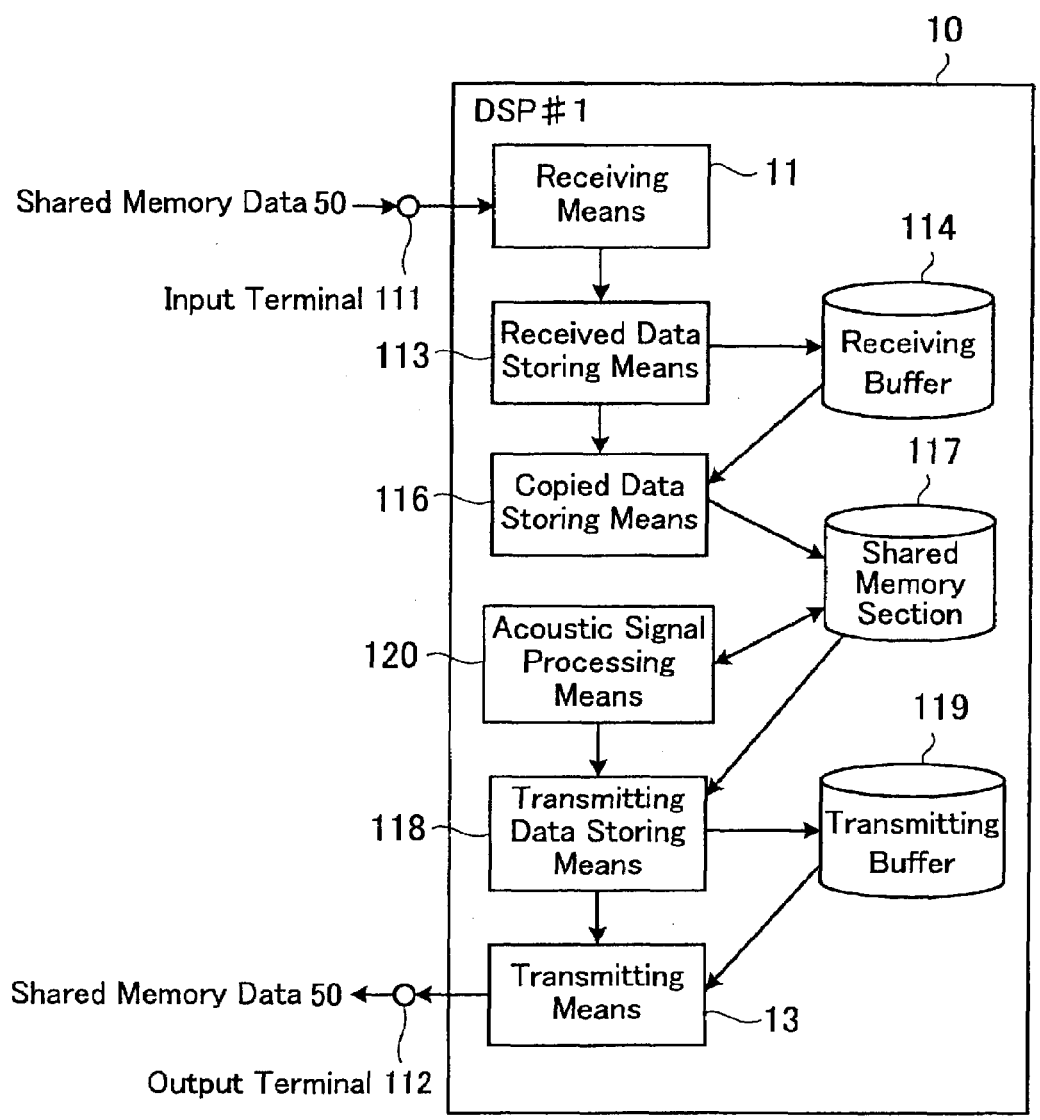
FIG. 2 is a schematic block diagram showing a digital signal processing unit forming part of the digital signal processing apparatus shown in FIG. 1.

As best shown in FIG. 2, the digital signal processing unit 10 comprises receiving means 11, received data storing means 113, a receiving buffer 114, copied data storing means 116, a shared memory section 117, transmitting data storing means 118, a transmitting buffer 119, acoustic signal processing means 120, and transmitting means 13. The receiving means 11 is adapted to receive the shared memory data elements 50 from a preceding digital signal processing unit 40. The received data storing means 113 is adapted to store the shared memory data elements 50 received by the receiving means 11 into a receiving buffer 114. The copied data storing means 116 is adapted to copy the shared memory data elements 50 stored in the receiving buffer 114 to a shared memory section 117. The acoustic signal processing means 120 is adapted to input the shared memory data elements 50 stored in the shared memory section 117 as an input signal, to process the shared memory data elements 50 thus inputted, and to generate and write an output signal into the shared memory section 117 as shared memory data elements 50. The transmitting data storing means 118 is adapted to store shared memory data elements 50 stored in the shared memory section 117 into a transmitting buffer 119. The transmitting means 13 is adapted to transmit the shared memory data elements 50 stored in the transmitting buffer 119 to a subsequent digital signal processing unit 20. The receiving buffer 114 and the transmitting buffer 119 respectively constitute the receiving memory and the transmitting memory according to the present invention.

The receiving means 11 and the transmitting means 13 may be terminals such as, for example, serial communication terminals generally used by the conventional DSP. The receiving buffer 114 and the transmitting buffer 119 may be storage means included in the digital signal processing unit 10 such as, for example, DRAM (Dynamic Random Access Memory) generally included in the conventional DSP. The shared memory section 117 is constituted by a plurality of shared memory data areas allocated to the storage means such as, for example, DRAMs, included in the respective digital signal processing units 10, 20, 30, and 40. In other words, the digital signal processing units 10, 20, 30, and 40 share respective storage means as the shared memory section 117.

Figure 3:
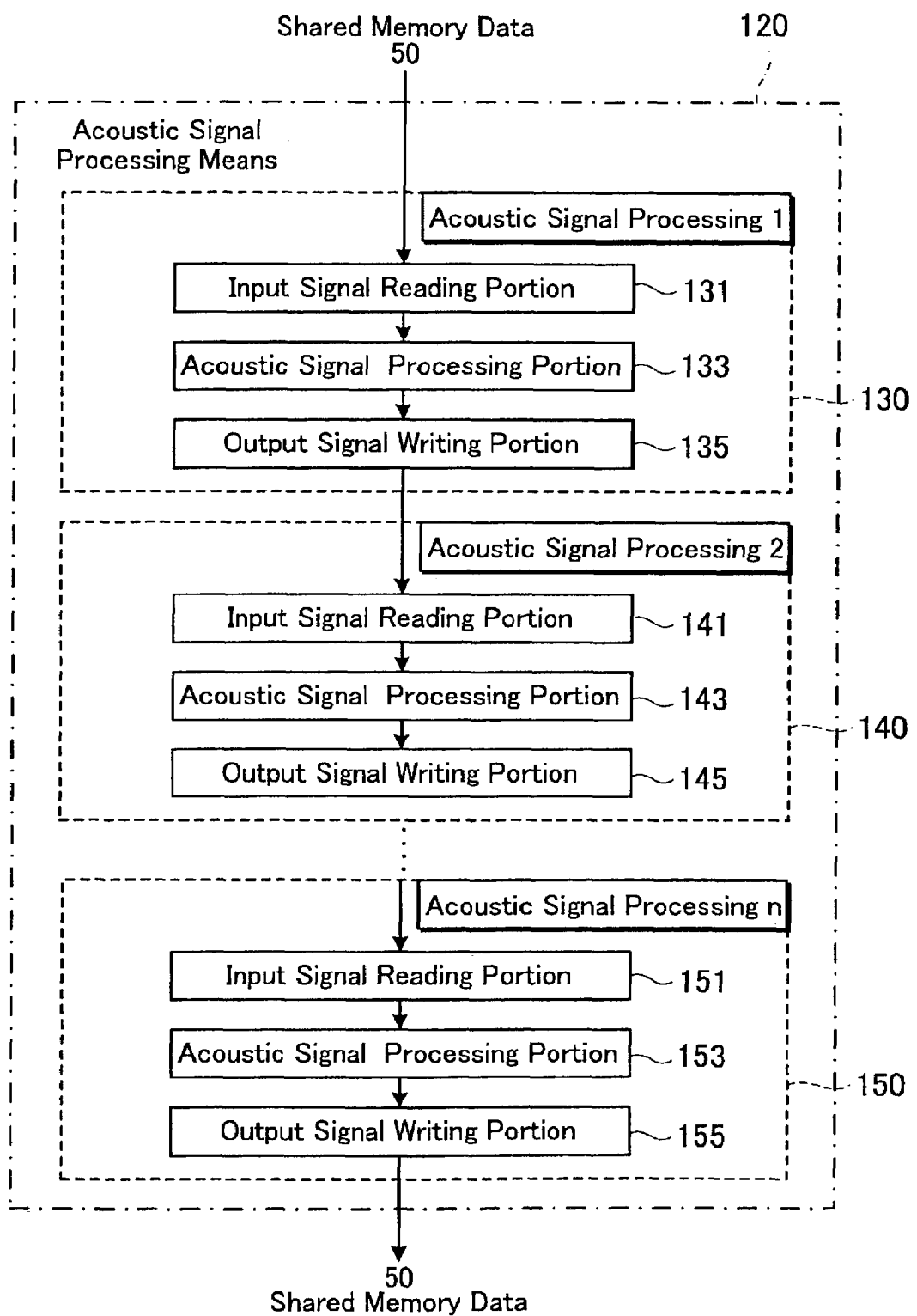
FIG. 3 is a schematic block diagram showing acoustic signal processing mean forming part of the digital signal processing unit shown in FIG. 2.

The acoustic signal processing means 120 of the digital signal processing unit 10 is shown in FIG. 3 as comprising one or more acoustic signal processing sections, for example, but not limited to, acoustic signal processing sections 130, 140, and 150. Each of the acoustic signal processing sections 130, 140, and 150 is adapted to input the shared memory data elements 50 stored in the shared memory section 117 as an input signal, to process the shared memory data elements 50 thus inputted, and to generate and write an output signal into the shared memory section 117 as shared memory data elements 50. The acoustic signal processing section may perform acoustic processing such as, for example, filtering processing or dynamics processing on the input signal.

More specifically, the acoustic signal processing sections 130, 140, and 150 include input signal reading portions 131, 141, and 151, acoustic signal processing portions 133, 143, and 153, and output signal writing portions 135, 145, and 155, respectively. Each of the input signal reading portions 131, 141, and 151 is adapted to input the shared memory data elements 50 stored in the shared memory section 117 as an input signal. Each of the acoustic signal processing portions 133, 143, and 153 is adapted to process the shared memory data elements 50 thus inputted and to generate an output signal. Each of the output signal writing portions 135, 145, and 155 is adapted to write the output signal thus generated into the shared memory section 117 as shared memory data elements 50.

Each of the digital signal processing units comprises n units of acoustic signal processing sections so as to perform n times of acoustic signal processing on the shared memory data elements 50. The acoustic signal processing means 120 of the digital signal processing unit 10 comprises, for example, 10 units of acoustic signal equalizing processing sections, the acoustic signal processing means 120 implements functions of the input signal reading portions, the acoustic signal equalizing processing portions and the output signal writing portions for 10 times to performs acoustic signal equalizing processing on the shared memory data elements 50 for 10 times. Preferably, the digital signal processing units 10, 20, 30, and 40 should store therein computer program product executable to implement functions of the received data storing means 113, the copied data storing means 116, the transmitting data storing means 118, and the acoustic signal processing means 120.

The acoustic signal processing process performed by the first embodiment of the digital signal processing apparatus 100 according to the present invention will be described hereinlater with reference to the flow chart shown in FIG. 4.

The digital signal processing apparatus is required to carry out acoustic signal processing in synchronization with audio sample frames. In general, the audio sampling frequency of 44.1 kHz, 48 kHz, or 96 kHz is applicable to an audio DSP for digital audio signal processing. An audio sample frame is calculated as the reciprocal of the audio sampling frequency. The audio sampling frequency of, for example, 48 kHz, is applied to the digital signal processing apparatus 100 for digital audio signal processing, the digital signal processing apparatus 100 is required to carry out acoustic signal processing in synchronization with every one audio sample frame of, which is calculated as the reciprocal of 48 kHz, i.e., 1/48000 second. Failure to complete an acoustic signal processing process on an acoustic signal in synchronous with one audio sample frame may generate discontinuous acoustic signals, thereby resulting in acoustic noises. This leads to the fact that the digital signal processing apparatus, in general, permits an interrupt to occur in synchronization with an audio sample frame period, and allows every acoustic signal processing process to be carried out and completed in accordance with the interrupt.

Figure 4:
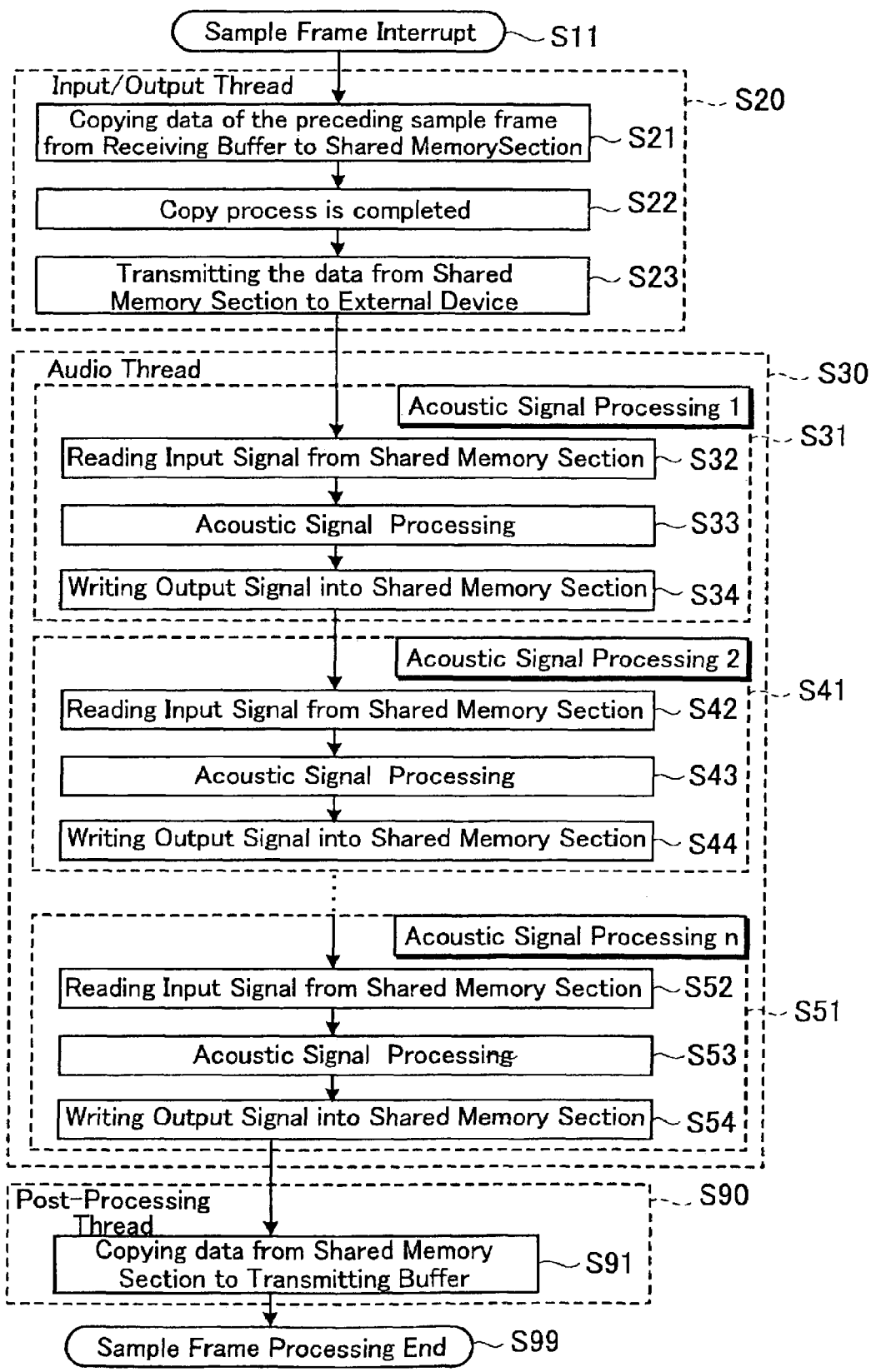
FIG. 4 is a flow chart explaining the flows of an example of digital signal processing process performed by the digital signal processing unit shown in FIG. 2.

As shown in FIG. 4, the digital signal processing apparatus 100 starts a sample frame processing process upon an audio sample frame interrupt occurring in step S11. Step S11 goes forward to step S20 of an input/output thread of inputting and/or outputting acoustic signal data elements from and/or to external device, not shown. Step S20 goes forward to step S30 of audio thread of carrying out audio signal processing on the signal data elements. Step S30 goes forward to step S90 of post-processing thread of preparing the data elements to be transmitted. Step S90 goes forward to step S99 in which the sample frame processing process ends.

Step S20 of the input/output thread comprises steps S21, S22, and S23. In step S21, the shared memory data elements 50 of the preceding sample frame stored in the receiving buffer 114 are copied to a shared memory section 117. Step S21 goes forward to step S22, in which the process of copying shared memory data elements 50 of the preceding sample frame stored in the receiving buffer 114 to the shared memory section 117 is completed. Step S22 goes forward to step S23, in which the shared memory data elements 50 stored in the shared memory section 117 are transmitted to the external device, not shown. Thus, the digital signal processing unit 10 is operated to output the shared memory data elements 50 including acoustic signal data already processed and stored therein up to the preceding audio sample frame to the external device in step S20.

Step S30 of audio thread comprises steps S31, S41, to S51 of performing n units of signal processing processes, viz., acoustic signal processing processes 1, 2, to n. This means that the digital signal processing unit 10 is operated to input the shared memory data elements 50 stored in the shared memory section 117 as an input signal in steps S32, S42, and S52, to process the shared memory data elements 50 thus inputted and to generate an output signal in steps S33, S43, and S53, and to write the output signal into the shared memory section 117 as shared memory data elements 50 in steps S34, S44, and S54.

Step S90 of post-processing thread comprises step S91, in which shared memory data elements 50 stored in the shared memory section 117 is stored into a transmitting buffer 119. The shared memory data elements 50 thus stored in the transmitting buffer 119 will be transmitted to the subsequent digital signal processing unit 20. Then, step S90 goes forward to step S99 in which the sample frame processing process ends.

The digital signal processing apparatus 100 is operated to carry out the above-mentioned sample frame processing process whenever an audio sample frame interrupt occurs.

The operation of the first embodiment of the digital signal processing apparatus 100 according to the present invention will be described hereinlater with reference to the drawings shown in FIGS. 1 through 9.

Figure 5:
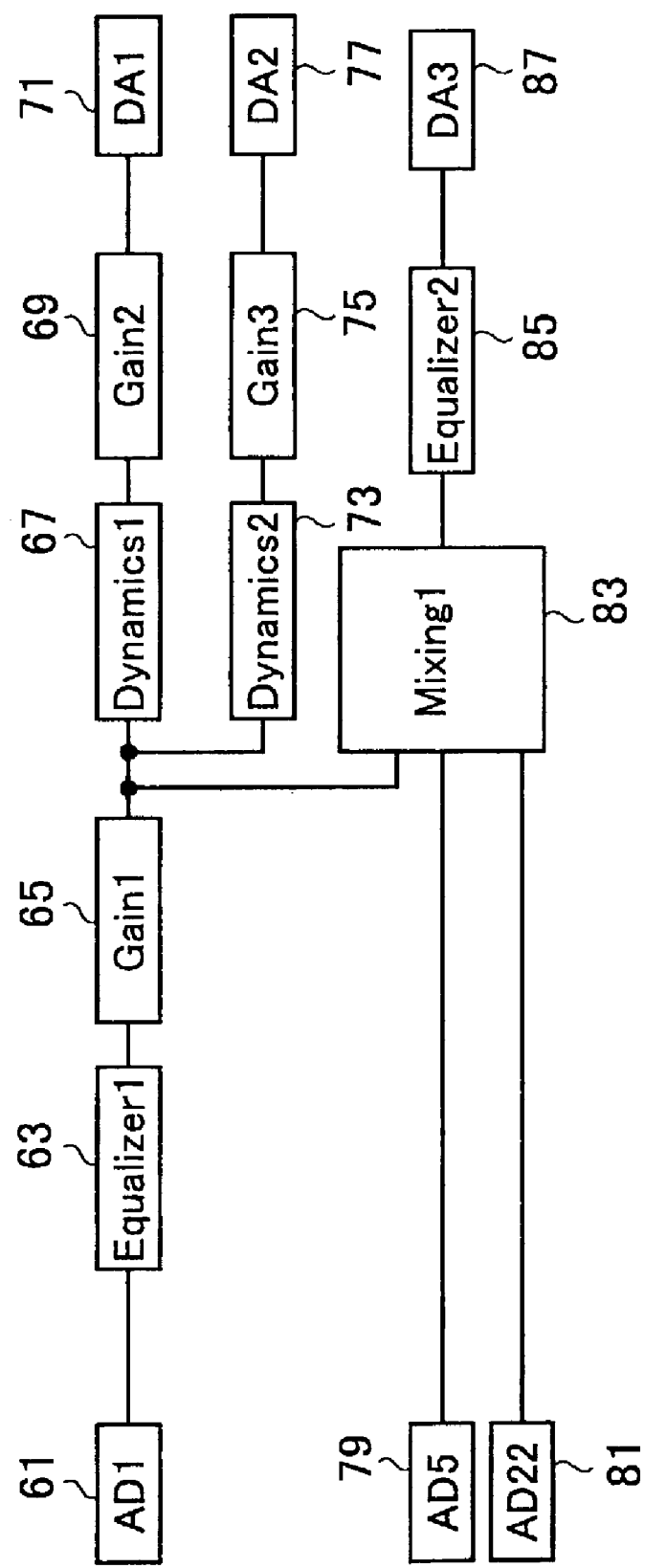
FIG. 5 is a block diagram showing an example of an acoustic signal processing system realized by the digital signal processing apparatus shown in FIG. 1.

It is hereinlater assumed that the present embodiment of the digital signal processing apparatus 100 is designed to realize an acoustic signal processing system, for example, shown in FIG. 5 for the purpose of simplifying the description and assisting in understanding about the whole operation of the digital signal processing apparatus 100. The present embodiment of the digital signal processing apparatus 100 comprises digital signal processing units 10, 20, 30, and 40 as described earlier with reference to the drawings shown in FIG. 1.

The acoustic signal processing system shown in FIG. 5 comprises processing portions including a first equalizer 63, designated by "Equalizer 1", for inputting a first input signal 61, designated by "AD1", a first gain 65, designated by "Gain 1" connected with the first equalizer 63, a first dynamics 67, designated by "Dynamics 1", connected with the first gain 65, and a second gain 69, designated by "Gain 2", connected with the first dynamics 67, for outputting a first output signal 71, designated by "DA1", wherein the first input signal 61 is a signal converted from analog to digital format and the first output signal 71 is a signal converted from digital to analog format.

The acoustic signal processing system further comprises processing portions including a second dynamics 73, designated by "Dynamics 2", connected with the first gain 65, and a third gain 75, designated by "Gain 3", connected with the second dynamics 73, for outputting a second output signal 77, designated by "DA2" wherein the second output signal 77 is a signal converted from digital to analog format.

The acoustic signal processing system further comprises processing portions including a mixing 83, designated by "Mixing 1", for inputting and adding up a second input signal 79, designated by "AD5", a third input signal 81, designated by "AD22", and an output signal from the first gain 65, a second equalizer 85, designated by "Equalizer 2", connected with the mixing 83, for outputting a third output signal 87, designated by "DA3" wherein the second input signal 79 and the third input signal 81 are signals respectively converted from analog to digital format, and the third output signal 87 is a signal converted from digital to analog format.

The functions of the processing portions forming part of the acoustic signal processing system shown in FIG. 5 are implemented by the four digital signal processing units. It is herein assumed that the functions of the first equalizer 63 and the first gain 65 are implemented by the digital signal processing unit 10, the functions of the first dynamics 67 and the second gain 69 are implemented by the digital signal processing unit 20, the functions of the second dynamics 73 and the third gain 75 are implemented by the digital signal processing unit 30, and the functions of the mixing 83 and the second equalizer 85 are implemented by the digital signal processing unit 40.

As described earlier, the shared memory section 117 is constituted by a plurality of shared memory data areas allocated to the storage means such as, for example, DRAMs, included in the respective digital signal processing units 10, 20, 30, 40. The shared memory data elements 50 stored in the shared memory section 117 are allocated in the shared memory data areas. The shared memory data elements 50 allocated in shared memory data areas and flows of the data elements received and transmitted between the shared memory data areas and the digital signal processing units to realize the acoustic signal processing system shown in FIG. 5 will be described hereinlater with reference to the drawings shown in FIGS. 6, 7, 8, and 9.

Figure 6:
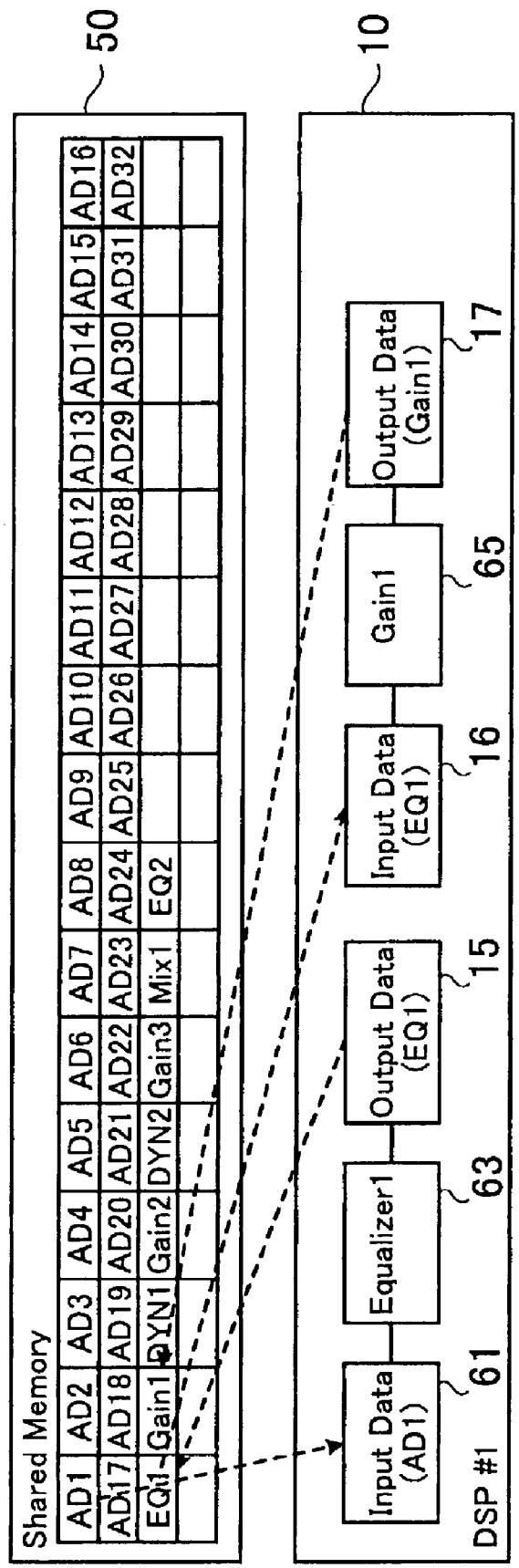
FIG. 6 is a block diagram explaining shared memory data elements allocated in shared memory data areas and flows of the data elements received and transmitted between the shared memory data areas and a first digital signal processing unit to realize the acoustic signal processing system shown in FIG. 5.

As shown in FIG. 6, the shared memory data areas comprise input signal data areas, for example, "AD1" to "AD32" allocated to input signals, and acoustic signal data areas, for example, "EQ1", "Gain 1", "DYN1", "Gain 2", "DYN2", "Gain 3", "Mix1", and "EQ2", allocated to output signals generated and outputted from the digital signal processing units 10, 20, 30, and 40. The input signal data areas, i.e., "AD1" to "AD32" are followed by the acoustic signal data areas, i.e., "EQ1", "Gain 1", "DYN1", "Gain 2", "DYN2", "Gain 3", "Mix1", and "EQ2". The shared memory data elements 50 are stored in the shared memory data areas thus constructed.

Firstly, the first digital signal processing unit 10 is operated to read and input a shared memory data element "AD1" from the signal data area AD1 as a first input signal 61 of the first equalizer 63 as shown in FIG. 6. The digital signal processing unit 10 is operated to generate shared memory data element "EQ1" as an output signal of the first equalizer 63, and store the shared memory data element EQ1 in the signal data area EQ1 as output data 15. The digital signal processing unit 10 is then operated to read and input the shared memory data element EQ1 from the signal data area EQ1 as an input signal 16 of the first gain 65. The digital signal processing unit 10 is operated to generate a shared memory data element "GAIN1" as an output signal of the first gain 65, and store the shared memory data element GAIN1 in the signal data area GAIN 1 as output data 17. Thus, the first digital signal processing unit 10 completes step S30 of the audio thread. Step S30 goes forward to step S90 of post-processing thread, in which the shared memory data elements 50 thus generated are transmitted to the subsequent second digital signal processing unit 20.

Figure 7:
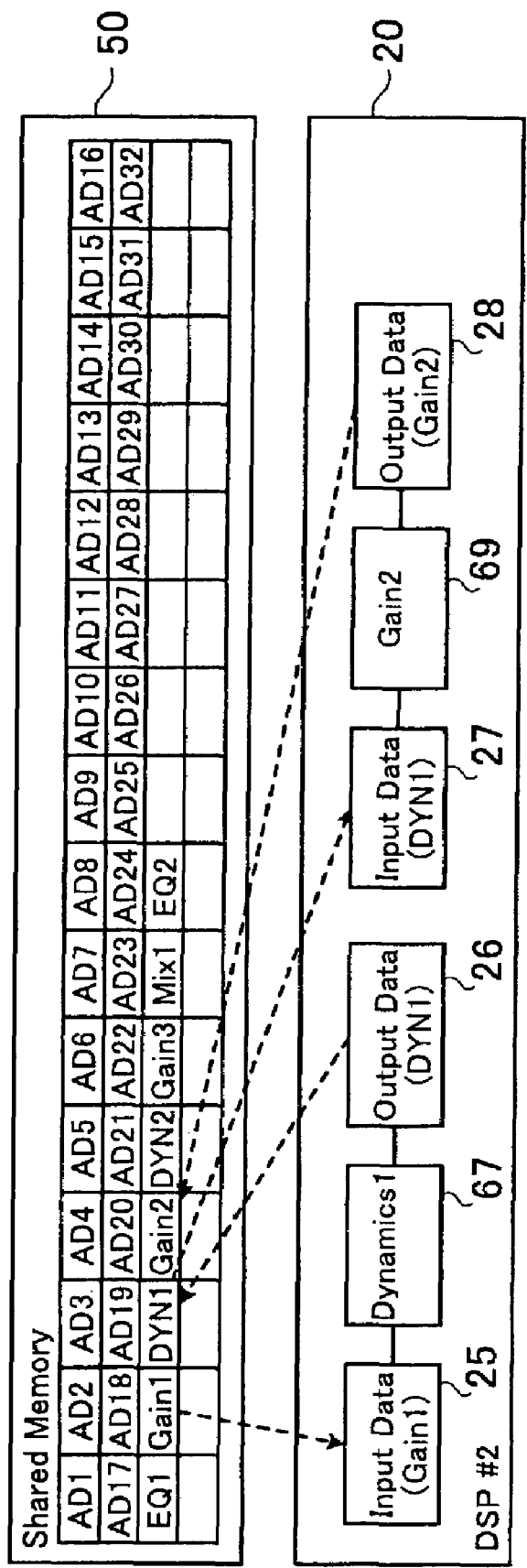
FIG. 7 is a block diagram explaining shared memory data elements allocated in the shared memory data areas and flows of the data elements received and transmitted between the shared memory data areas and a second digital signal processing unit to realize the acoustic signal processing system shown in FIG. 5.

Secondly, the second digital signal processing unit 20 is operated to read and input a shared memory data element "GAIN 1" from the signal data area GAIN 1 as a first input signal 25 of the first dynamics 67 as shown in FIG. 7. The digital signal processing unit 20 is operated to generate shared memory data element "DYN1" as an output signal of the first dynamics 67, and store the shared memory data element DYN1 in the signal data area DYN1 as output data 26. The digital signal processing unit 20 is then operated to read and input the shared memory data element DYN1 from the signal data area DYN1 as an input signal 27 of the second gain 69. The digital signal processing unit 20 is operated to generate shared memory data element "GAIN2" as an output signal of the second gain 69, and store the shared memory data element GAIN2 in the signal data area GAIN 2 as output data 28. Thus, the second digital signal processing unit 20 completes step S30 of the audio thread. Step S30 goes forward to step S90 of post-processing thread, in which the shared memory data elements 50 thus generated are transmitted to the subsequent third digital signal processing unit 30.

Figure 8:
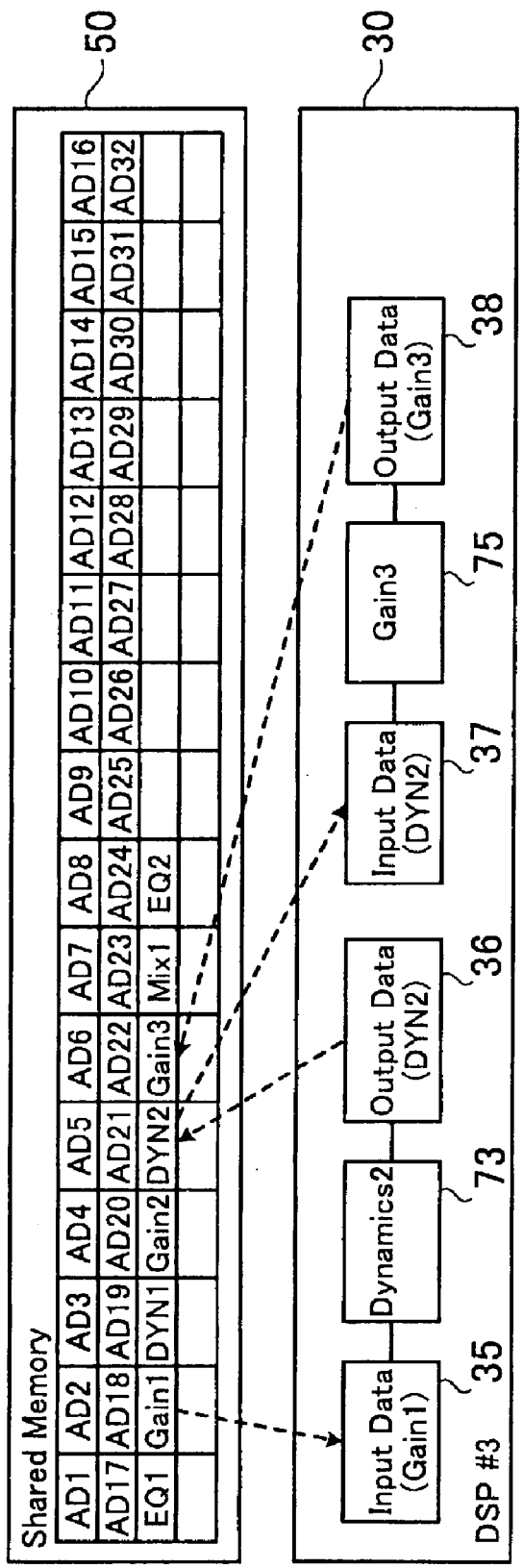
FIG. 8 is a block diagram explaining shared memory data elements allocated in the shared memory data areas and flows of the data elements received and transmitted between the shared memory data areas and a third digital signal processing unit to realize the acoustic signal processing system shown in FIG. 5.

Thirdly, the third digital signal processing unit 30 is operated to read and input a shared memory data element "GAIN 1" from the signal data area GAIN 1 as a first input signal 35 of the second dynamics 73 as shown in FIG. 8. The digital signal processing unit 30 is operated to generate shared memory data element "DYN2" as an output signal of the second dynamics 73, and store the shared memory data element DYN2 in the signal data area DYN2 as output data 36. The digital signal processing unit 30 is then operated to read and input the shared memory data element DYN2 from the signal data area DYN2 as an input signal 37 of the third gain 75. The digital signal processing unit 30 is operated to generate shared memory data element "GAIN3" as an output signal of the third gain 75, and store the shared memory data element GAIN3 in the signal data area GAIN 3 as output data 38. Thus, the third digital signal processing unit 30 completes step S30 of the audio thread. Step S30 goes forward to step S90 of post-processing thread, in which the shared memory data elements 50 thus generated are transmitted to the subsequent fourth digital signal processing unit 40.

Figure 9:
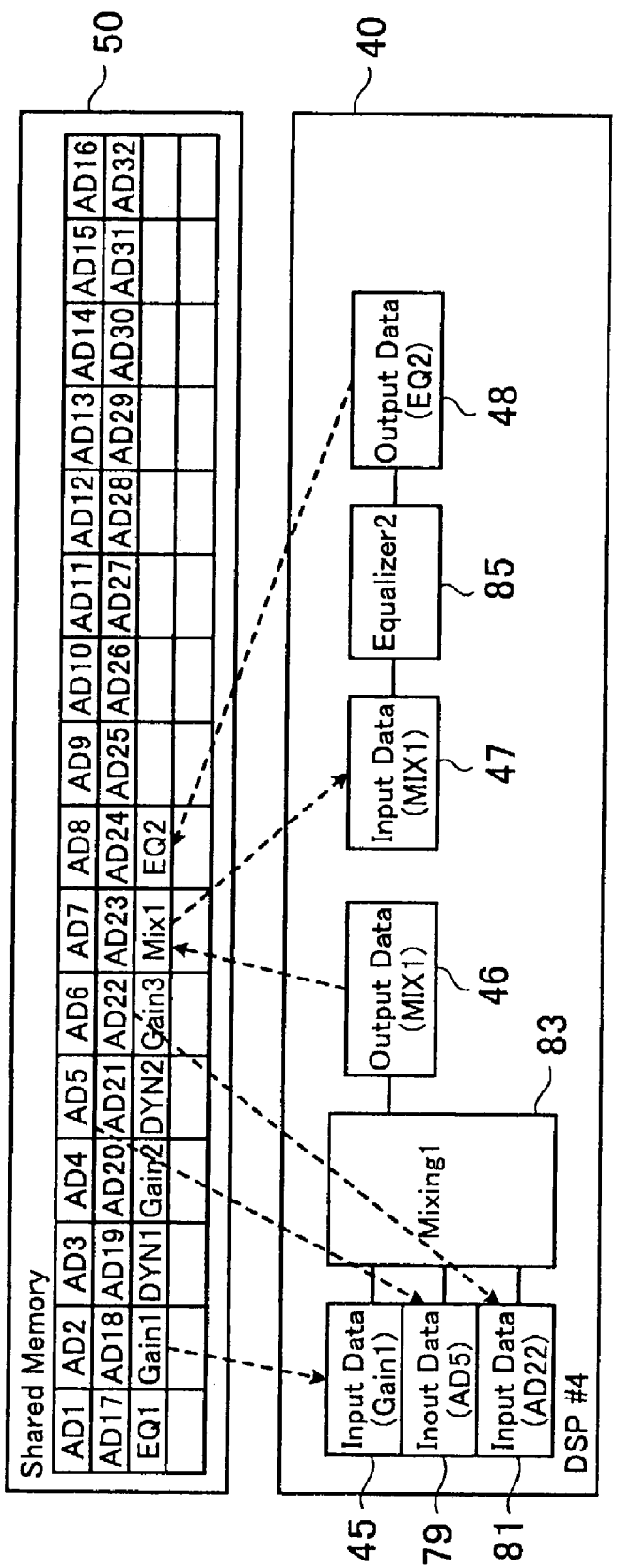
FIG. 9 is a block diagram explaining shared memory data elements allocated in the shared memory data areas and flows of the data elements received and transmitted between the shared memory data areas and a fourth digital signal processing unit to realize the acoustic signal processing system shown in FIG. 5.

Fourthly, the fourth digital signal processing unit 40 is operated to read and input shared memory data elements "GAIN1", "AD5", and "AD22" respectively from the signal data areas "GAIN1", "AD5", and "AD22" as input signals 45, 79, and 81 of the mixing 83 as shown in FIG. 9. The digital signal processing unit 40 is operated to generate shared memory data element "MIX1" as an output signal of the mixing 83, and store the shared memory data element MIX1 in the signal data area MIX1 as output data 46. The digital signal processing unit 40 is then operated to read and input the shared memory data element MIX1 from the signal data area MIX1 as an input signal 47 of the second equalizer 85. The digital signal processing unit 40 is operated to generate shared memory data element "EQ2" as an output signal of the second equalizer 85, and store the shared memory data element EQ2 in the signal data area EQ2 as output data 48. Thus, the fourth digital signal processing unit 40 completes step S30 of the audio thread. Step S30 goes forward to step S90 of post-processing thread, in which the shared memory data elements 50 thus generated are transmitted to the subsequent first digital signal processing unit 10.

The first digital signal processing unit 10 is then operated to input the shared memory data elements 50 thus generated and output the shared memory data elements 50 thus inputted to the external device through the output terminal 53 in step S20 of the input/output thread. The present embodiment of the digital signal processing apparatus 100 thus designed to realize the acoustic signal processing system shown in FIG. 5, is operative to read the shared memory data element "GAIN2" as the output signal of the second gain 69, the shared memory data element "GAIN3" as an output signal of the third gain 75, and the shared memory data element "EQ2" as an output signal of the second equalizer 85, to convert the shared memory data elements "GAIN2", "GAIN3", and "EQ2" thus read from digital to analog format, and to output the first output signals DA71, DA77, and DA87.

In the present embodiment of the digital signal processing apparatus 100, the digital signal processing units 10, 20, 30, and 40 can share respective storage means as the shared memory section 117. Furthermore, the digital signal processing units 10, 20, 30, and 40 can share the functions of the processing portions forming part of a large-scale acoustic signal processing system such as, for example, the acoustic signal processing system shown in FIG. 5 as if the digital signal processing units 10, 20, 30, and 40 were part of one DSP, thereby enabling to realize the acoustic signal processing system.

As will be seen from the foregoing description, it is to be understood that the first embodiment of the digital signal processing apparatus 100 according to the present invention comprising: input terminal 51 for inputting a plurality of acoustic signals from an external outputting device; a plurality of digital signal processing units 10, 20, 30, 40 electrically connected with one another in series to form a closed loop, the digital signal processing units 10, 20, 30, 40 receiving and processing data elements including the acoustic signals as shared memory data elements 50 in a sequential order; and output terminal 53 for outputting a plurality of acoustic data elements processed and generated by the digital signal processing units 10, 20, 30, 40 to an external inputting device, whereby each of the digital signal processing units 10, 20, 30, 40 comprises: receiving means 11 for receiving the shared memory data elements 50 from a preceding digital signal processing unit; received data storing means 113 for storing the shared memory data elements 50 received by the receiving means 11 into a receiving buffer 114; copied data storing means 116 for copying the shared memory data elements 50 stored in the receiving buffer 114 to a shared memory section 117; acoustic signal processing means 120 including one or more acoustic signal processing sections 130, 140, 150 each for inputting the shared memory data elements 50 stored in the shared memory section 117 as an input signal, processing the shared memory data elements 50 thus inputted, and writing an output signal into the shared memory section 117 as shared memory data elements 50; transmitting data storing means 118 for storing shared memory data elements 50 stored in the shared memory section 117 into a transmitting buffer 119; and transmitting means 13 for transmitting the shared memory data elements 50 stored in the transmitting buffer 119 to a subsequent digital signal processing unit 20, can circulate the shared memory data elements 50 from one digital signal processing unit to another in a sequential order, thereby making it possible for the digital signal processing units 10, 20, 30, 40 to share the shared memory data elements 50 with one another, thereby making it possible for a plurality of digital signal processing units 10, 20, 30, 40 to share the shared memory data elements 50 with one another, can simultaneously utilize data stored in a shared memory section regardless of bus controls. Furthermore, the present embodiment of the digital signal processing apparatus, in which a plurality of digital signal processing units 10, 20, 30, 40 can share the functions of the processing portions forming part of a large-sized acoustic signal processing system as if the digital signal processing units 10, 20, 30, and 40 were part of one DSP, can realize the large-scale acoustic signal processing system.

While it has been described in the present embodiment that the digital signal processing apparatus 100 comprises four digital signal processing units, the digital signal processing apparatus 100 according to the present invention may comprise any number of digital signal processing units.

While it has been described in the present embodiment that the input terminal 51 and the output terminal 53 are included in the digital signal processing unit 10 as shown in FIG. 1, the input terminal 51 and the output terminal 53 may be included in any one of the digital signal processing units 10, 20, 30, 40 of the digital signal processing apparatus 100 according to the present invention. Furthermore, the input terminal 51 and the output terminal 53 may not be included in the same digital signal processing unit. The input terminal 51 and the output terminal 53 may be included in different digital signal processing units of the digital signal processing apparatus 100 according to the present invention.

Referring then to the flaw chart shown in FIGS. 1, 2, 3, and 10 of the drawings, there is shown a second preferred embodiment of the digital signal processing apparatus 200 according to the present invention.

The second embodiment of the digital signal processing apparatus 200 is similar to the first embodiment of the digital signal processing apparatus 100 described with reference to FIG. 1, 2, 3, and 4 except for the fact that the receiving means 11 of the digital signal processing unit is operative to receive the shared memory data elements 50 from a preceding digital signal processing unit by means of Direct Memory Access, hereinlater referred to simply as DMA, and the digital signal processing units circulate the shared memory data elements 50 from one digital signal processing unit to another in a sequential order by means of DMA. The same constitutional elements are simply represented by the same reference numerals as those of the first embodiment, and will thus be omitted in description for avoiding tedious repetition.

The acoustic signal processing process performed by the second embodiment of the digital signal processing apparatus 200 according to the present invention will be described in detail with reference to the flow chart shown in FIG. 10.

Figure 10:
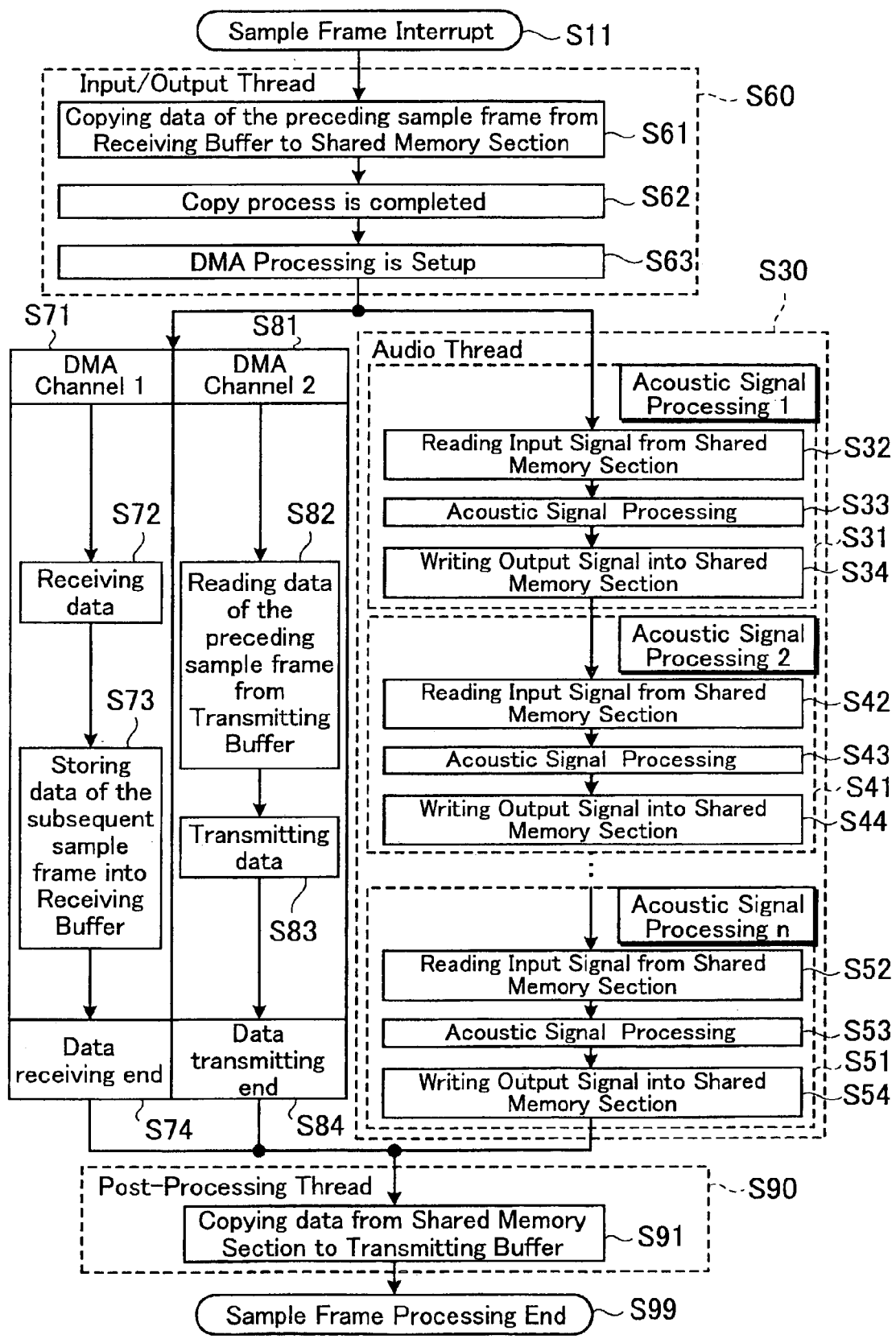
FIG. 10 is a flow chart explaining the flows of digital signal processing process performed by a second preferred embodiment of the digital signal processing apparatus according to the present invention.

As shown in FIG. 10, the digital signal processing apparatus 200 starts a sample frame processing process upon an audio sample frame interrupt occurring in step S11. Step S11 goes forward to step S60 of an input/output thread of inputting and/or outputting acoustic signal data elements from and/or to external device, not shown. Step S60 goes forward to step S71 of first DMA channel processing, step S81 of second DMA channel processing, and step S30 of audio thread of carrying out audio signal processing on the signal data elements. Step S71, step S81, and Step S30 go forward to step S90 of post-processing thread of preparing the data elements to be transmitted. Step S90 goes forward to step S99 in which the sample frame processing process ends. Step S30 of audio thread and step S90 of post-processing thread performed by the present embodiment are the sane as those performed by the first embodiment, and will thus be omitted in description.

The operation of the second embodiment of the digital signal processing apparatus 200 according to the present invention will be described hereinlater with reference to the flow chart shown in FIG. 10.

The digital signal processing apparatus 200 starts a sample frame processing process upon an audio sample frame interrupt occurring in step S11. Step S11 goes forward to step S60 of an input/output thread of inputting and/or outputting acoustic signal data elements from and/or to external device, not shown.

Step S60 of the input/output thread comprises steps S61, S62, and S63. In step S61, the shared memory data elements 50 of the preceding sample frame stored in the receiving buffer 114 are copied to a shared memory section 117. Step S61 goes forward to step S62, in which the process of copying shared memory data elements 50 of the preceding sample frame stored in the receiving buffer 114 to the shared memory section 117 is completed. Step S62 goes forward to step S63, in which DMA processing is setup. The DMA processing will be described later. In this step, processes such as, for example, initialization and register setup processes are performed to permit the DMA processing to be carried out.

Step S63 go forward to step S71, step S81, and step S30. In general, the DMA processing processes are carried out independent of the DSP core. This means that a plurality of processes of the DMA processing can be carried out in parallel to the DSP core processes. This leads to the fact that processes in steps S71, S81, and step S30 can be carried out concurrently.

In step S71, the process of the first DMA processing, i.e., the first DMA channel processing is carried out. It is hereinlater assumed that the receiving means 11 of the digital signal processing unit 10 is operated to receive shared memory data elements 50 from a preceding digital signal processing unit 40 by means of Direct Memory Access in step S72. Step S72 goes forward to step S73, in which the received data storing means 113 is operated to store the shared memory data elements 50 transmitted from the preceding digital signal processing unit 40 and received by the receiving means 11 into the receiving buffer 114 as the shared memory data elements 50 of the subsequent sample frame. Step S73 goes forward to step S74, in which the first DMA channel processing process ends.

In step S81, the process of the second DMA processing, i.e., the second DMA channel processing is carried out. The transmitting data storing means 118 is operated to read shared memory data elements 50 stored in the shared memory section 117 and to store the shared memory data elements 50 of the preceding sample frame thus read into the transmitting buffer 119. In step S82, the transmitting means 13 is operated to read the shared memory data elements 50 of the preceding sample frame from the transmitting buffer 119. Step S82 goes forward to step S83, in which the transmitting means 13 is operated to transmit the shared memory data elements 50 thus read to the subsequent digital signal processing unit 30. Step S83 goes forward to step S84, in which the second DMA channel processing ends. The above mentioned processes of DMA processing in steps S71 and S81 are carried out in parallel to the process of audio thread in step S30.

In the second embodiment of the digital signal processing apparatus 200, the receiving means 11 of a digital signal processing unit, for example, digital signal processing unit 10 is operative to receive the shared memory data elements 50 from a preceding digital signal processing unit, i.e., the digital signal processing unit 40 by means of Direct Memory Access, and the received data storing means 113 is operative to store the shared memory data elements 50 received by the receiving means 11 into the receiving buffer 114 in step S71 of the first DMA channel processing, concurrently while the acoustic signal processing means 120 is inputting and processing the shared memory data elements 50 stored in the shared memory section 117, and writing an output signal into the shared memory section 117, in step S30 of the audio thread, and concurrently while the transmitting data storing means 118 is storing shared memory data elements 50 stored in the shared memory section 117 into a transmitting buffer 119, and the transmitting means 13 is transmitting the shared memory data elements 50 stored in the transmitting buffer 119 to a subsequent digital signal processing unit, i.e., digital signal processing unit 20 in step S81 of the second DMA channel processing. The second embodiment of the digital signal processing apparatus 200 thus constructed, in which the audio thread process is carried out in step S30 concurrently while the first DMA channel processing of receiving shared memory data elements 50 of the subsequent sample frame and the second DMA channel processing of transmitting shared memory data elements of the preceding sample frame are performed in steps S71 and S81 by means of two DMA channels, makes it possible for a digital signal processing unit to transmit and receive shared memory data elements 50 between neighboring digital signal processing units concurrently while carrying out the audio thread process without deteriorating the performance of the digital signal processing unit. This leads the fact that the second embodiment of the digital signal processing apparatus 200 can carry out a large amount of acoustic signal processing processes.

Referring to the drawings shown in FIGS. 1, 2, 11, 12, and 13 of the drawings, a third preferred embodiment of the digital signal processing apparatus 300 according to the present invention will be described hereinlater.

Figure 11:
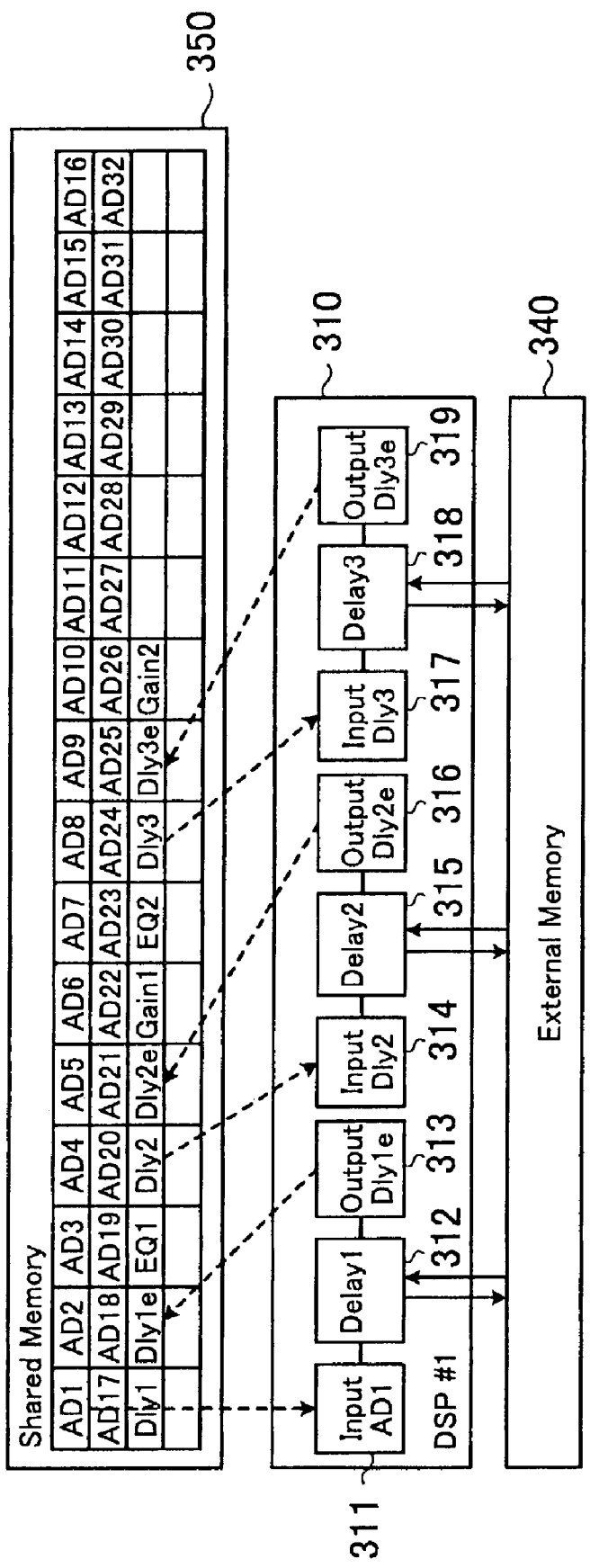
FIG. 11 is a block diagram explaining shared memory data elements allocated in shared memory data areas and flows of the data elements received and transmitted between a first digital signal processing unit and shared memory data areas constituting a third preferred embodiment of the digital signal processing apparatus according to the present invention.

The third embodiment of the digital signal processing apparatus 300 comprises a plurality of digital signal processing units, for example, digital signal processing units 310, 320, and 330. The third embodiment of the digital signal processing apparatus 300 is similar to the first or second embodiment of the digital signal processing apparatus 100, or 200 described with reference to FIG. 1, 2, 3, 4, and 10 except for the fact that the third embodiment of the digital signal processing apparatus 300 further comprises an external storing means 340 as shown in FIG. 11. The examiner storing means 340 may be an extended memory such as, for example, DRAM, connected with the digital signal processing apparatus 300. The same constitutional elements are simply represented by the same reference numerals as those of the first embodiment, and will thus be omitted in description for avoiding tedious repetition.

One or more of the digital signal processing units 310, 320, and 330 may be connected with the external storing means 340. The acoustic signal processing means of the digital signal processing units 310, 320, and 330 includes one or more delay sections for inputting shared memory data elements 350 stored in the shared memory section 117 as an input signal, storing the shared memory data elements 350 thus inputted in the external storing means 340 for a predetermined delay time period, and writing the shared memory data elements 350 thus delayed into the shared memory section 117 as shared memory data elements 350. It is hereinlater assumed that the digital signal processing unit 10 is connected with the external storing means 340 for the purpose of simplifying the description and assisting in understanding about the whole operation of the digital signal processing apparatus 300.

As described in the description of the previous embodiments, the shared memory section 117 is constituted by a plurality of shared memory data areas allocated to the storage means included in the respective digital signal processing units 310, 320, 330. The shared memory data elements 350 allocated in shared memory data areas and flows of the shared memory data elements 350 received and transmitted between the shared memory data areas and the digital signal processing units 310, 320, and 330 to realize an acoustic signal processing system will be described hereinlater with reference to the drawings shown in FIGS. 11, 12, and 13.

As shown in FIG. 11, the shared memory data areas comprise input signal data areas, for example, "AD1" to "AD32" allocated to input signals, and acoustic signal data areas, for example, "Dly1", "Dly1e", "EQ1", "Dly2", "Dly2e", "Gain 1", "EQ2", "Dly3", "Dly3e", and "Gain2", allocated to output signals generated and outputted from the digital signal processing units 310, 320, and 330. The input signal data areas, i.e., "AD1" to "AD32" are followed by the acoustic signal data areas, i.e., "Dly1", "Dly1e", "EQ1", "Dly2", "Dly2e", "Gain 1", "EQ2", "Dly3", "Dly3e", and "Gain2". The shared memory data elements 350 are stored in the shared memory data areas thus constructed.

The operation of the third embodiment of the digital signal processing apparatus 300 according to the present invention will be described hereinlater with reference to FIGS. 11 to 13.

Firstly, the first digital signal processing unit 310 is operated to read and write acoustic data elements from and into the external storing means 340, to delay the acoustic data elements for a predetermined delay time period, and implement first, second, and third delays 312, 315, and 318 during the audio thread process. This means that the digital signal processing unit 310 is operated to read and input a shared memory data element "AD1" of the shared memory data elements 350 from the signal data area AD1 as an input signal 311 of the first delay 312, "Delay1", as shown in FIG. 11. The digital signal processing unit 310 is operated to store the input signal 311 into the external storing means 340 for a predetermined delay time period. The digital signal processing unit 310 is then operated to read and input a data element "Dly1e" from the external storing means 340 as an output signal 313 of the first delay 312 to be stored in the signal data area Dly1e as the output signal 313. The first delay 312 constitutes the delay section according to the present invention.

The digital signal processing unit 310 is operated to read and input a shared memory data element "Dly2" of the shared memory data elements 350 from the signal data area Dly2 as an input signal 314 of the second delay 315, "Delay2". The digital signal processing unit 310 is operated to store the input signal 314 into the external storing means 340 for a predetermined delay time period. The digital signal processing unit 310 is then operated to read and input a data element "Dly2e" from the external storing means 340 as an output signal 316 of the second delay 315 to be stored in the signal data area Dly2e as the output signal 316.

The digital signal processing unit 310 is operated to read and input a shared memory data element "Dly3" of the shared memory data elements 350 from the signal data area Dly3 as an input signal 317 of the third delay 318, "Delay3". The digital signal processing unit 310 is operated to store the input signal 317 into the external storing means 340 for a predetermined delay time period. The digital signal processing unit 310 is then operated to read and input a data element "Dly3e" from the external storing means 340 as an output signal 319 of the third delay 318 to be stored in the signal data area Dly3e as the output signal 319.

Figure 12:
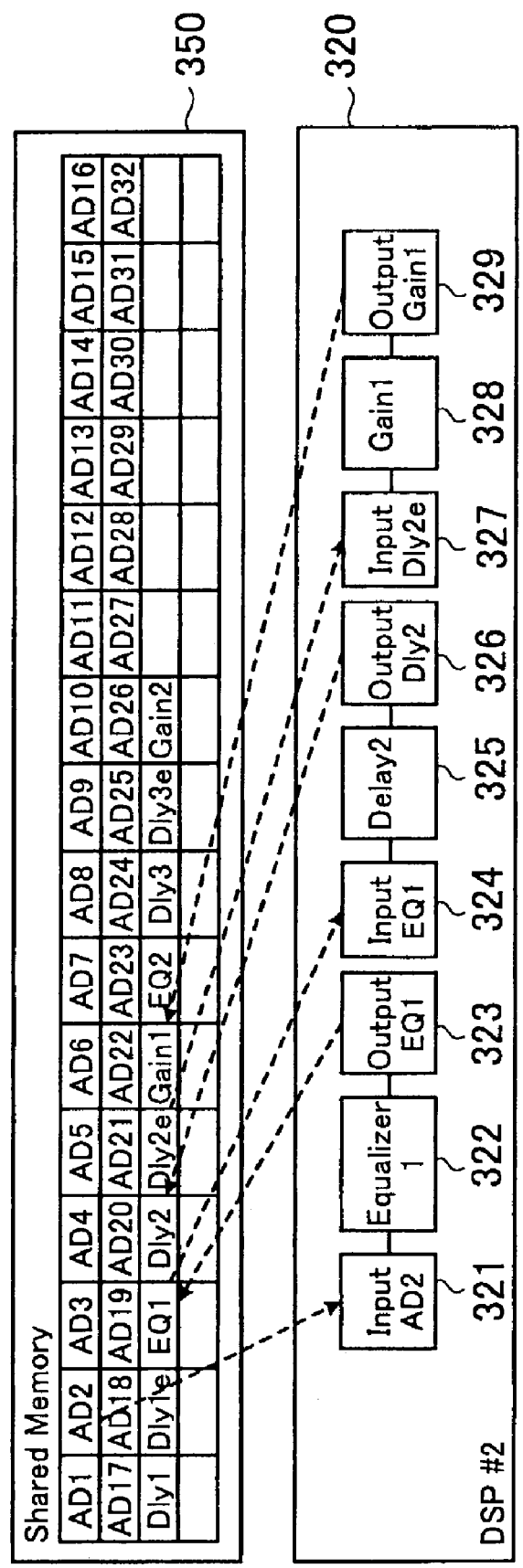
FIG. 12 is a block diagram explaining shared memory data elements allocated in the shared memory data areas and flows of the data elements received and transmitted between a second digital signal processing unit and shared memory data areas constituting the third preferred embodiment of the digital signal processing apparatus according to the present invention.

Secondly, the second digital signal processing unit 320 is operated to implement a first equalizer 322, a second delay 325 connected with the first equalizer 322, and a first gain 328 connected with the second delay 325 during the audio thread process as shown in FIG. 12. The delay process of the second delay 325 of the second digital signal processing unit 320 is actually performed by the second delay 315 of the first digital signal processing unit 310. This means that the second digital signal processing unit 320 is designed to read and input the shared memory data element Dly2e, which has been stored by the second delay 315 of the digital signal processing unit 310 for a predetermined delay time period.

More specifically, the second digital signal processing unit 320 is operated to read a shared memory data element "AD2" of the shared memory data elements 350 from the signal data area AD2 as an input signal 321 of the first equalizer 322, "Equalizer 1", as shown in FIG. 12. The digital signal processing unit 320 is operated to store an output signal 323 of the first equalizer 322 in the signal data area EQ1 as a shared memory data element "EQ1". The digital signal processing unit 320 is then operated to read and input the shared memory data element "EQ1" as an input signal 324 of the second delay 325. As described earlier, the second delay 325 does not actually carry out a delay process. The digital signal processing unit 320 is operated to store the input signal 324 thus inputted into the signal data area Dly2 as a shared memory data element "Dly2", i.e., an output signal 326 of the second delay 325.

The digital signal processing unit 320 is operated to read and input a shared memory data element "Dly2e" as an input signal 327 of the first gain 328, designated by "Gain 1". The shared memory data element Dly2e has been stored by the second delay 315 of the first digital signal processing unit 310 in the external storing means 340 for the predetermined delay time period. The digital signal processing unit 320 is operated to store a shared memory data element "Gain1" in the signal data area Gain 1 as an input signal 329 of the first gain 328.

Figure 13:
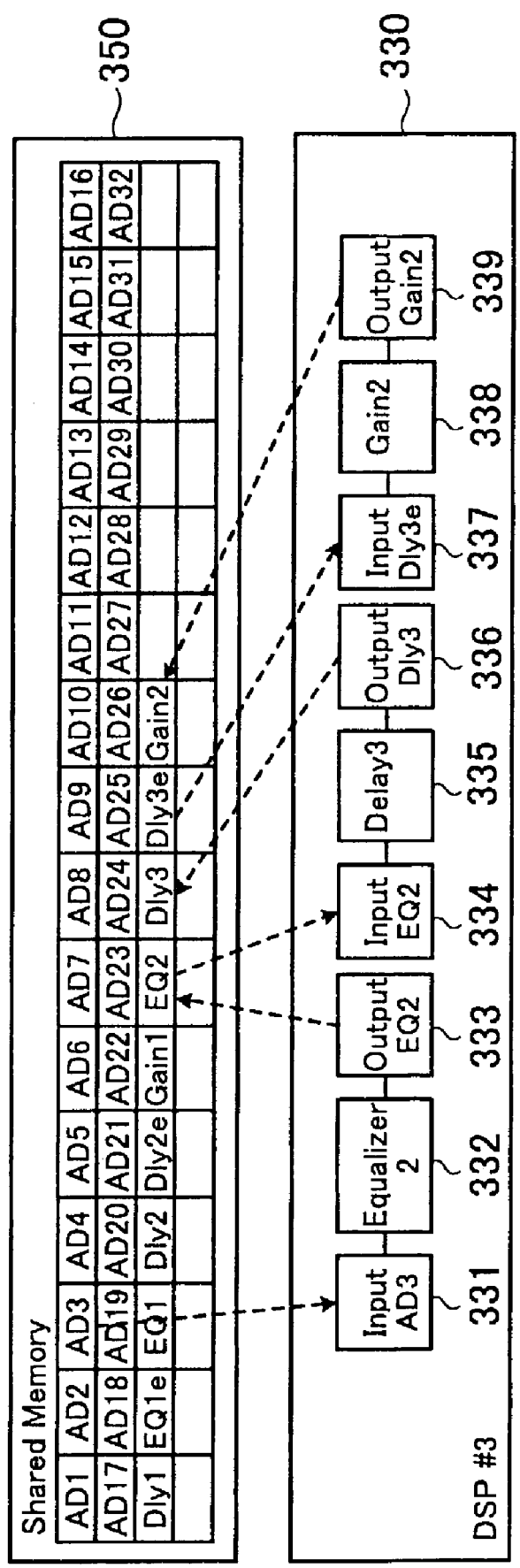
FIG. 13 is a block diagram explaining shared memory data elements allocated in the shared memory data areas and flows of the data elements received and transmitted between a third digital signal processing unit and shared memory data areas constituting the third preferred embodiment of the digital signal processing apparatus according to the present invention.

Thirdly, the third digital signal processing unit 330 is operated to implement a second equalizer 332, a third delay 335 connected with the second equalizer 332, and a second gain 338 connected with the third delay 335 during the audio thread process as shown in FIG. 13. The delay process of the third delay 335 of the third digital signal processing unit 330 is actually performed by the third delay 318 of the first digital signal processing unit 310. This means that the third digital signal processing unit 330 is designed to read and input the shared memory data element Dly3e, which has been stored by the third delay 318 of the digital signal processing unit 310 for a predetermined delay time period.

More specifically, the third digital signal processing unit 330 is operated to read a shared memory data element "AD3" of the shared memory data elements 350 from the signal data area AD3 as an input signal 331 of the second equalizer 332, "Equalizer 2", as shown in FIG. 13. The digital signal processing unit 330 is operated to store an output signal 333 of the second equalizer 332 in the signal data area EQ2 as a shared memory data element "EQ2". The digital signal processing unit 330 is then operated to read and input the shared memory data element "EQ2" as an input signal 334 of the third delay 335. As described earlier, the third delay 335 does not actually carry out a delay process. The digital signal processing unit 330 is operated to store the input signal 334 thus inputted into the signal data area Dly3 as a shared memory data element "Dly3", i.e., an output signal 336 of the third delay 335.

The digital signal processing unit 330 is operated to read and input a shared memory data element "Dly3e" as an input signal 337 of the second gain 338, designated by "Gain 2". The shared memory data element Dly3e has been stored by the third delay 318 of the first digital signal processing unit 310 in the external storing means 340 for the predetermined delay time period. The digital signal processing unit 330 is operated to store a shared memory data element "Gain2" in the signal data area Gain 2 as an input signal 339 of the second gain 338.

While it has been described in the above that the external storing means 340 is connected with the first digital signal processing unit 310, the external storing means 340 may be connected with any one or more of the digital signal processing units of the digital signal processing apparatus according to the present invention.

As described in the above, the digital signal processing apparatus 300 comprising an external storing means 340 connected with one or more of the digital signal processing units, enables all of digital signal processing units to share data elements stored in the external storing means 340.

From the foregoing description, it is to be understood that the third embodiment of the digital signal processing apparatus 300 according to the present invention, which comprises an external storing means 340 connected with one or more of the digital signal processing units, enables all of digital signal processing units to share data elements, which have been stored in the external storing means 340 and thus delayed.

Figure 14:
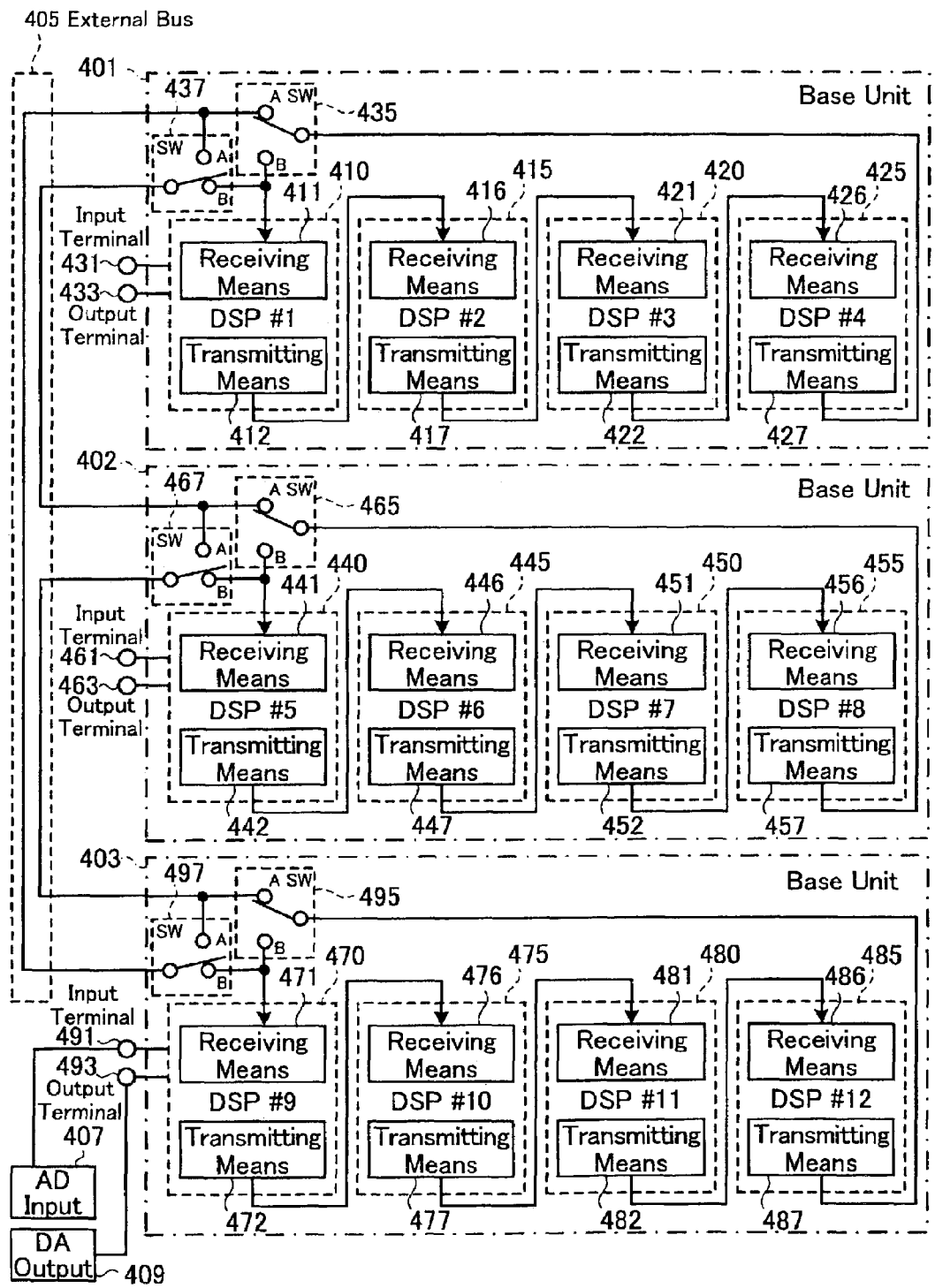
FIG. 14 is a schematic block diagram showing a fourth preferred embodiment of the digital signal processing apparatus according to the present invention.

Referring to the drawings shown in FIG. 14 of the drawings, there is shown a fourth preferred embodiment of the digital signal processing apparatus 400 according to the present invention.

The fourth embodiment of the digital signal processing apparatus 400 comprises a plurality of digital signal processing units, for example, digital signal processing units 410 to 485 designated by "DSP#1" to "DSP#12", input terminals 431, 461, and 491 and output terminals 433, 463, and 493. The digital signal processing units 410 to 425 designated by DSP#1 to DSP4 form a first base unit 401, the digital signal processing units 440 to 455 designated by DSP#5 to DSP8 form a second base unit 402, and the digital signal processing units 470 to 485 designated by DSP#9 to DSP#12 form a third base unit 403. The base units 401, 402, and 403 are similar in construction to the first embodiment of the digital signal processing apparatus 100. The same constitutional elements are simply represented by the same reference numerals as those of the first embodiment, and will thus be omitted in description for avoiding tedious repetition.

The digital signal processing apparatus 400 further comprising: a bus 405, through which the digital signal processing units 410, 415, to 485 are connected with one another in series to form a closed loop, and a plurality of switching means, for example, switching means 435, 437, 465, 467, 495, 497 for selectively connecting and disconnecting respective digital signal processing units 410, 415, to 485 with and from the bus 405.

One or more of the digital signal processing units, for example, digital signal processing units 410 to 425 are allowed to receive and transmit data elements from and to neighboring digital signal processing units 440, 485 when the switching means 435, 437, 465, 467, 495, 497 connect the one or more of the digital signal processing units 410 to 425 with the bus 405, and the one or more of digital signal processing units 410 to 425 are not allowed to receive and transmit data elements from and to neighboring digital signal processing units 440, 485 while allowing remaining digital signal processing units DSP#5 to DSP#12 to be electrically connected with one another in series to form another closed loop such that the remaining digital signal processing units 440 to 485 are operative to receive data elements including the acoustic signals as shared memory data elements 50, and to process the data elements when the switching means 435, 437, 465, 467, 495, 497 disconnect the one or more of the digital signal processing units 410 to 425 from the bus 405.

The switching means 435, 437, 465, 467, 495, 497 are adapted to selectively connect and disconnect respective base units 401, 402, and 403 with and from the bus 405 as shown in FIG. 14 for the purpose of simplifying the description and assisting in understanding about the whole operation of the digital signal processing apparatus 400. It is hereinlater assumed that the present embodiment of the four base units 401, 402, and 403 are connected with one another through the bus 405 with the result that the digital signal processing units 410, 415 to 485, designated by DSP#1, DSP#2, to DSP#12 are connected with one another in series to form a closed loop.

The first base unit 401 comprises four digital signal processing units 410, 415, 420, and 425 designated by DSP#1, DSP#2, DSP#3, and DSP#4. Similar to the first embodiment of the digital signal processing apparatus 100, the digital signal processing units 410, 415, 420, and 425 comprise receiving means 411, 416, 421, and 426 and transmitting means 412, 417, 422, and 427, respectively. Each of the receiving means 411, 416, 421, and 426 of respective digital signal processing units 410, 415, 420, and 425 is adapted to receive shared memory data elements 50 from a preceding digital signal processing unit 425, 410, 415, or 420, and each of the transmitting means 412, 417, 422, and 427 of respective digital signal processing units 410, 415, 420, and 425 is adapted to transmit shared memory data elements 50 to a subsequent digital signal processing unit 415, 420, 425, and 410. The first base unit 401 further comprises an input terminal 431, an output terminal 433, a first switch 435 and a second switch 437. The input terminal 431 is adapted to input a plurality of acoustic signals converted from analog to digital format from an external outputting device, not shown. The output terminal 433 is adapted to output a plurality of acoustic signals converted from digital to analog format to an external inputting device, not shown. The first and second switches 435 and 437 are adapted to selectively connect and disconnect the first base unit 401 with and from the bus 405.

The second base unit 402 comprises four digital signal processing units 440, 445, 450, and 455 designated by DSP#5, DSP#6, DSP#7, and DSP#8. Similar to the first embodiment of the digital signal processing apparatus 100, the digital signal processing units 440, 445, 450, and 455 comprise receiving means 441, 446, 451, and 456 and transmitting means 442, 447, 452, and 457, respectively.

Each of the receiving means 441, 446, 451, and 456 of respective digital signal processing units 440, 445, 450, and 455 is adapted to receive shared memory data elements 50 from a preceding digital signal processing unit 455, 440, 445, or 450, and each of the transmitting means 442, 447, 452, and 457 of respective digital signal processing units 440, 445, 450, and 455 is adapted to transmit shared memory data elements 50 to a subsequent digital signal processing unit 445, 450, 455, and 440. The second base unit 402 further comprises an input terminal 461, an output terminal 463, a first switch 465 and a second switch 467. The input terminal 461 is adapted to input a plurality of acoustic signals converted from analog to digital format from an external outputting device, not shown. The output terminal 463 is adapted to output a plurality of acoustic signals converted from digital to analog format to an external inputting device, not shown. The first and second switches 465 and 467 are adapted to selectively connect and disconnect the second base unit 402 with and from the bus 405.

The third base unit 403 comprises four digital signal processing units 470, 475, 480, and 485 designated by DSP#9, DSP#10, DSP#11, and DSP#12. Similar to the first embodiment of the digital signal processing apparatus 100, the digital signal processing units 470, 475, 480, and 485 comprise receiving means 471, 476, 481, and 486 and transmitting means 472, 477, 482, and 487, respectively. Each of the receiving means 471, 476, 481, and 486 of respective digital signal processing units 470, 475, 480, and 485 is adapted to receive shared memory data elements 50 from a preceding digital signal processing unit 485, 470, 475, or 480, and each of the transmitting means 472, 477, 482, and 487 of respective digital signal processing units 470, 475, 480, and 485 is adapted to transmit shared memory data elements 50 to a subsequent digital signal processing unit 475, 480, 485, and 470. The third base unit 403 further comprises an input terminal 491, an output terminal 493, a first switch 495 and a second switch 497. The input terminal 491 is adapted to input a plurality of acoustic signals converted from analog to digital format from an external outputting device, not shown. The output terminal 493 is adapted to output a plurality of acoustic signals converted from digital to analog format to an external inputting device, not shown. The first and second switches 495 and 497 are adapted to selectively connect and disconnect the third base unit 403 with and from the bus 405.

In the present embodiment, each of the first and second switches, 435, 437, 465, 467, 495, and 497 includes one input portion and two output portions A and B, and the input and output terminals 491 and 493 of the third base unit 403 are connected with AD input section 407 and DA output section 409, respectively. The AD input section 407 is connectable with an external device, and adapted to input a signal therethrough and convert the signal thus inputted from analog to digital format. The DA input section 409 is connectable with an external device, and adapted to convert a signal from digital to analog format and output the signal thus converted therethrough.

In the first base unit 401, the input portion of the first switch 435 is connected with the transmitting means 427 of the fourth digital signal processing unit 425, the output portion A of the first switch 435 is connected with the input portion of the second switch 497 of the third base unit 403 through the bus 405, and the output portion B of the first switch 435 is connected with the receiving means 411 of the first digital signal processing unit 410. The input portion of the second switch 437 is connected with the output portion A of the second switch 467 of the fifth digital signal processing unit 440 of the second base unit 402 through the bus 405, the output portion A of the second switch 437 is connected with the input portion of the second switch of the third base unit 403, and the output portion B of the second switch 437 is connected with the receiving means 411 of the first digital signal processing unit 410. In the present embodiment, the input terminal 431 and the output terminal 433 of the first base unit 401 are not connected with external terminals. In the case that the first base unit 401 alone should be connected with the bus 405, the input terminal 431 and the output terminal 433 may be connected with the AD input section 407 and DA output section 409, respectively.

From the foregoing description, it is to be understood that the first switch 435 of the fourth digital signal processing unit 425 is switched to the output portion A and the second switch 437 of the first digital signal processing unit 410 is switched to the output portion B in order to connect the first base unit 401 with the bus 405 as shown in FIG. 14 while, on the other hand, the first switch 435 of the fourth digital signal processing unit 425 is switched to the output portion B and the second switch 437 of the first digital signal processing unit 410 is switched to the output portion A in order to disconnect the first base unit 401 from the bus 405.

In the second base unit 402, the input portion of the first switch 465 is connected with the transmitting means 457 of the eighth digital signal processing unit 455, the output portion A of the first switch 465 is connected with the input portion of the second switch 437 of the first base unit 401 through the bus 405, and the output portion B of the first switch 465 is connected with the receiving means 441 of the fifth digital signal processing unit 440. The input portion of the second switch 467 is connected with the output portion A of the second switch 497 of the ninth digital signal processing unit 470 of the third base unit 403 through the bus 405, the output portion A of the second switch 467 is connected with the input portion of the second switch 437 of the first base unit 401, and the output portion B of the second switch 467 is connected with the receiving means 441 of the fifth digital signal processing unit 450. In the present embodiment, the input terminal 461 and the output terminal 463 of the second base unit 402 are not connected with external terminals. In the case that the second base unit 402 alone should be connected with the bus 405, the input terminal 461 and the output terminal 463 may be connected with the AD input section 407 and DA output section 409, respectively.

From the foregoing description, it is to be understood that the first switch 465 of the eighth digital signal processing unit 455 is switched to the output portion A and the second switch 467 of the fifth digital signal processing unit 440 is switched to the output portion B in order to connect the second base unit 402 with the bus 405 as shown in FIG. 14 while, on the other hand, the first switch 465 of the eighth digital signal processing unit 455 is switched to the output portion B and the second switch 467 of the fifth digital signal processing unit 440 is switched to the output portion A in order to disconnect the second base unit 402 from the bus 405.

In the third base unit 403, the input portion of the first switch 495 is connected with the transmitting means 487 of the twelfth digital signal processing unit 485, the output portion A of the first switch 495 is connected with the input portion of the second switch 467 of the second base unit 402 through the bus 405, and the output portion B of the first switch 495 is connected with the receiving means 471 of the ninth digital signal processing unit 470. The input portion of the second switch 497 is connected with the output portion A of the second switch 437 of the first digital signal processing unit 410 of the first base unit 401 through the bus 405, the output portion A of the second switch 497 is connected with the input portion of the second switch 467 of the second base unit 402, and the output portion B of the second switch 497 is connected with the receiving means 471 of the twelfth digital signal processing unit 470. In the present embodiment, the input terminal 491 and the output terminal 493 of the third base unit 403 are not connected with external terminals. In the case that the third base unit 403 alone should be connected with the bus 405, the input terminal 491 and the output terminal 493 may be connected with the AD input section 407 and DA output section 409, respectively.

From the foregoing description, it is to be understood that the first switch 495 of the twelfth digital signal processing unit 485 is switched to the output portion A and the second switch 497 of the ninth digital signal processing unit 470 is switched to the output portion B in order to connect the third base unit 403 with the bus 405 as shown in FIG. 14 while, on the other hand, the first switch 495 of the twelfth digital signal processing unit 485 is switched to the output portion B and the second switch 497 of the ninth digital signal processing unit 470 is switched to the output portion A in order to disconnect the third base unit 403 from the bus 405.

The operation of the fourth embodiment of the digital signal processing apparatus 400 according to the present invention will be described hereinlater with reference to FIG. 14.

In the case that only one base unit, for example, the third base unit 403 comprising the ninth, tenth, eleventh, and twelfth digital signal processing units 470, 475, 480, and 485 is used, in other words, the ninth, tenth, eleventh, and twelfth digital signal processing units 470, 475, 480, and 485 are allowed to be electrically connected to form a closed loop, while the remaining digital signal processing units 410 to 455 are not allowed to receive and transmit data elements from and to the neighboring digital signal processing units 470 and 485, the third base unit 403 should be removed from the bus 405.

This means that the first switch 495 of the twelfth digital signal processing unit 485 is switched to the output portion B and the second switch 497 of ninth digital signal processing unit 470 is switched to the output portion A to disconnect the third base unit 403 from the bus 405, and the input and output terminals 491 and 493 of the third base unit 403 are connected with AD input section 407 and DA output section 409, respectively.

As will be seen from the foregoing description, it is to be understood that the fourth embodiment of the digital signal processing apparatus 400 makes it possible for, for example, but not limited to, an operator or a control device operating the first and second switches to remove the third base unit 403 from the bus 405, and to allow the ninth, tenth, eleventh, and twelfth digital signal processing units 470, 475, 480, and 485 to be electrically connected to form a closed loop with the result that the ninth, tenth, eleventh, and twelfth digital signal processing units 470, 475, 480, and 485 are operative to circulate and process data elements including shared memory data elements 50.

In the case that two base units, for example, the first base unit 401 comprising the first, second, third and fourth digital signal processing units 410, 415, 420, and 425 in addition to the third base unit 403 comprising the ninth, tenth, eleventh, and twelfth digital signal processing units 470, 475, 480, and 485 are used, in other words, the first, second, third and fourth digital signal processing units 410, 415, 420, and 425, and the ninth, tenth, eleventh, and twelfth digital signal processing units 470, 475, 480, and 485 are allowed to be electrically connected to form a closed loop, while the remaining digital signal processing units 440 to 455 are not allowed to receive and transmit data elements from and to the neighboring digital signal processing units 425 and 470, the first and third base units 401 and 403 should be connected with the bus 405 while the second base unit 402 is disconnected from the bus 405.

This means that the first switch 435 of the fourth digital signal processing unit 425 is switched to the output portion A and the second switch 437 of the first digital signal processing unit 410 is switched to the output portion B, the first switch 465 of the eighth digital signal processing unit 455 is switched to the output portion B and the second switch 467 of the fifth digital signal processing unit 440 is switched to the output portion A, the first switch 495 of the twelfth digital signal processing unit 485 is switched to the output portion A and the second switch 497 of ninth digital signal processing unit 470 is switched to the output portion B to connect the first and third base units 401 and 403 with the bus 405 and disconnect the second base unit 402 from the bus 405.

As will be seen from the foregoing description, it is to be understood that the fourth embodiment of the digital signal processing apparatus 400 makes it possible for, for example, but not limited to, an operator or a control device operating the first and second switches to connect the first and third base units 401 and 403 to connect with the bus 405, to disconnect the third base unit 403 from the bus 405, and to allow the first, second, third, fourth, ninth, tenth, eleventh, and twelfth digital signal processing units 410, 415, 420, 425, 470, 475, 480, and 485 to be electrically connected to form a closed loop with the result that the first, second, third, fourth, ninth, tenth, eleventh, and twelfth digital signal processing units 410, 415, 420, 425, 470, 475, 480, and 485 are operative to circulate and process data elements including shared memory data elements 50.

In the case that three base units, for example, the second base unit 402 comprising the fifth, sixth, seventh, and eighth digital signal processing units 440, 445, 450, and 455 in addition to the first base unit 401 comprising the first, second, third and fourth digital signal processing units 410, 415, 420, and 425 and the third base unit 403 comprising the ninth, tenth, eleventh, and twelfth digital signal processing units 470, 475, 480, and 485 are used, in other words, the first, second, third, fourth digital signal processing units 410, 415, 420, and 425, fifth, sixth, seventh, and eighth digital signal processing units 440, 445, 450, and 455, and the ninth, tenth, eleventh, and twelfth digital signal processing units 470, 475, 480, and 485 are allowed to be electrically connected to form a closed loop, the first, second, and third base units 401, 402, and 403 should be connected with the bus 405.

This means that the first switch 435 of the fourth digital signal processing unit 425 is switched to the output portion A and the second switch 437 of the first digital signal processing unit 410 is switched to the output portion B, the first switch 465 of the eighth digital signal processing unit 455 is switched to the output portion A and the second switch 467 of the fifth digital signal processing unit 440 is switched to the output portion B, the first switch 495 of the twelfth digital signal processing unit 485 is switched to the output portion A and the second switch 497 of ninth digital signal processing unit 470 is switched to the output portion B to connect the first, second, and third base units 401, 402, and 403 with the bus 405.

As will be seen from the foregoing description, it is to be understood that the fourth embodiment of the digital signal processing apparatus 400 makes it possible for, for example, but not limited to, an operator or a control device operating the first and second switches to connect the first, second, and third base units 401, 402, and 403 to connect with the bus 405, and to allow the first, second, third, fourth, fifth, sixth, seventh, eighth, ninth, tenth, eleventh, and twelfth digital signal processing units 410, 415, 420, 425, 440, 445, 450, 455, 470, 475, 480, and 485 to be electrically connected to form a closed loop with the result that the first, second, third, fourth, fifth, sixth, seventh, eighth, ninth, tenth, eleventh, and twelfth digital signal processing units 410, 415, 420, 425, 440, 445, 450, 455, 470, 475, 480, and 485 are operative to circulate and process data elements including shared memory data elements 50.

Furthermore, to disconnect only the first base unit 401 comprising the first, second, third, and fourth digital signal processing units 410, 415, 420, and 425 from the bus 405 while connecting the second and fourth base units 402 and 403 with the bus 405, the first switch 435 of the fourth digital signal processing unit 425 is switched to the output portion B and the second switch 437 of the first digital signal processing unit 410 is switched to the output portion A in order to disconnect the first base unit 401 from the bus 405.

As will be seen from the foregoing description, it is to be understood that the fourth embodiment of the digital signal processing apparatus 400 makes it possible for, for example, but not limited to, an operator or a control device operating the first and second switches to disconnect the first, second, third, and fourth digital signal processing units 410, 415, 420, and 425 from the bus 405 with the result that the first, second, third, fourth digital signal processing units 410, 415, 420, and 425 are not allowed to receive and transmit data elements including shared memory data elements 50 from and to the neighboring digital signal processing units 440 and 485.

As will be seen from the foregoing description, it is to be understood that the fourth embodiment of the digital signal processing apparatus 400 according to the present invention further comprising: a bus 405, through which the digital signal processing units 410, 415, to 485 are connected with one another in series to form a closed loop, and a plurality of switching means, for example, switching means 435, 437, 465, 467, 495, 497 for selectively connecting and disconnecting respective digital signal processing units 410, 415, to 485 with and from the bus 405, makes it possible for, for example, but not limited to, an operator or a control device operating the switching means 435, 437, 465, 467, 495, 497 to allow one or more of the digital signal processing units to receive and transmit data elements from and to neighboring digital signal processing units. Furthermore, the fourth embodiment of the digital signal processing apparatus 400 makes it possible for the operator or a control device to prohibit the one or more of digital signal processing units to receive and transmit data elements from and to neighboring digital signal processing units while allowing remaining digital signal processing units 440 to 485 to be electrically connected with one another in series to form another closed loop such that the remaining digital signal processing units 440 to 485 are operative to receive data elements including the acoustic signals as shared memory data elements 50, and to process the data elements.

As will be apparent from the construction of the base units shown in FIG. 14, the fourth embodiment of the digital signal processing apparatus has the same advantages as the first embodiment.

While it has been described in the present embodiment that the digital signal processing apparatus 400 comprises three base units each of which comprises four digital signal processing units, the digital signal processing apparatus 400 according to the present invention may comprise any number of digital signal processing units according to the present invention.

Figure 15:
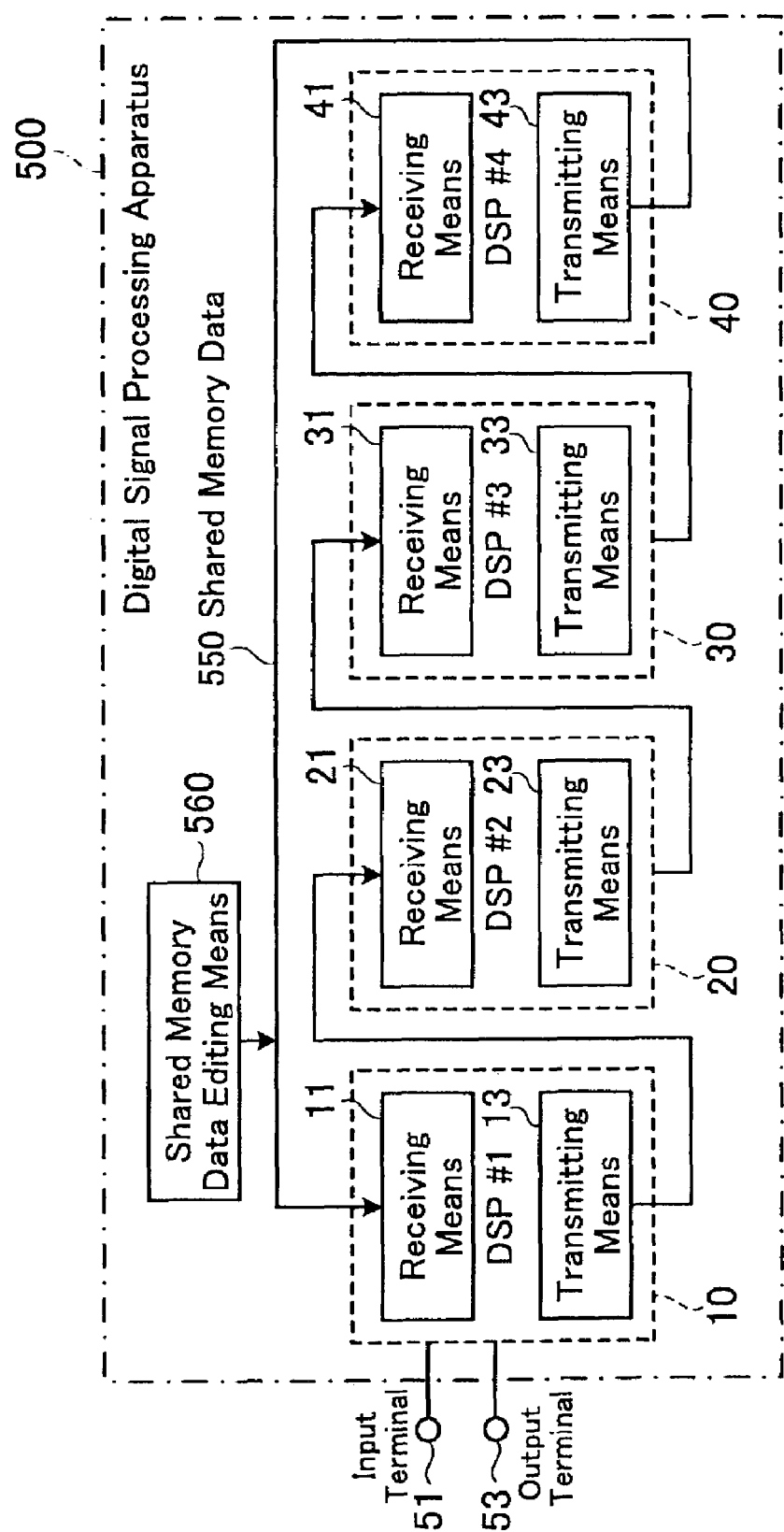
FIG. 15 is a schematic block diagram showing a fifth preferred embodiment of the digital signal processing apparatus according to the present invention.
Figure 16:
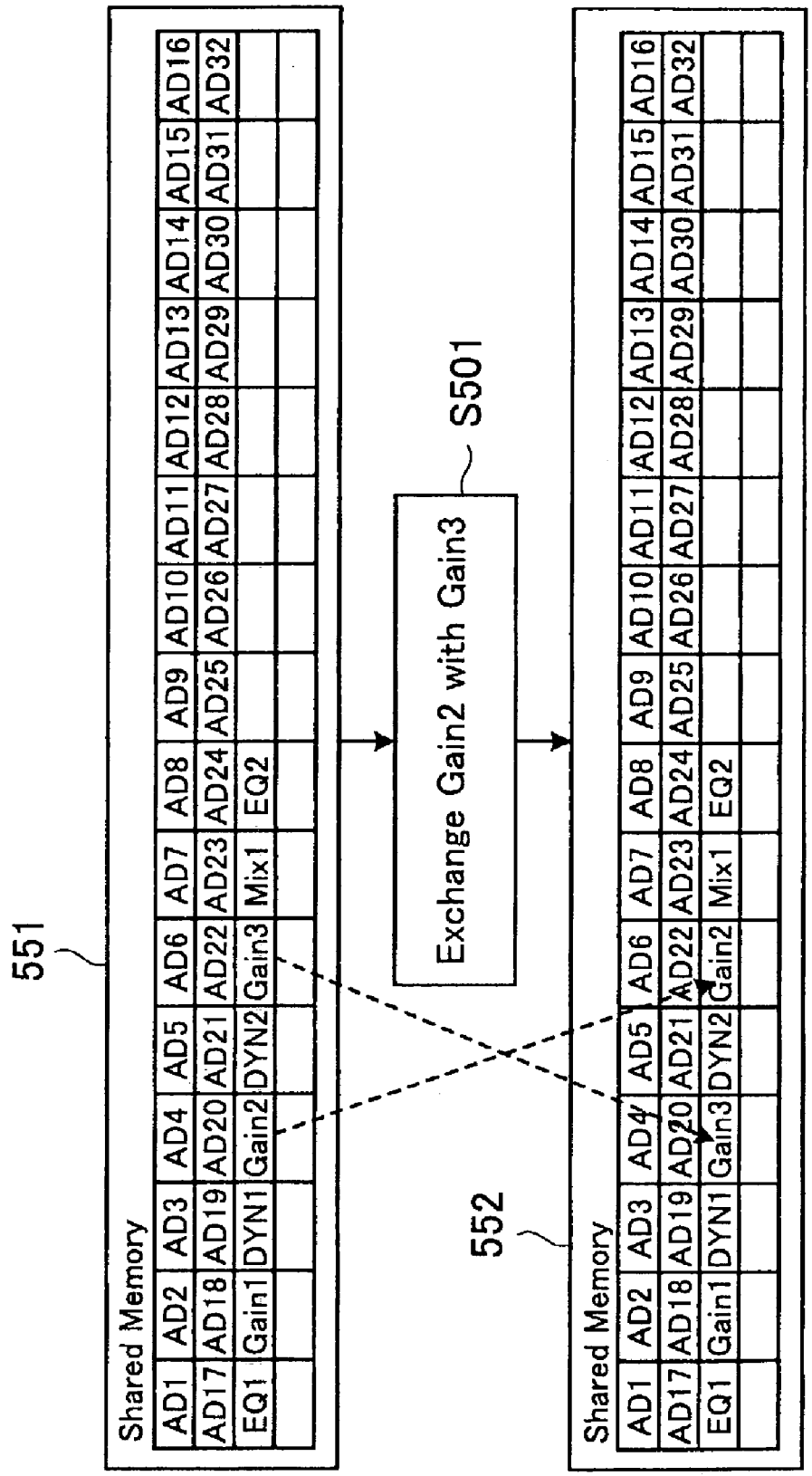
FIG. 16 is a block diagram showing a process of editing shared memory data elements allocated in shared memory data areas performed by shared data editing means constituting the digital signal processing apparatus shown in FIG. 15.

Referring to the drawings shown in FIGS. 15 and 16, there is shown a fifth preferred embodiment of the digital signal processing apparatus 500 according to the present invention.

The fifth embodiment of the digital signal processing apparatus 500 is similar to the first embodiment of the digital signal processing apparatus 100 described with reference to FIG. 1 except for the fact that the digital signal processing apparatus 500 as set forth in claim 1, further comprising: shared data editing means 560 for editing the shared memory data elements 550 stored in the shared memory section 117 as shown in FIG. 15. The same constitutional elements are simply represented by the same reference numerals as those of the first embodiment, and will thus be omitted in description for avoiding tedious repetition.

In the present embodiment of the digital signal processing apparatus 500, the shared data editing means 560 is placed, for example, but not limited to, between the transmitting means 43 of the fourth digital signal processing unit 40 and the receiving means 11 of the first digital signal processing unit 10, and is adapted to edit the shared memory data elements 550 stored in the shared memory section 117. The shared data editing means 560 may be a host controller such as, for example, a Central Processing Unit, referred to simply as "CPU", which can overwrite data elements stored in the storing means of the digital signal processing units. In general, the digital signal processing units are equipped with interfaces, which enable the CPU to communicate with the digital signal processing units. The CPU can overwrite data elements stored in the storage means of the digital signal processing units by means of the interfaces.

The operation of the fifth embodiment of the digital signal processing apparatus 500 will be described hereinlater with reference to the drawings shown in FIG. 16.

The shared data editing means 560 is operated to edit the shared memory data elements 550 stored in the shared memory section 117. The transmitting data storing means 118 of a digital signal processing unit is operated to store edited shared memory data elements 550 thus edited by the shared data editing means 560 and stored in the shared memory section 117 into a transmitting buffer 119. The transmitting means 13 of the digital signal processing unit is operated to transmit the edited shared memory data elements 550 stored in the transmitting buffer 119 to the subsequent digital signal processing unit. The receiving means 11 of the subsequent digital signal processing unit is operated to receive the edited shared memory data elements 550 from the preceding digital signal processing unit.

As described in the description of the previous embodiments, the shared memory section 117 is constituted by a plurality of shared memory data areas allocated to the storage means included in the respective digital signal processing units 10, 20, 30, and 40. The shared memory data elements allocated in shared memory data areas and flows of the shared memory data elements received and transmitted between the shared memory data areas and the digital signal processing units, for example, digital signal processing units 10 and 40 to edit the shared memory data elements used to realize the acoustic signal processing system shown in FIG. 5 will be described hereinlater with reference to the drawings shown in FIG. 16.

In FIG. 16, the shared memory data elements before edited by the shared data editing means 560 are designated by "shared memory data elements 551", and the shared memory data elements after edited by the shared data editing means 560 are designated by "shared memory data elements 552".

As shown in FIG. 16, the shared data editing means 560 is operated to edit the shared memory data element "Gain2" and "Gain3" in the shared memory data elements 551 with the result that the shared memory data element "Gain2" and "Gain3" are exchanged with each other in the shared memory data elements 552 in step S501.

This means that the acoustic signal data outputted from the second gain 69 and the acoustic signal data outputted from the third gain 75 are exchanged with each other, and the digital signal processing apparatus 500 is operated to read the shared memory data element "GAIN3" as the output signal of the second gain 69, and the shared memory data element "GAIN2" as an output signal of the third gain 75, to convert the shared memory data elements "GAIN3" and "GAIN2" thus exchanged and read from digital to analog format, and to output the first output signals DA71 and DA77.

The digital signal processing apparatus 500 thus constructed can edit the shared memory data elements stored in the shared memory section 117, thereby making it possible to modify an acoustic signal processing system without modifying the constituent elements such as, for example, the second gain 69 and the third gain 75, constituting the acoustic signal processing system.

As will be seen from the foregoing description, it is to be understood that the fifth embodiment of the digital signal processing apparatus 500 according to the present invention comprises shared data editing means 560 for editing the shared memory data elements 550 stored in the shared memory section 117 can modify an acoustic signal processing system without controlling respective digital signal processing units respectively operating to realize the acoustic signal processing system.

While it has been described in the present embodiment that the digital signal processing apparatus 500 comprises shared data editing means 560 placed between the digital signal processing units, the shared data editing means 560 may be included in, for example, any one or more of the digital signal processing units.

Figure 17:
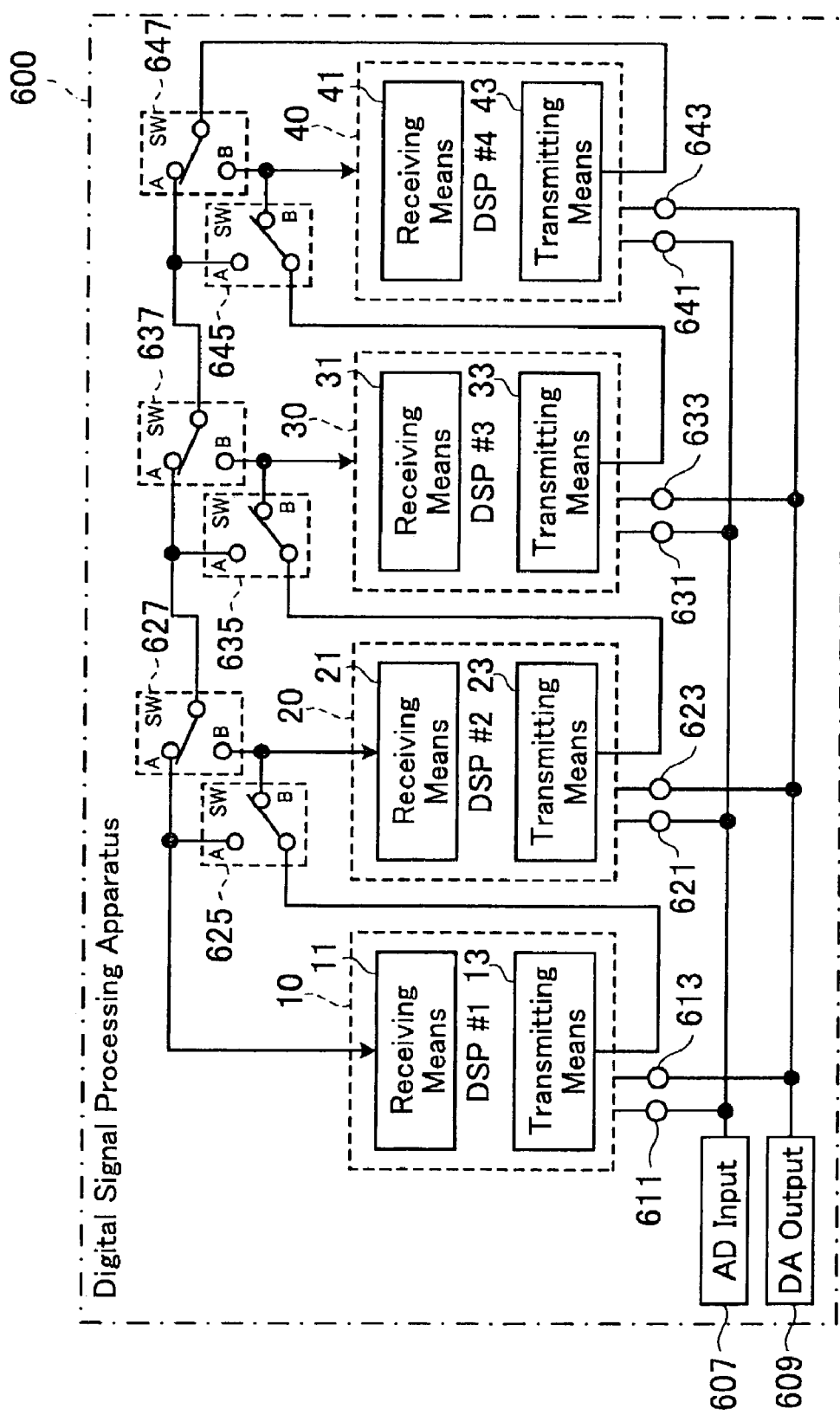
FIG. 17 is a schematic block diagram showing a sixth preferred embodiment of the digital signal processing apparatus according to the present invention.
Figure 18:
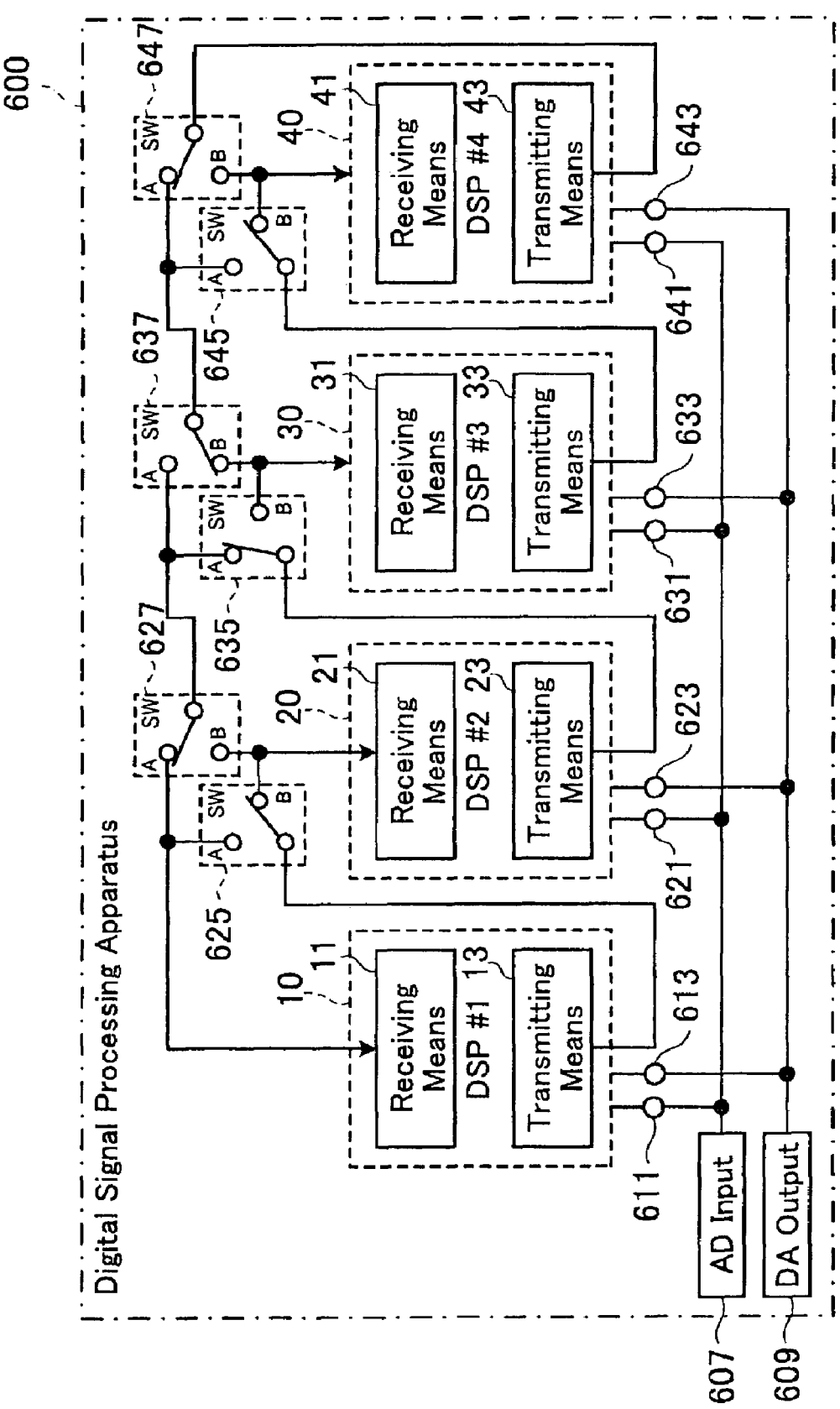
FIG. 18 is a schematic block diagram showing an example of ranges of digital signal processing units sharing respective storing sections as a shared memory.

Referring to the drawings shown in FIGS. 17 and 18, there is shown a sixth preferred embodiment of the digital signal processing apparatus 600 according to the present invention. The sixth embodiment of the digital signal processing apparatus 600 comprises a plurality of digital signal processing units, for example, digital signal processing units 10, 20, 30, and 40. The sixth embodiment of the digital signal processing apparatus 600 is similar to the first embodiment of the digital signal processing apparatus 100 described with reference to FIG. 1 except for the fact that each of the digital signal processing units 10, 20, 30, and 40 comprises: signal input terminal 611, 621, 631, 631 for inputting a plurality of acoustic data elements from an external outputting device; and signal output terminal 613, 623, 633, 643 for outputting a plurality of acoustic data elements to an external inputting device, and the digital signal processing apparatus 600 further comprises: selecting switches 625, 627, 635, 637, 645, 647 for allowing one or more of the digital signal processing units 10, 20, 30, and 40 to be electrically connected with one another in series to form a closed loop such that the one or more of the digital signal processing units 10, 20, 30, and 40 are operative to receive data elements including the acoustic signals as shared memory data elements 50, and to process the data elements, and allowing another one or more of the digital signal processing units 10, 20, 30, and 40 to be electrically connected with one another in series to form another closed loop such that the another one or more of the digital signal processing units 10, 20, 30, and 40 are operative to receive data elements including the acoustic signals as shared memory data elements 50, and to process the data elements. The selecting switches constitute the selecting means according to the present invention. The signal input terminal and the signal output terminal respectively constitute the signal input means and the signal output means according to the present invention. The same constitutional elements are simply represented by the same reference numerals as those of the first embodiment, and will thus be omitted in description for avoiding tedious repetition.

Each of the selecting switches 625, 627, 635, 637, 645, and 647 includes one input portion and two output portions A and B.

In the present embodiment, the input portion of the selecting switch 625 is connected with the transmitting means 13 of the first digital signal processing unit 10, the output portion A of the selecting switch 625 is connected with the receiving means 11 of the first digital signal processing unit 10, and the output portion B of the selecting switch 625 is connected with the receiving means 21 of the second digital signal processing unit 20. The input portion of the selecting switch 627 is connected with the output portion A of the selecting switch 635, and the output portion A of the selecting switch 637. The output portion A of the selecting switch 627 is connected with the receiving means 11 of the first digital signal processing unit 10, and the output portion B of the selecting switch 627 is connected with the receiving means 21 of the second digital signal processing unit 20.

The selecting switch 625 is switched to, for example, the output portion A; the selecting switch 627 is switched to the output portion B. As a result, the transmitting means 13 of the first digital signal processing unit 10 is operated to transmit shared memory data elements to the receiving means 11 of the digital signal processing unit 10.

The selecting switch 625 is switched to, on the other hand, the output portion B; the selecting switch 627 is switched to the output portion A. As a result, the transmitting means 13 of the first digital signal processing unit 10 is operated to transmit shared memory data elements to the receiving means 21 of the second digital signal processing unit 20. The receiving means 11 of the digital signal processing unit 10 is operated to receive shared memory data elements from the digital signal processing unit 30 or 40, depending on the operations of the other selecting switches.

The input portion of the selecting switch 635 is connected with the transmitting means 23 of the second digital signal processing unit 20, the output portion A of the selecting switch 635 is connected with the input portion of the selecting switch 627, and the output portion B of the selecting switch 635 is connected with the receiving means 31 of the third digital signal processing unit 30. The input portion of the selecting switch 637 is connected with the output portion A of the selecting switch 645, and the output portion A of the selecting switch 647. The output portion A of the selecting switch 637 is connected with the receiving means 21 of the second digital signal processing unit 20, and the output portion B of the selecting switch 637 is connected with the receiving means 31 of the third digital signal processing unit 30.

The selecting switch 635 is switched to, for example, the output portion A; the selecting switch 637 is switched to the output portion B. As a result, the transmitting means 23 of the second digital signal processing unit 20 is operated to transmit shared memory data elements to the first digital signal processing unit 10 or the second digital signal processing unit 20 depending on the operations of the other selecting switch.

The selecting switch 635 is switched to, on the other hand, the output portion B; the selecting switch 637 is switched to the output portion A. As a result, the transmitting means 23 of the second digital signal processing unit 20 is operated to transmit shared memory data elements to the receiving means 31 of the third digital signal processing unit 30. The receiving means 21 of the digital signal processing unit 20 is operated to receive shared memory data elements from the digital signal processing unit 10, 30 or 40, depending on the operations of the other selecting switches.

The input portion of the selecting switch 645 is connected with the transmitting means 33 of the third digital signal processing unit 30, the output portion A of the selecting switch 645 is connected with the input portion of the selecting switch 637, and the output portion B of the selecting switch 645 is connected with the receiving means 41 of the fourth digital signal processing unit 40. The input portion of the selecting switch 647 is connected with transmitting means 43 of the fourth digital signal processing unit 40. The output portion A of the selecting switch 647 is connected with the receiving means 31 of the third digital signal processing unit 30, and the output portion B of the selecting switch 647 is connected with the receiving means 41 of the fourth digital signal processing unit 40.

The selecting switch 645 is switched to, for example, the output portion A; the selecting switch 647 is switched to the output portion B. As a result, the transmitting means 33 of the third digital signal processing unit 30 is operated to transmit shared memory data elements to the first digital signal processing unit 10, the second digital signal processing unit 20, or the third digital signal processing unit 30 depending on the operations of the other selecting switch.

The selecting switch 645 is switched to, on the other hand, the output portion B; the selecting switch 647 is switched to the output portion A. As a result, the transmitting means 33 of the second digital signal processing unit 30 is operated to transmit shared memory data elements to the receiving means 41 of the fourth digital signal processing unit 40. The transmitting means 43 of the fourth digital signal processing unit 40 is operated to transmit shared memory data elements to the digital signal processing unit 10, 20 or 30, depending on the operations of the other selecting switches.

The operation of the sixth embodiment of the digital signal processing apparatus 600 according to the present invention will be described hereinlater with reference to the drawings shown in FIGS. 17 and 18.

The selecting switches 625, 635, and 645 are switched to, for example, the output portion B, and the selecting switches 627, 637, and 647 are switched to, for example, the output portion A as shown in FIG. 17.

The receiving means 11 of the digital signal processing unit 10 is electrically connected with the transmitting means 43 of the digital signal processing unit 40, the receiving means 21 of the digital signal processing unit 20 is electrically connected with the transmitting means 13 of the digital signal processing unit 10, the receiving means 31 of the digital signal processing units 30 is electrically connected with the transmitting means 23 of the digital signal processing unit 20, and the receiving means 41 of the digital signal processing units 40 is electrically connected with the transmitting means 33 of the digital signal processing unit 30.

The digital signal processing units 10, 20, 30, and 40 are allowed to be electrically connected with one another in series to form a closed loop such that the digital signal processing units 10, 20, 30, and 40 are operative to receive data elements including the acoustic signals as shared memory data elements 50, and to process the data elements. The digital signal processing units 10, 20, 30, and 40, thus connected with one another, enable to circulate the shared memory data elements 50 from one digital signal processing unit to another in a sequential order, thereby making it possible for the digital signal processing units 10, 20, 30, and 40 to share the shared memory data elements 50 with one another.

In the sixth embodiment of the digital signal processing apparatus 600 according to the present invention, each of the digital signal processing units comprises a signal input terminal and a signal output terminal, making it possible for each of the digital signal processing units to input an acoustic signal from an external device, not shown, through an analog digital input 607, designated by "AD Input", and to output an acoustic signal to an external device, not shown, through a digital analog output 609, designated by "DA Output". The analog digital input 607 is adapted to input an acoustic signal therethrough, and to convert the acoustic signal from analog to digital format. The digital analog output 609 is adapted to convert a digital signal into an analog acoustic signal, and to output the acoustic signal thus converted therethrough. This means that the digital signal processing units 10, 20, 30, 40 may input an acoustic signal at an input terminal, for example, the input terminal 611, from an external device, not shown, and to output an acoustic signal to an external device, not shown, at an output terminal, for example, output terminal 613.

This leads to the fact each of the digital signal processing units of the digital signal processing apparatus 600 can input and output an acoustic signal at the signal input terminal and the signal output terminal through the analog digital input 607 and the digital analog output 609.

The selecting switches 625, 637 and 645 are switched to, on the other hand, the output portion B, the selecting switches 627, 635, and 647 are switched to the output portion A as shown in FIG. 18.

As described earlier, each of the digital signal processing units 10, 20, 30, and 40 can input and output an acoustic signal at the signal input terminal 611, 621, 631, or 641 and the signal output terminal 613, 623, 633, of 644 through the analog digital input 607 and the digital analog output 609. This means that the digital signal processing units 10 and 20 may input an acoustic signal at an input terminal, for example, the input terminal 611, from an external device, not shown, and to output an acoustic signal to an external device, not shown, at an output terminal, for example, output terminal 613, and the digital signal processing units 30 and 40 may input an acoustic signal at an input terminal, for example, the input terminal 631, from an external device, not shown, and to output an acoustic signal to an external device, not shown, at an output terminal, for example, output terminal 633.

The transmitting means 13 of the digital signal processing unit 10 is operated to transmit shared memory data elements to the receiving means 21 of the digital signal processing unit 20 through the selecting switch 625. The transmitting means 23 of the digital signal processing unit 20 is operated to transmit shared memory data elements to the receiving means 11 of the digital signal processing unit 10 through the selecting switches 635 and 627. This means that the digital signal processing units 10 and 20 are allowed to be electrically connected with one another in series to form a closed loop such that the digital signal processing units 10 and 20 are operative to receive data elements including the acoustic signals as shared memory data elements, and to process the data elements. The digital signal processing units 10 and 20 thus connected with one another, enable to circulate the shared memory data elements from one digital signal processing unit to another in a sequential order, thereby making it possible for the digital signal processing units 10 and 20 to share the shared memory data elements with one another.

In the meanwhile, the transmitting means 33 of the digital signal processing unit 30 is operated to transmit shared memory data elements to the receiving means 41 of the digital signal processing unit 40 through the selecting switch 645. The transmitting means 43 of the digital signal processing unit 40 is operated to transmit shared memory data elements to the receiving means 31 of the digital signal processing unit 30 through the selecting switches 645 and 637. This means that another digital signal processing units 30 and 40 are allowed to be electrically connected with one another in series to form another closed loop such that another digital signal processing units 30 and 40 are operative to receive data elements including the acoustic signals as shared memory data elements, and to process the data elements. The digital signal processing units 30 and 40 thus connected with one another, enable to circulate the shared memory data elements from one digital signal processing unit to another in a sequential order, thereby making it possible for the digital signal processing units 30 and 40 to share the shared memory data elements with one another.

The sixth embodiment of the digital signal processing apparatus 600 according to the present invention makes it possible for, for example, but not limited to, an operator or a control device operating the selecting switch 625, 627, 635, 637, 645, 647 to allow one or more of the digital signal processing units, for example, the digital signal processing units 10 and 20 to be electrically connected with one another in series to form a closed loop such that the one or more of the digital signal processing units 10 and 20 are operative to receive data elements including the acoustic signals as shared memory data elements, and to process the data elements, and to allow another digital signal processing units 30 and 40 to be electrically connected with one another in series to form another closed loop such that the another one or more of the digital signal processing units 30 and 40 are operative to receive data elements including the acoustic signals as shared memory data elements and to process the data element.

The digital signal processing apparatus 600 thus constructed can divide and change the range of digital signal processing units circulating the shared memory data elements, thereby saving shared memory data areas of the shared memory section 117.

The digital signal processing apparatus 600 allowing, for example, two digital signal processing units 10 and 20 to be electrically connected with one another in series to form a closed loop, and another two digital signal processing units 30 and 40 to be electrically connected with one another in series to form another closed loop as shown in FIG. 18, enables an L channel acoustic signal to be circulated and processed in the digital signal processing units 10 and 20, and an R channel acoustic signal to be circulated and processed in the digital signal processing units 30 and 40, thereby reducing the amount of the occupied shared memory data areas to half in comparison with the digital signal processing apparatus 600 in which the range of the digital signal processing units circulating the shared memory data elements is not divided.

Furthermore, the present embodiment of the digital signal processing apparatus 600 makes it possible for, for example, but not limited to, an operator or a control device operating the selecting switch 625, 627, 635, 637, 645, 647 to allow limited number of the digital signal processing units to be electrically connected with one another in series to form a closed loop such that the limited number of the digital signal processing units are operative to receive data elements including the acoustic signals as shared memory data elements.

As will be seen from the foregoing description, it is to be understood that the sixth embodiment of the digital signal processing apparatus 600 according to the present invention, in which each of the digital signal processing units 10, 20, 30, and 40 comprises: signal input terminal 611, 621, 631, 631 for inputting a plurality of acoustic data elements from an external outputting device; and signal output terminal 613, 623, 633, 643 for outputting a plurality of acoustic data elements to an external inputting device, and the which further comprises: selecting switches 625, 627, 635, 637, 645, 647 for allowing one or more of the digital signal processing units 10, 20, 30, and 40 to be electrically connected with one another in series to form a closed loop such that the one or more of the digital signal processing units 10, 20, 30, and 40 are operative to receive data elements including the acoustic signals as shared memory data elements 50, and to process the data elements, and allowing another one or more of the digital signal processing units 10, 20, 30, and 40 to be electrically connected with one another in series to form another closed loop such that the another one or more of the digital signal processing units 10, 20, 30, and 40 are operative to receive data elements including the acoustic signals as shared memory data elements 50, and to process the data elements, makes it possible for, for example, but not limited to, an operator or a control device operating the selecting switch 625, 627, 635, 637, 645, 647 to allow one or more of the digital signal processing units, for example, digital signal processing units 10 and 20 to be electrically connected with one another in series to form a closed loop such that the one or more of the digital signal processing units 10 and 20 are operative to receive data elements including the acoustic signals as shared memory data elements, and to process the data elements, and to allow another the digital signal processing units 30 and 40 to be electrically connected with one another in series to form another closed loop such that the another one or more of the digital signal processing units 30 and 40 are operative to receive data elements including the acoustic signals as shared memory data elements and to process the data element.

The sixth embodiment of the digital signal processing apparatus 600 thus constructed can divide and change the range of digital signal processing units circulating the shared memory data elements, thereby saving shared memory data areas of the shared memory section 117.

Figure 19:
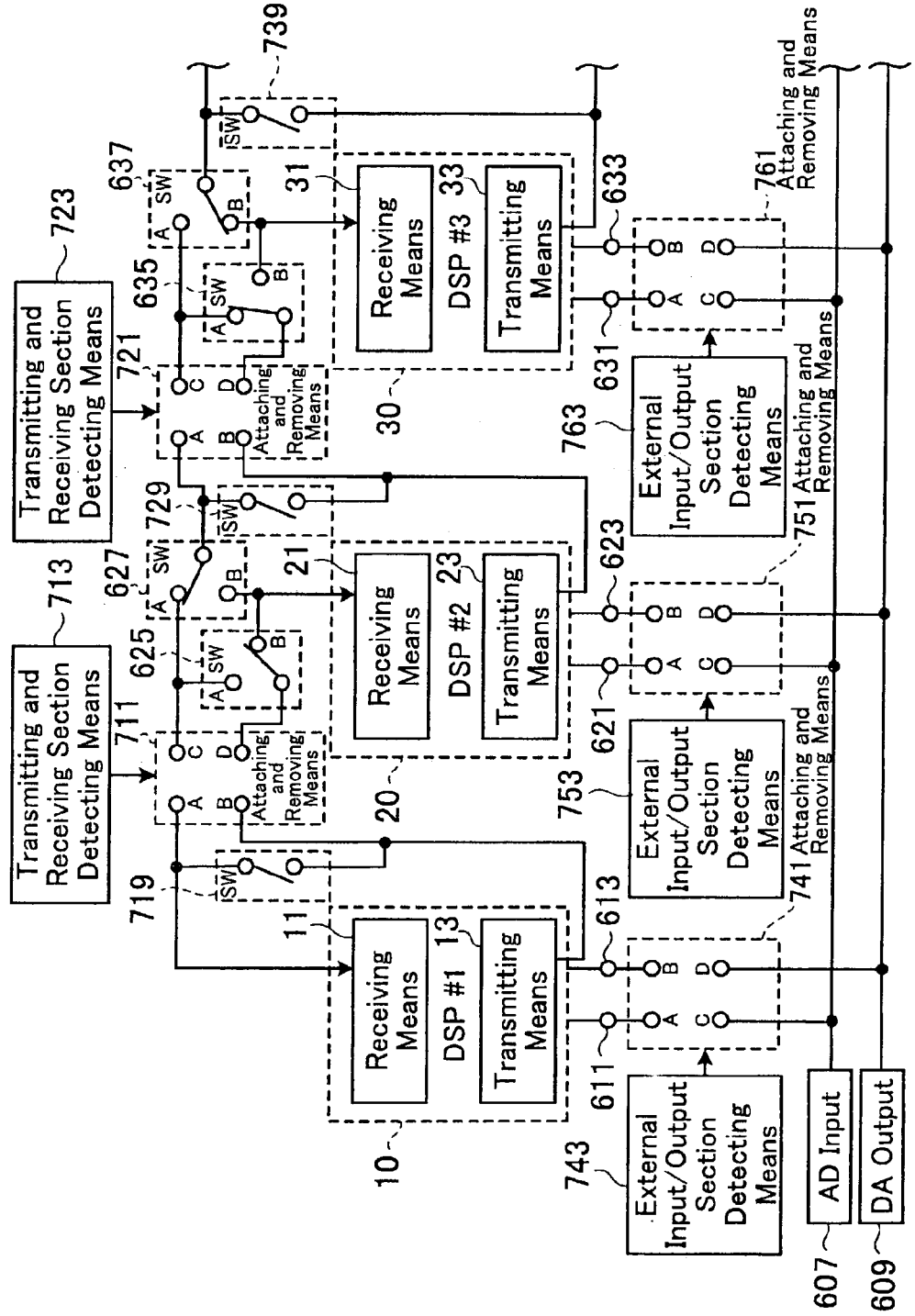
FIG. 19 is a schematic block diagram showing a seventh preferred embodiment of the digital signal processing apparatus according to the present invention.

As will be apparent from the construction of the base units shown in FIGS. 17 and 19, the sixth embodiment of the digital signal processing apparatus has the same advantages as the first embodiment.

Referring then to the drawings shown in FIG. 19 of the drawings, there is shown a seventh preferred embodiment of the digital signal processing apparatus 700 according to the present invention. The seventh embodiment of the digital signal processing apparatus 700 is similar to the sixth embodiment of the digital signal processing apparatus 100 described with reference to FIG. 17 except for the fact that each of the digital signal processing units, for example, the digital signal processing units 10 further comprises: first attaching and removing means 711 provided between the receiving means 11 of the digital signal processing unit 10 and the transmitting means 23 of the digital signal processing unit 20 for selectively attaching and removing the digital signal processing unit 10 to and from neighboring digital signal processing unit 20; second attaching and removing means 741 provided between the signal input and output terminals 611, 613 and external input and output terminals 607, 609 for selectively attaching and removing the digital signal processing unit 10 to and from the external input and output terminals 607, 609; transmitting and receiving section detecting means 713 for detecting whether or not the digital signal processing unit 10 is removed from neighboring digital signal processing unit 20; transmitting and receiving section switching means 719 for closing a circuit opened by the digital signal processing unit 10 to form the closed loop when the transmitting and receiving section detecting means 713 detects that the digital signal processing unit 10 is removed from neighboring digital signal processing units; and external input/output section detecting means 743 for detecting whether or not the digital signal processing unit 10 is removed from the external input and output terminals 607, 609, whereby the first attaching and removing means 711 and the second attaching and removing means 741 allow the digital signal processing unit 10 to be selectively attached to and removed from the digital signal processing apparatus 700. The transmitting and receiving section detecting means and external input/output section detecting means respectively constitutes the first detecting means and the second detecting means according to the present invention. The same constitutional elements are simply represented by the same reference numerals as those of the first embodiment, and will thus be omitted in description for avoiding tedious repetition.

As shown in FIG. 19, the digital signal processing units 10 further comprises: first attaching and removing means 711 provided between the digital signal processing unit 10 and the digital signal processing unit 20 for selectively attaching and removing the digital signal processing unit 10 to and from neighboring digital signal processing unit 20; second attaching and removing means 741 provided between the signal input and output terminals 611, 613 and external input and output terminals 607, 609 for selectively attaching and removing the digital signal processing unit 10 to and from the external input and output terminals 607, 609; transmitting and receiving section detecting means 713 for detecting whether or not the digital signal processing unit 10 is removed from neighboring digital signal processing unit 20; and transmitting and receiving section switching means 719 for closing a circuit opened by the digital signal processing unit 10 to form the closed loop when the transmitting and receiving section detecting means 713 detects that the digital signal processing unit 10 is removed from neighboring digital signal processing units whereby the first attaching and removing means 711 and the second attaching and removing means 741 allow the digital signal processing unit 10 to be selectively attached to and removed from the digital signal processing apparatus 700.

Similarly, the digital signal processing unit 20 further comprises: first attaching and removing means 721 provided between the digital signal processing unit 20 and the digital signal processing unit 30 for selectively attaching and removing the digital signal processing unit 20 to and from neighboring digital signal processing units 30; second attaching and removing means 751 provided between the signal input and output terminals 621, 623 and external input and output terminals 607, 609 for selectively attaching and removing the digital signal processing unit 20 to and from the external input and output terminals 607, 609; transmitting and receiving section detecting means 723 for detecting whether or not the digital signal processing unit 20 is removed from neighboring digital signal processing unit 30; and transmitting and receiving section switching means 729 for closing a circuit opened by the digital signal processing unit 20 to form the closed loop when the transmitting and receiving section detecting means 723 detects that the digital signal processing unit 20 is removed from neighboring digital signal processing unit 30; and external input/output section detecting means 753 for detecting whether or not the digital signal processing unit 20 is removed from the external input and output terminals 607, 609, whereby the first attaching and removing means 721 and the second attaching and removing means 751 allow the digital signal processing unit 20 to be selectively attached to and removed from the digital signal processing apparatus 700.

The digital signal processing units 10, 20, 30, and 40 are similar in construction to one another. The digital signal processing units 10 and 20 shown in FIG. 19 includes all the constructions and functions common to all the digital signal processing units 10, 20, 30, and 40 as described earlier. The description of the other digital signal processing units 30, and 40 will be thus omitted from the following description.

The first attaching and removing means 711 includes four output terminals A, B, C, and D, and is provided between the first digital signal processing unit 10 and the second digital signal processing unit 20. The first attaching and removing means 711 is adapted to selectively attach the output terminals A, B to the terminals C, D and remove the output terminals A, B from the terminals C, D in order to selectively attach and remove the digital signal processing unit 10 to and from the neighboring digital signal processing unit 20.

The first attaching and removing means 721 includes four output terminals A, B, C, and D, and is provided between the second digital signal processing unit 20 and the third digital signal processing unit 30. The first attaching and removing means 721 is adapted to selectively attach the output terminals A, B to the terminals C, D and remove the output terminals A, B from the terminals C, D in order to selectively attach and remove the digital signal processing unit 20 to and from the neighboring digital signal processing unit 30.

The first attaching and removing means 711 and 721 may be connectors such as, for example, detachable connectors, jumper pins, or the like.

The transmitting and receiving section detecting means 713 is adapted to detect whether or not the output terminals A, B are removed from the terminals C, D. When the transmitting and receiving section detecting means 713 detects that the output terminals A, B are removed from the terminals C, D, the transmitting and receiving section switching means 719 is adapted to close a circuit opened by the output terminals A, B to form a closed loop.

The transmitting and receiving section detecting means 723 is adapted to detect whether or not the terminals A, B are removed from the terminals C, D. When the transmitting and receiving section detecting means 723 detects that the terminals A, B are removed from the terminals C, D, the transmitting and receiving section switching means 729 is adapted to close a circuit opened by the terminals A, B to form a closed loop.

The transmitting and receiving section detecting means 713, 723 may be, for example, voltage detectors capable of detecting a high voltage occurred when the terminals A, B are attached to the terminals C, D, and a low voltage occurred when the terminals A, B are removed from the terminals C, D.

The second attaching and removing means 741 includes four output terminals A, B, C, and D, and is provided between the signal input and output terminals 611, 613 and external input and output terminals 607, 609. The second attaching and removing means 741 is adapted to selectively attach the terminals A, B to the terminals C, D and remove the terminals A, B from the terminals C, D in order to selectively attach and remove the digital signal processing unit 10 to and from the external input and output terminals 607, 609.

The second attaching and removing means 751 includes four output terminals A, B, C, and D, and is provided between the signal input and output terminals 621, 623 and external input and output terminals 607, 609. The second attaching and removing means 751 is adapted to selectively attach the terminals A, B to the terminals C, D and remove the terminals A, B from the terminals C, D in order to selectively attach and remove the digital signal processing unit 20 to and from the external input and output terminals 607, 609.

The digital signal processing unit 30 further comprises second attaching and removing means 761. The second attaching and removing means 761 includes four output terminals A, B, C, and D, and is provided between the signal input and output terminals 631, 633 and external input and output terminals 607, 609. The second, attaching and removing means 761 is adapted to selectively attach the terminals A, B to the terminals C, D and remove the terminals A, B from the terminals C, D in order to selectively attach and remove the digital signal processing unit 30 to and from the external input and output terminals 607, 609.

The second attaching and removing means 741, 751, and 761 may be connectors such as, for example, detachable connectors, jumper pins, or the like.

The external input/output section detecting means 743 is adapted to detect whether or not the terminals A, B are removed from the terminals C, D. When the terminals A, B are removed, it is judged that the digital signal processing unit 10 is removed from the external input and output terminals 607, 609.

The external input/output section detecting means 753 is adapted to detect whether or not the terminals A, B are removed from the terminals C, D. When the terminals A, B are removed, it is judged that the digital signal processing unit 20 is removed from the external input and output terminals 607, 609.

The digital signal processing unit 30 further comprises external input/output section detecting means 763. The external input/output section detecting means 763 is adapted to detect whether or not the terminals A, B are removed from the terminals C, D. When the terminals A, B are removed, it is judged that the digital signal processing unit 30 is removed from the external input and output terminals 607, 609.

The transmitting and receiving section detecting means 743, 753, and 763 may be, for example, voltage detectors capable of detecting a high voltage occurred when the terminals A, B are attached to the terminals C, D, and a low voltage occurred when the terminals A, B are removed from the terminals C, D.

Electrical connections of constituent elements constituting the seventh embodiment of the digital signal processing apparatus 700 according to the present invention will be described hereinlater.

Terminals C of the second attaching and removing means 741, 751, 761 are connected with the external input terminal 607. Terminals D of the second attaching and removing means 741, 751, 761 are connected with the external output terminal 609.

Terminals A and B of the second attaching and removing means 741 are respectively connected with the signal input and output terminals 611 and 613 of the first digital signal processing unit 10. Terminals A and B of the second attaching and removing means 751 are respectively connected with the signal input and output terminals 621 and 623 of the second digital signal processing unit 20. Terminals A and B of the second attaching and removing means 761 are respectively connected with the signal input and output terminals 631 and 633 of the third digital signal processing unit 30.

The receiving means 11 of the digital signal processing unit 10 is connected with the terminal A of the first attaching and removing means 711. The input terminal of the transmitting and receiving section switching means 719 is connected with the terminal A of the first attaching and removing means 711. The transmitting means 13 of the digital signal processing unit 10 and the output terminal of the transmitting and receiving section switching means 719 are connected with the terminal B of the first attaching and removing means 711. The input terminal of the selecting switch 625 is connected with the terminal D of the first attaching and removing means 711. The terminals A of the selecting switch 625 and 627 are connected with the terminal C of the first attaching and removing means 711.

The receiving means 21 of the digital signal processing unit 20 is connected with the terminals B of the selecting switch 625 and 627. The input terminal of the selecting switch 627 is connected with the terminal A of the first attaching and removing means 721. The input terminal of the transmitting and receiving section switching means 729 is connected with the terminal A of the first attaching and removing means 721. The terminal B of the first attaching and removing means 721 is connected with the output terminal of the transmitting and receiving section switching means 729 and the transmitting means 23 of the digital signal processing unit 20.

The input terminal of the selecting switch 635 is connected with the terminal D of the first attaching and removing means 721. The terminal C of the first attaching and removing means 721 is connected with the output terminals A of the selecting switches 635 and 637. The receiving means 31 of the digital signal processing unit 30 is connected with the terminals B of the selecting switches 635 and 637. The input terminal of the selecting switch 637 is connected with the terminal A of first attaching and removing means of the third digital signal processing unit, not shown. The transmitting means 33 of the digital signal processing unit 30 is connected with the terminal B of the first attaching and removing means of the third digital signal processing unit, not shown.

The operation of the seventh embodiment of the digital signal processing apparatus 700 will be described hereinlater with reference to the drawings shown in FIG. 19.

It is hereinlater assumed that two digital signal processing units of the digital signal processing apparatus 700, for example, the first digital signal processing unit 10 and the second digital signal processing unit 20 are used for the purpose of simplifying the description and assisting in understanding about the whole operation of the digital signal processing apparatus 700.

The terminals A, B of the first attaching and removing means 711 are attached to their corresponding terminals C, D. The terminals A, B of the first attaching and removing means 721 are removed from their corresponding terminals C, D. The terminals A, B of at least one of the second attaching and removing means 741 and 751 are attached to their corresponding terminals C, D.

The transmitting and receiving section detecting means 713 is operated to detect that the digital signal processing unit 10 is not removed from the neighboring digital signal processing unit 20. The transmitting and receiving section switching means 719 is not operated. The transmitting and receiving section detecting means 723, on the other hand, is operated to detect that the digital signal processing unit 20 is removed from the neighboring digital signal processing unit 30. The transmitting and receiving section switching means 729 is operated to close a circuit opened by the digital signal processing unit 20 to form a closed loop. Furthermore, the selecting switch 625 is switched to the portion B and the selecting switch 627 is switched to the portion A.

As a result, the receiving means 11 of the digital signal processing unit 10 is connected with the transmitting means 23 of the digital signal processing unit 20 through the first attaching and removing means 711, the selecting switches 627, and the transmitting and receiving section switching means 729, and the receiving means 21 of the digital signal processing unit 20 is connected with the transmitting means 13 of the digital signal processing unit 10 through the selecting switch 625, and the first attaching and removing means 711.

The digital signal processing units 10 and 20 are thus electrically connected with one another in series to form a closed loop, enabling to circulate the shared memory data elements from one digital signal processing unit to another in a sequential order, thereby making it possible for the digital signal processing units 10 and 20 to share the shared memory data elements with one another.

In a similar manner, another digital signal processing unit, for example, the third digital signal processing unit 30 can be added with the result that the digital signal processing units 10, 20, and 30 will be electrically connected with one another in series to form a closed loop, enabling to circulate the shared memory data elements from one digital signal processing unit to another in a sequential order.

The seventh embodiment of the digital signal processing apparatus 700 thus constructed can easily increase another digital signal processing units to be used, with the result that a plurality of digital signal processing units, including the additional digital signal processing units, will be electrically connected with one another in series to form a closed loop, enabling to circulate the shared memory data elements from one digital signal processing unit to another in a sequential order.

In the aforementioned case that two digital signal processing units of the digital signal processing apparatus 700, for example, the first digital signal processing unit 10 and the second digital signal processing unit 20 are used, it is assumed that a digital signal processing unit, for example, the digital signal processing unit 20 is removed, and only the digital signal processing unit 10 is used.

The terminals A, B of the first attaching and removing means 711 are removed from their corresponding terminals C, D. The terminals A, B of the second attaching and removing means 741 are attached to their corresponding terminals C, D. The transmitting and receiving section detecting means 713 is operated to detect that the digital signal processing unit 10 is removed from the neighboring digital signal processing unit 20. The transmitting and receiving section switching means 719 is operated to close a circuit opened by the digital signal processing unit 21 to form a closed loop.

As a result, the receiving means 11 of the digital signal processing unit 10 is connected with the transmitting means 13 of the digital signal processing unit 10 through the transmitting and receiving section switching means 719. The digital signal processing unit 10 is thus operated alone, circulating the shared memory data elements in the digital signal processing unit 10.

Furthermore, it is hereinlater assumed that two digital signal processing units, for example, the second and third digital signal processing units 20 and 30 are used. The terminals A, B of the first attaching and removing means 711 are removed from their corresponding terminals C, D. The terminals A, B of the first attaching and removing means 721 are attached to their corresponding terminals C, D. The terminals A, B of the second attaching and removing means 741 are removed from their corresponding terminals C, D. The terminals A, B of at least one of the second attaching and removing means 751 and 761 are attached to their corresponding terminals C, D.

The transmitting and receiving section detecting means 723 is operated to detect that the digital signal processing unit 20 is not removed from the neighboring digital signal processing unit 30. The transmitting and receiving section switching means 729 is not operated. The selecting switch 625 is switched to the portion A and the selecting switch 627 is switched to the portion B. The transmitting and receiving section detecting means 733, not shown, on the other hand, is operated to detect that the digital signal processing unit 30 is removed from the neighboring digital signal processing unit 40. The transmitting and receiving section switching means 739 is operated to close a circuit opened by the digital signal processing unit 30 to form a closed loop. Furthermore, the selecting switch 635 is switched to the portion B and the selecting switch 637 is switched to the portion A.

As a result, the receiving means 21 of the digital signal processing unit 20 is connected with the transmitting means 33 of the digital signal processing unit 30 through the first attaching and removing means 721, the selecting switches 637, and the transmitting and receiving section switching means 739, and the receiving means 31 of the digital signal processing unit 30 is connected with the transmitting means 23 of the digital signal processing unit 20 through the selecting switch 635, and the first attaching and removing means 721.

The digital signal processing units 20 and 30 are thus electrically connected with one another in series to form a closed loop, enabling to circulate the shared memory data elements from one digital signal processing unit to another in a sequential order, thereby making it possible for the digital signal processing units 20 and 30 to share the shared memory data elements with one another.

The seventh embodiment of the digital signal processing apparatus 700 thus constructed can easily increase or decrease digital signal processing units to be used, with one or more digital signal processing units will be electrically connected with one another in series to form a closed loop, enabling to circulate the shared memory data elements from one digital signal processing unit to another in a sequential order.

As will be seen from the foregoing description, it is to be understood that the seventh embodiment of the digital signal processing apparatus 700 according to the present invention, in which each of the digital signal processing units further comprises: first attaching and removing means for selectively attaching and removing the digital signal processing unit to and from neighboring digital signal processing units; second attaching and removing means 741 for selectively attaching and removing the digital signal processing unit 10 to and from the external input and output terminals 607, 609; transmitting and receiving section detecting means 713 for detecting whether or not the digital signal processing unit 10 is removed from neighboring digital signal processing unit 20; transmitting and receiving section switching means 719 for closing a circuit opened by the digital signal processing unit 10 to form the closed loop when the transmitting and receiving section detecting means 713 detects that the digital signal processing unit 10 is removed from neighboring digital signal processing units; and external input/output section detecting means 743 for detecting whether or not the digital signal processing unit 10 is removed from the external input and output terminals 607, 609, can easily increase or decrease digital signal processing units to be used, with one or more digital signal processing units will be electrically connected with one another in series to form a closed loop, enabling to circulate the shared memory data elements from one digital signal processing unit to another in a sequential order.

As will be apparent from the construction of the base units shown in FIG. 19, the seventh embodiment of the digital signal processing apparatus has the same advantages as the first embodiment.

Referring to the drawings shown in FIGS. 20 to 23, an eighth preferred embodiment of the digital signal processing apparatus 800 according to the present invention will be described hereinlater.

The eighth embodiment of the digital signal processing apparatus 800 is similar to the first embodiment of the digital signal processing apparatus 100 described with reference to FIG. 1 except for the fact that the shared memory section 117 includes a plurality of processing unit signal data areas, for example, DSP1, DSP2, DSP3, DSP4, respectively dedicated to the digital signal processing units 10, 20, 30, 40 such that each of the digital signal processing units is operative to write shared memory data elements 850 stored in the processing unit data areas dedicated to the digital signal processing unit as shown in FIGS. 20 to 23. The same constitutional elements are simply represented by the same reference numerals as those of the first embodiment, and will thus be omitted in description for avoiding tedious repetition.

As shown in FIGS. 20 to 23, the shared memory data areas comprise input signal data areas, for example, "AD1" to "AD32" allocated to input signals, and processing unit signal data areas, for example, "DSP1", "DSP2", "DSP3", and "DSP4", allocated to output signals generated and outputted from the digital signal processing units 10, 20, 30, and 40. The input signal data areas, i.e., "AD1" to "AD32" are followed by the processing unit signal data areas, i.e., "DSP1", "DSP2", "DSP3", and "DSP4". The shared memory data elements 850 are stored in the shared memory data areas thus constructed.

The operation of the eighth embodiment of the digital signal processing apparatus 800 according to the present invention will be described hereinlater with reference to FIGS. 20 to 23. It is hereinlater assumed that the digital signal processing apparatus 800 is operated to realize the acoustic signal processing system shown in FIG. 5 for the purpose of simplifying the description and assisting in understanding about the whole operation of the digital signal processing apparatus 800.

Figure 20:
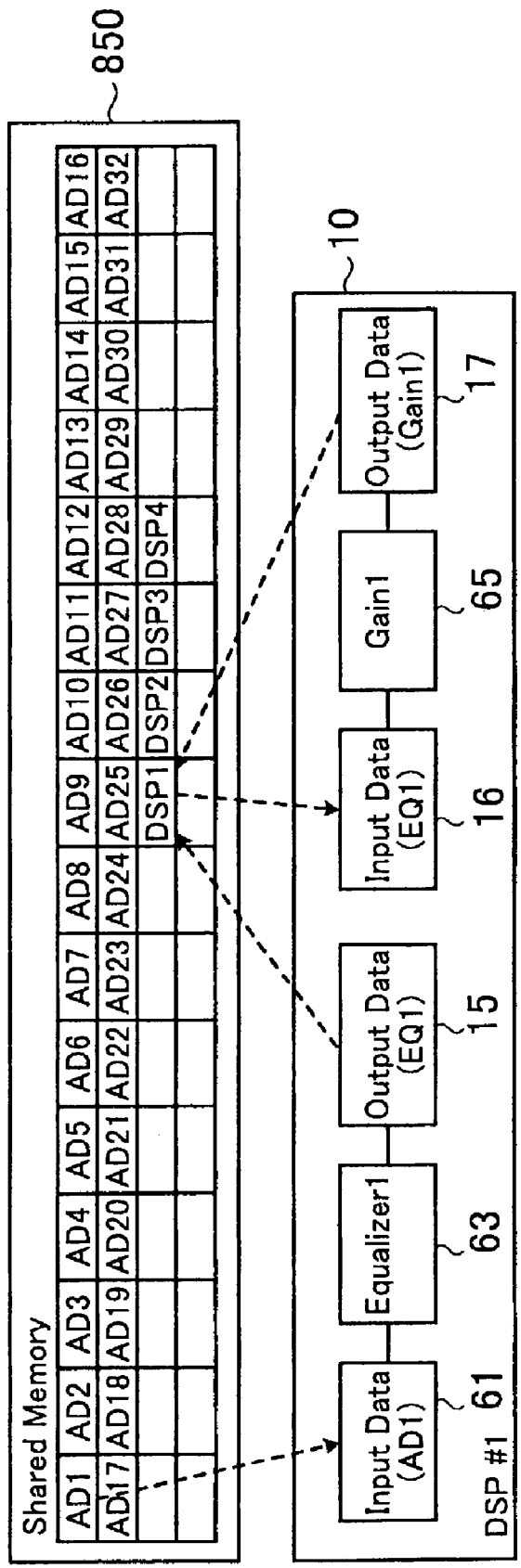
FIG. 20 is a block diagram explaining shared memory data elements allocated in shared memory data areas, and flows of the data elements received and transmitted between the shared memory data areas and a first digital signal processing unit wherein the shared memory data areas and the first digital signal processing unit collectively forming part of an eighth preferred embodiment of the digital signal processing apparatus according to the present invention.

Firstly, the first digital signal processing unit 10 is operated to read and write acoustic data element "AD1" from the signal data area AD1 as a first input signal 61 of the first equalizer 63 as shown in FIG. 20. The digital signal processing unit 10 is operated to generate shared memory data element "EQ1" as an output signal of the first equalizer 63, and store the shared memory data element EQ1 in the signal data area DSP 1, which is dedicated to the digital signal processing unit 10, as output data 15. The digital signal processing unit 10 is then operated to read and input the shared memory data element EQ1 from the signal data area DSP1 as an input signal 16 of the first gain 65. The digital signal processing unit 10 is operated to generate a shared memory data element "GAIN1" as an output signal of the first gain 65, and store the shared memory data element GAIN1 in the signal data area DSP 1 as output data 17. Thus, the first digital signal processing unit 10 completes the audio thread process. The shared memory data elements 850 thus generated are transmitted to the subsequent digital signal processing unit 20.

Figure 21:
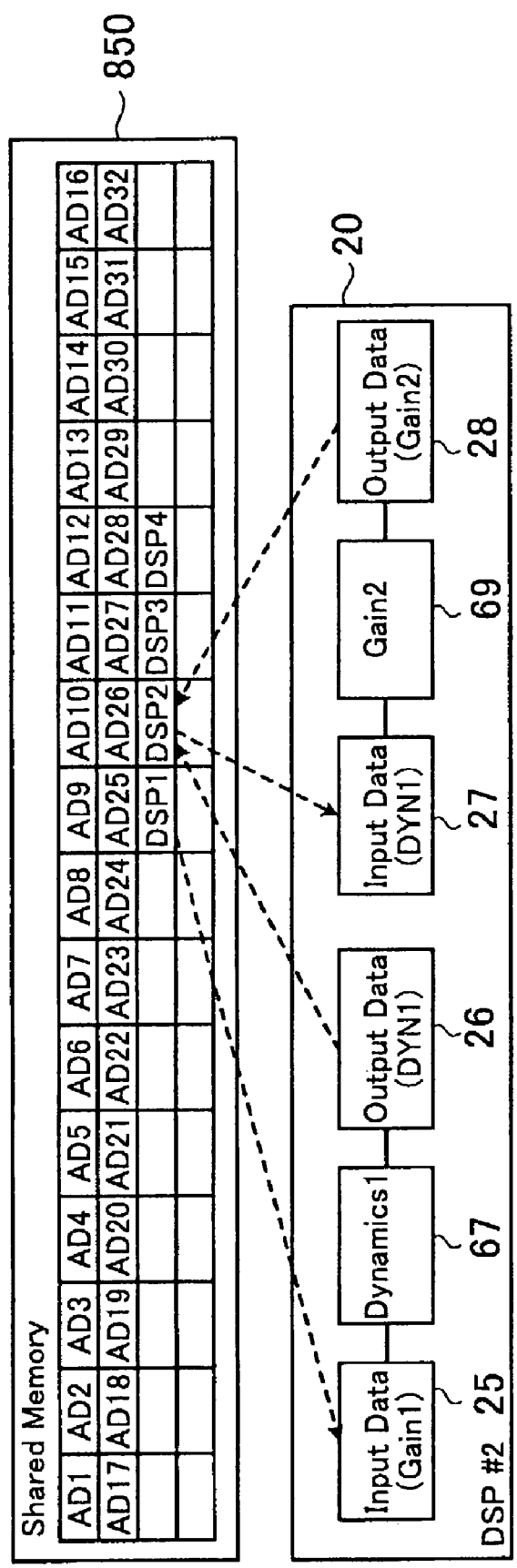
FIG. 21 is a block diagram explaining shared memory data elements allocated in shared memory data areas, and flows of the data elements received and transmitted between the shared memory data areas and a second digital signal processing unit wherein the shared memory data areas and the second digital signal processing unit collectively forming part of the eighth embodiment of the digital signal processing apparatus according to the present invention.

Secondly, the second digital signal processing unit 20 is operated to read and input a shared memory data element "GAIN 1" from the signal data area DSP1 as a first input signal 25 of the first dynamics 67 as shown in FIG. 21. The digital signal processing unit 20 is operated to generate shared memory data element "DYN1" as an output signal of the first dynamics 67, and store the shared memory data element DYN1 in the signal data area DSP2 as output data 26. The digital signal processing unit 20 is then operated to read and input the shared memory data element DYN1 from the signal data area DSP2 as an input signal 27 of the second gain 69. The digital signal processing unit 20 is operated to generate shared memory data element "GAIN2" as an output signal of the second gain 69, and store the shared memory data element GAIN2 in the signal data area DSP 2 as output data 28. Thus, the second digital signal processing unit 20 completes the audio thread process. The shared memory data elements 850 thus generated are transmitted to the subsequent digital signal processing unit 30.

Figure 22:
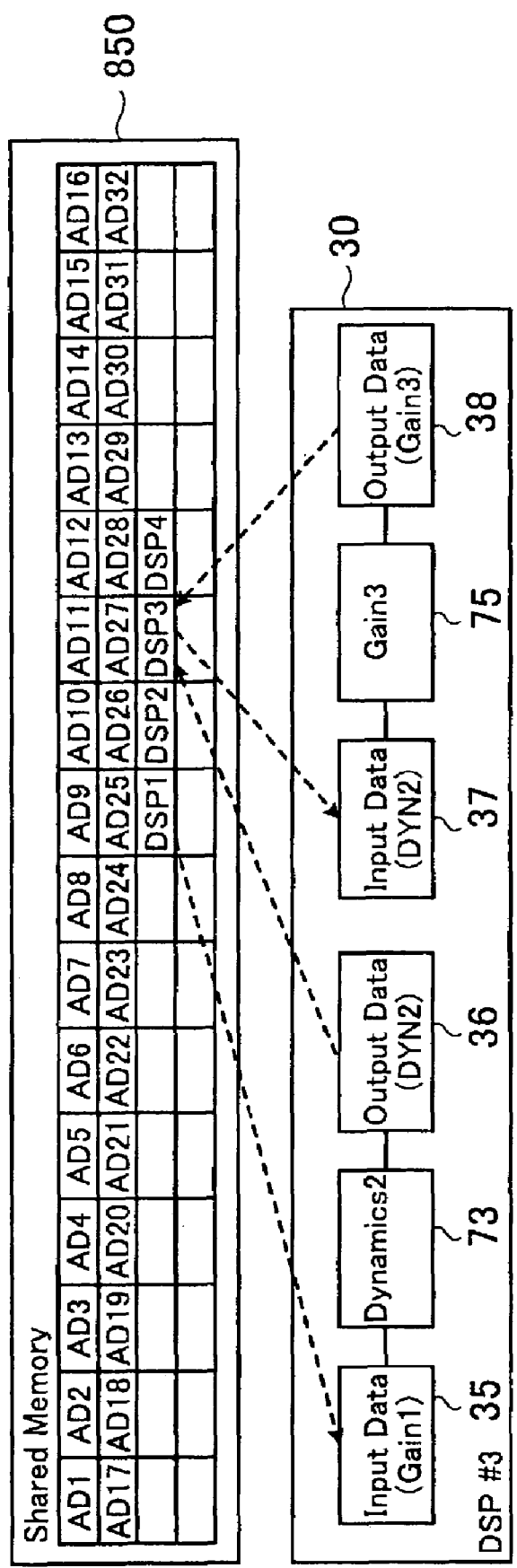
FIG. 22 is a block diagram explaining shared memory data elements allocated in shared memory data areas, and flows of the data elements received and transmitted between the shared memory data areas and a third digital signal processing unit wherein the shared memory data areas and the third digital signal processing unit collectively forming part of the eighth preferred embodiment of the digital signal processing apparatus according to the present invention.

Thirdly, the third digital signal processing unit 30 is operated to read and input a shared memory data element "GAIN 1" from the signal data area DSP1 as a first input signal 35 of the second dynamics 73 as shown in FIG. 22. The digital signal processing unit 30 is operated to generate shared memory data element "DYN2" as an output signal of the second dynamics 73, and store the shared memory data element DYN2 in the signal data area DSP3 as output data 36. The digital signal processing unit 30 is then operated to read and input the shared memory data element DYN2 from the signal data area DSP3 as an input signal 37 of the third gain 75. The digital signal processing unit 30 is operated to generate shared memory data element "GAIN3" as an output signal of the third gain 75, and store the shared memory data element GAIN3 in the signal data area DSP 3 as output data 38. Thus, the third digital signal processing unit 30 completes the audio thread process. The shared memory data elements 850 thus generated are transmitted to the subsequent digital signal processing unit 40.

Figure 23:
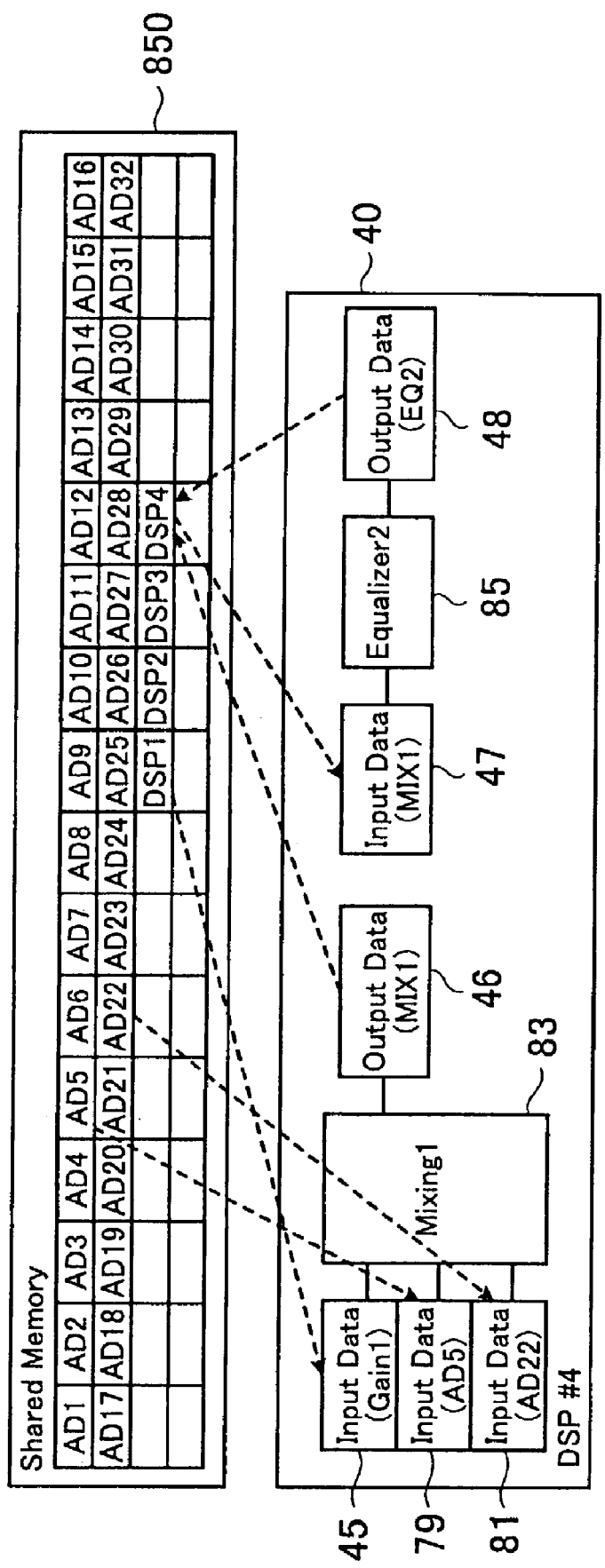
FIG. 23 is a block diagram explaining shared memory data elements allocated in shared memory data areas, and flows of the data elements received and transmitted between the shared memory data areas and a fourth digital signal processing unit wherein the shared memory data areas and the fourth digital signal processing unit collectively forming part of the eighth preferred embodiment of the digital signal processing apparatus according to the present invention.

Fourthly, the fourth digital signal processing unit 40 is operated to read and input shared memory data elements "GAIN1", "AD5", and "AD22" respectively from the signal data areas "DSP1", "AD5", and "AD22" as input signals 45, 79, and 81 of the mixing 83 as shown in FIG. 23. The digital signal processing unit 40 is operated to generate shared memory data element "MIX1" as an output signal of the mixing 83, and store the shared memory data element MIX1 in the signal data area DSP4 as output data 46. The digital signal processing unit 40 is then operated to read and input the shared memory data element MIX1 from the signal data area DSP4 as an input signal 47 of the second equalizer 85. The digital signal processing unit 40 is operated to generate shared memory data element "EQ2" as an output signal of the second equalizer 85, and store the shared memory data element EQ2 in the signal data area DSP4 as output data 48.

Thus, the fourth digital signal processing unit 40 completes the audio thread process. The shared memory data elements 850 thus generated are transmitted to the subsequent digital signal processing unit 10. The first digital signal processing unit 10 is then operated to input the shared memory data elements 850 thus generated and output the shared memory data elements 850 thus inputted to the external device through the output terminal 53.

In the present embodiment, the acoustic signal data areas such as, for example, "EQ1", "Gain 1", "DYN1", "Gain 2", "DYN2", "Gain 3", "MIX1", and "EQ2" described with reference to FIG. 6 are not required, thereby enabling to reduce the amount of data elements stored in the shared memory section 117.

As will be seen from the foregoing description, it is to be understood that the eighth embodiment of the digital signal processing apparatus 800 according to the present invention, in which the shared memory section 117 includes a plurality of processing unit signal data areas, for example, DSP1, DSP2, DSP3, DSP4, respectively dedicated to the digital signal processing units 10, 20, 30, 40 such that each of the digital signal processing units is operative to write shared memory data elements 850 stored in the processing unit data areas dedicated to the digital signal processing unit, can reduce the amount of data elements stored in the shared memory section 117.

Figure 24:
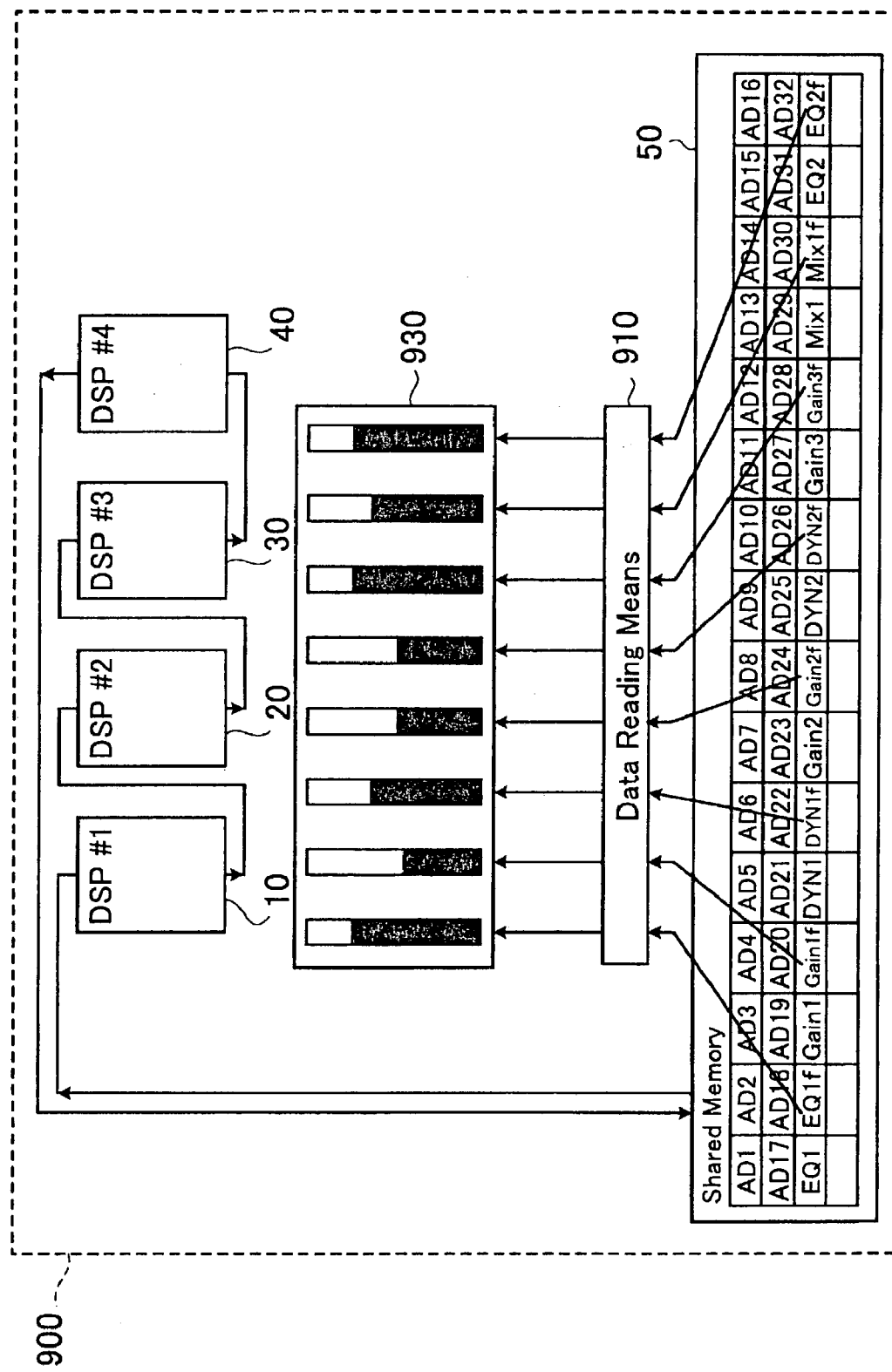
FIG. 24 is a schematic block diagram showing a ninth preferred embodiment of the digital signal processing apparatus according to the present invention.

Referring to FIG. 24 of the drawings, there is shown a ninth preferred embodiment of the digital signal processing apparatus 900.

The ninth embodiment of the digital signal processing apparatus 900 is similar to the first embodiment of the digital signal processing apparatus 100 described with reference to FIG. 1 except for the fact that one or more of the acoustic signal processing means 120 of the digital signal processing units 10, 20, 30, 40 include respective filtering sections each for inputting a shared memory data element stored in the shared memory section 117 as an input signal, filtering the shared memory data elements 50 thus inputted, and writing a filtered data element into the shared memory section 117 as shared memory data elements 50, and the digital signal processing apparatus 900 further comprising: data reading means 910 for cyclically reading the shared memory data elements 50 filtered by the filtering sections from the shared memory section 117; and level meter display means 930 for displaying levels of the shared memory data elements 50 read by the data reading means 910 as shown in FIG. 24. The same constitutional elements are simply represented by the same reference numerals as those of the first embodiment, and will thus be omitted in description for avoiding tedious repetition.

In the present embodiment of the digital signal processing apparatus 900, one or more of the acoustic signal processing means 120 of the digital signal processing units 10, 20, 30, 40 include respective filtering sections. Each of the filtering sections is adapted to input a shared memory data element stored in the shared memory section 117 as an input signal, to filter the shared memory data elements 50 thus inputted, and to write a filtered data element into the shared memory section 117 as shared memory data elements 50. In the digital signal processing apparatus 900 according to the present invention, the filtering sections are adapted to filter the shared memory data elements with respect to their time constants so that the levels of the filtered shared memory data elements can be displayed.

As best shown in FIG. 24, the digital signal processing apparatus 900 further comprises: data reading means 910 and level meter display means 930. The data reading means 910 is adapted to cyclically read the shared memory data elements 50 filtered by the filtering sections from the shared memory section 117. The data reading means 910 is designed to read the shared memory data elements 50 at a data reading frequency. The data reading frequency is not limited to the sampling frequency. Preferably, the data reading frequency should be a frequency determined in consideration of a response performance of the level meter display means 930. The data reading means 910 may be a host controller such as, for example, a CPU. The level meter display means 930 is adapted to display levels of the shared memory data elements 50 read by the data reading means 910. The level meter display means 93 may include a Light Emitting Diode, referred to simply as "LED", a Liquid Crystal Display, referred to simply as "LCD", or the like.

The operation of the ninth embodiment of the digital signal processing apparatus 900 will be described hereinlater with reference to the drawings shown in FIG. 24.

The filtering sections are operated to input shared memory data elements stored in the shared memory section 117 as input signals, to filter the shared memory data elements 50 thus inputted, and to write filtered data elements such as, for example, "EQ1f", "Gain1f", "DYN1f", "Gain2f", "DYN2f", "Gain3f", "Mix1f", and "EQ2f", into the shared memory section 117 as shared memory data elements 50 as shown in FIG. 24. The data reading means 910 is operated to cyclically read the shared memory data elements filtered by the filtering sections from the shared memory section 117. The level meter display means 930 is then operated to display levels of the shared memory data elements 50 read by the data reading means 910.

As will be seen from the foregoing description, it is to be understood that the ninth embodiment of the digital signal processing apparatus 900 according to the present invention, in which one or more of the acoustic signal processing means of the digital signal processing units include respective filtering sections each for inputting a shared data element stored in the shared memory section 117 as an input signal, filtering the shared data elements thus inputted, and writing a filtered data element into the shared memory section 117 as shared data elements, which further comprises: data reading means 910 for cyclically reading the shared data elements filtered by the filtering sections from the shared memory section 117; and level meter display means 930 for displaying levels of the shared data elements read by the data reading means 910, can display the levels of data elements read from the shared memory section.

Figure 25:
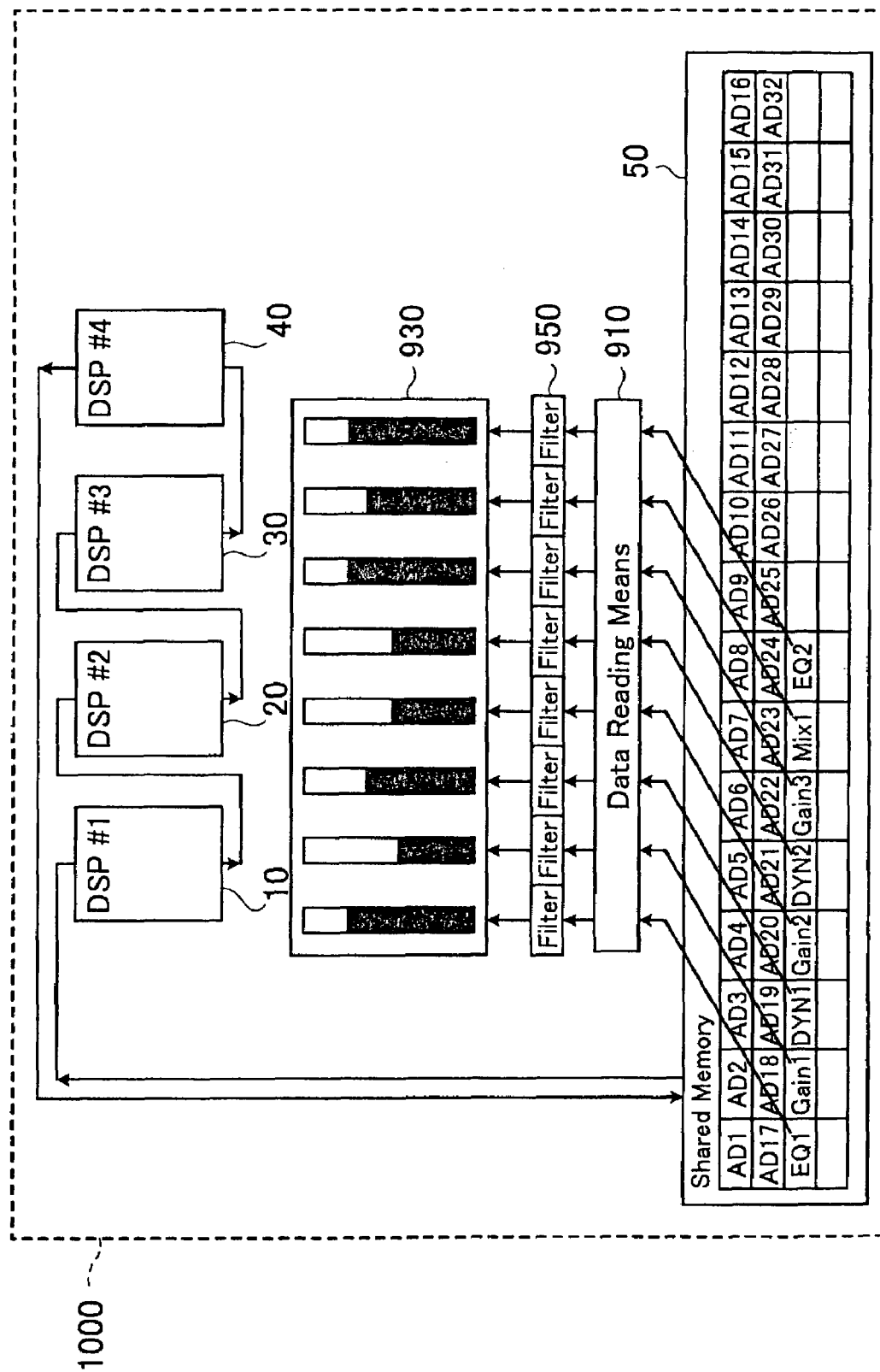
FIG. 25 is a schematic block diagram showing a tenth preferred embodiment of the digital signal processing apparatus according to the present invention.
Figure 26:
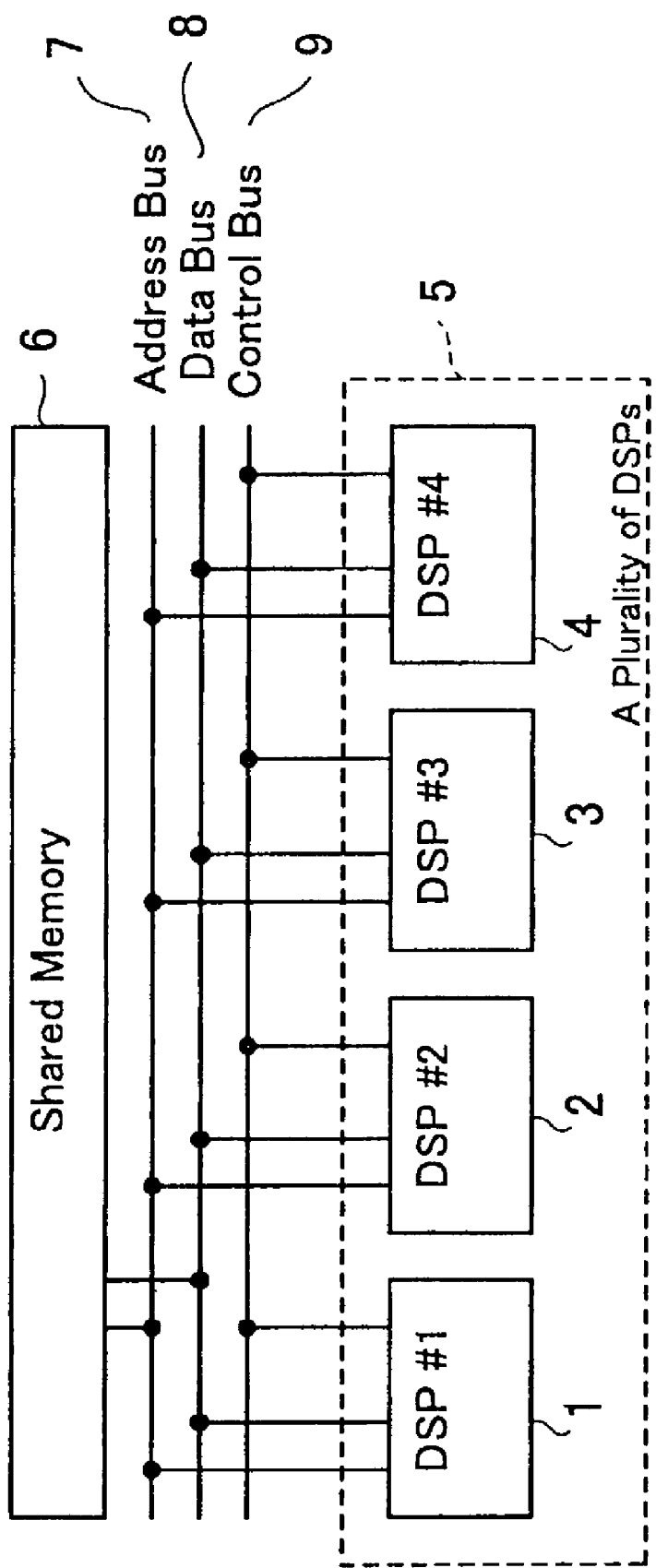
FIG. 26 is a schematic block diagram showing a conventional digital signal processing apparatus.

Referring to FIG. 25 of the drawings, there is shown a tenth preferred embodiment of the digital signal processing apparatus 1000.

The tenth embodiment of the digital signal processing apparatus 1000 is similar to the first embodiment of the digital signal processing apparatus 100 described with reference to FIG. 1 except for the fact that the digital signal processing apparatus 1000 further comprising: data reading means 910 for cyclically reading one or more shared memory data elements from the shared memory section 117; filtering means 950 for filtering the shared memory data elements read by the data reading means 910; and level meter display means 930 for displaying levels of the shared memory data elements filtered by the filtering means 950 as shown in FIG. 25. The data reading means 910 and the level meter display means 930 have been described in the ninth embodiment. The same constitutional elements are simply represented by the same reference numerals as those of the first embodiment, and will thus be omitted in description for avoiding tedious repetition.

In the digital signal processing apparatus 1000, the data reading means 910 is operative to cyclically read one or more shared memory data elements from the shared memory section 117, the filtering means 950 is operative to filter the shared memory data elements read by the data reading means 910, and the level meter display means 930 is operative to display levels of the shared memory data elements filtered by the filtering means 950.

As will be seen from the foregoing description, it is to be understood that the tenth embodiment of the digital signal processing apparatus 1000 according to the present invention, which comprises data reading means 910 for cyclically reading one or more shared data elements from the shared memory section; filtering means 950 for filtering the shared data elements read by the data reading means 910; and level meter display means 930 for displaying levels of the shared data elements filtered by the filtering means 950, can display the levels of data elements read from the shared memory section.

While it has been described in the present and previous embodiments shown in FIGS. 24 and 25, the level meter display means 930 is operative to display the levels of eight data units of the shared memory data elements, the level meter display means 930 of the digital signal processing apparatus according to the present invention may display the levels of any number of data units.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention.

What is claimed is:

1. Digital signal processing apparatus, comprising:
    input means for inputting a plurality of acoustic signals from an external outputting device;
    a plurality of digital signal processing units electrically connected with one another in series to form a closed loop, said digital signal processing units receiving and processing data elements including said acoustic signals as shared data elements in a sequential order; and
    output means for outputting a plurality of acoustic data elements processed and generated by said digital signal processing units to an external inputting device, each of said digital signal processing units comprises:
    receiving means for receiving said shared data elements from a preceding digital signal processing unit;
    received data storing means for storing said shared data elements received by said receiving means into a receiving memory;
    copied data storing means for copying said shared data elements stored in said receiving memory to a shared memory section;
    acoustic signal processing means including one or more acoustic signal processing sections each for inputting said shared data elements stored in said shared memory section as an input signal, processing said shared data elements thus inputted, and writing an output signal into said shared memory section as shared data elements;
    transmitting data storing means for storing shared data elements stored in said shared memory section into a transmitting memory;
    transmitting means for transmitting said shared data elements stored in said transmitting memory to a subsequent digital signal processing unit; and
    shared data editing means for editing said shared data elements stored in said shared memory section.

2. Digital signal processing apparatus as set forth in claim 1, in which
    said receiving means of said digital signal processing unit is operative to receive said shared data elements from a preceding digital signal processing unit by means of Direct Memory Access, and
    said received data storing means is operative to store said shared data elements received by said receiving means into said receiving memory concurrently while said acoustic signal processing means is inputting and processing said shared data elements stored in said shared memory section, and writing an output signal into said shared memory section, and concurrently while said transmitting data storing means is storing shared data elements stored in said shared memory section into a transmitting memory, and said transmitting means is transmitting said shared data elements stored in said transmitting memory to a subsequent digital signal processing unit.

3. Digital signal processing apparatus as set forth in claim 1, farther comprising:
    an external storing means connected with one or more of said digital signal processing units.

4. Digital signal processing apparatus as set forth in claim 3, in which said acoustic signal processing means of a digital signal processing unit includes a delay section for inputting said shared data elements stored in said shared memory section as an input signal, storing said shared data elements thus inputted in said external storing means for a predetermined delay time period, and writing said shared data elements thus delayed into said shared memory section as shared data elements.

5. Digital signal processing apparatus as set forth in claim 1, further comprising:
    a bus, through which said digital signal processing units are connected with one another in series to form a closed loop; and
    a plurality of switching means for selectively connecting and disconnecting respective digital signal processing units with and from said bus.

6. Digital signal processing apparatus as set forth in claim 5, in which one or more of said digital signal processing units can receive and transmit data elements from and to neighboring digital signal processing units when said switching means connects said one or more of said digital signal processing units with said bus, and said one or more of digital signal processing units can not receive and transmit data elements from and to neighboring digital signal processing units while remaining digital signal processing units are electrically connected with one another in series to form another closed loop such that said remaining digital signal processing units are operative to receive data elements including said acoustic signals as shared data elements, and to process said data elements when said switching means disconnects said one or more of said digital signal processing units from said bus.

7. Digital signal processing apparatus as set forth in claim 1, in which
   said shared data editing means is operative to edit said shared data elements stored in said shared memory section,
   said transmitting data storing means of a digital signal processing unit is operative to store edited shared data elements thus edited by said shared data editing means and stored in said shared memory section into a transmitting memory;
   said transmitting means of said digital signal processing unit is operative to transmit said edited shared data elements stored in said transmitting memory to a subsequent digital signal processing unit, and
   said receiving means of said subsequent digital signal processing unit is operative to receive said edited shared data elements from said preceding digital signal processing unit.

8. Digital signal processing apparatus as set forth in claim 1, in which each of said digital signal processing units comprises:
   signal input means for inputting a plurality of acoustic data elements from an external outputting device; and
   signal output means for outputting a plurality of acoustic data elements to an external inputting device, which further comprises:
   selecting means for allowing one or more of said digital signal processing units to be electrically connected with one another in series to form a closed loop such that said one or more of said digital signal processing units are operative to receive data elements including said acoustic signals as shared data elements, and to process said data elements, and allowing another one or more of said digital signal processing units to be electrically connected with one another in series to form another closed loop such that said another one or more of said digital signal processing units are operative to receive data elements including said acoustic signals as shared data elements, and to process said data elements.

9. Digital signal processing apparatus as set forth in claim 1, in which each of said digital signal processing units comprises:
   signal input means for inputting a plurality of acoustic data elements from an external outputting device;
   signal output means for outputting a plurality of acoustic data elements to an external inputting device;
   first attaching and removing means provided between said digital signal processing unit and a neighboring digital signal processing unit for selectively attaching and removing said digital signal processing unit to and from said neighboring digital signal processing unit; and
   second attaching and removing means provided between said signal input and output means and external input and output terminals for selectively attaching and removing said digital signal processing unit to and from said external input and output terminals, whereby said first attaching and removing means and said second attaching and removing means allow said digital signal processing unit to be selectively attached to and removed from said Digital signal processing apparatus.

10. Digital signal processing apparatus as set forth in claim 9, further comprising:
    first detecting means for detecting whether or not said digital signal processing unit is removed from neighboring digital signal processing unit; and
    transmitting and receiving section switching means for closing a circuit opened by said digital signal processing unit to form a closed loop when said first detecting means detects that said digital signal processing unit is removed from neighboring digital signal processing unit.

11. Digital signal processing apparatus as set forth in claim 9, further comprising:
    second detecting means for detecting whether or not said digital signal processing unit is removed from said external input and output terminals.

12. Digital signal processing apparatus as set forth in claim 1, in which said shared memory section includes a plurality of processing unit data areas respectively dedicated to said digital signal processing units such that each of said digital signal processing units is operative to write said shared data elements stored in said processing unit data areas dedicated to said digital signal processing unit.

13. Digital signal processing apparatus comprising:
    input means for inputting a plurality of acoustic signals from an external outputting device;
    a plurality of digital signal processing units electrically connected with one another in series to form a closed loop, said digital signal processing units receiving and processing data elements including said acoustic signals as shared data elements in a sequential order; and
    output means for outputting a plurality of acoustic data elements processed and generated by said digital signal processing units to an external inputting device, each of said digital signal processing units comprising:
    receiving means for receiving said shared data elements from a preceding digital signal processing unit;
    received data storing means for storing said shared data elements received by said receiving means into a receiving memory;
    copied data storing means for copying said shared data elements stored in said receiving memory to a shared memory section;
    acoustic signal processing means including one or more acoustic signal processing sections each for inputting said shared data elements stored in said shared memory section as an input signal, processing said shared data elements thus inputted, and writing an output signal into said shared memory section as shared data elements;
    transmitting data storing means for storing shared data elements stored in said shared memory section into a transmitting memory; and
    transmitting means for transmitting said shared data elements stored in said transmitting memory to a subsequent digital signal processing unit, wherein
    one or more of said acoustic signal processing means of said digital signal processing units include respective filtering sections each for inputting a shared data element stored in said shared memory section as an input signal, filtering said shared data elements thus inputted, and writing a filtered data element into said shared memory section as shared data elements, which further comprises:
    data reading means for cyclically reading said shared data elements filtered by said filtering sections from said shared memory section; and level meter display means for displaying levels of said shared data elements read by said data reading means.

14. Digital signal processing apparatus comprising:

input means for inputting a plurality of acoustic signals from an external outputting device;

a plurality of digital signal processing units electrically connected with one another in series to form a closed loop, said digital signal processing units receiving and processing data elements including said acoustic signals as shared data elements in a sequential order and output means for outputting a plurality of acoustic data elements processed and generated by said digital signal processing units to an external inputting device, each of said digital signal processing units comprising:

receiving means for receiving said shared data elements from a preceding digital signal processing unit;

received data storing means for storing said shared data elements received by said receiving means into a receiving memory;

copied data storing means for copying said shared data elements stored in said receiving memory to a shared memory section;

acoustic signal processing means including one or more acoustic signal processing sections each for inputting said shared data elements stored in said shared memory section as an input signal, processing said shared data elements thus inputted, and writing an output signal into said shared memory section as shared data elements;

transmitting data storing means for storing shared data elements stored in said shared memory section into a transmitting memory; and transmitting means for transmitting said shared data elements stored in said transmitting memory to a subsequent digital signal processing unit, wherein data reading means for cyclically reading one or more shared data elements from said shared memory section;

filtering means for filtering said shared data elements read by said data reading means; and level meter display means for displaying levels of said shared data elements filtered by said filtering means.

15. Digital signal processing method comprising the steps of:

(a) inputting a plurality of acoustic signals from an external outputting device;

(b) storing data elements including said acoustic signals inputted in said step (a) as shared data elements; and (c) connecting plurality of digital signal processing units with one another in series to form a closed loop, said digital signal processing units receiving and processing said shared data elements in a sequential order;

(d) outputting a plurality of acoustic data elements processed and generated by said digital signal processing units to an external inputting device; and (e) editing said shared data elements, said step (c) comprising the steps of:

(c1) each one of said digital signal processing units receiving said shared data elements from a preceding digital signal processing unit;

(c2) said one of said digital signal processing units storing said shared data elements received in said step (c1) into a receiving memory;

(c3) said one of said digital signal processing units copying said shared data elements stored in said receiving memory to a shared memory section;

(c4) said one of said digital signal processing units further carrying out one or more acoustic signal processing steps, said acoustic signal processing step having steps of (c41) inputting said shared data elements stored in said shared memory section as an input signal, (c42) processing said shared data elements thus inputted, and (c43) writing an output signal into said shared memory section as shared data elements;

(c5) said one of said digital signal processing units storing shared data elements stored in said shared memory section into a transmitting memory; and (c6) said one of said digital signal processing units transmitting said shared data elements stored in said transmitting memory to a subsequent digital signal processing unit.

16. Digital signal processing method as set forth in claim 15, in which said step (e) is of editing shared data elements stored in said shared memory section, said step (c5) is of storing said edited shared data elements stored in said shared memory section into a transmitting memory; and said step (c6) is of transmitting said edited shared data elements stored in said transmitting memory to said subsequent digital signal processing unit.

* * * * *